(12) United States Patent
Yang et al.

(10) Patent No.: US 11,516,470 B2
(45) Date of Patent: Nov. 29, 2022

(54) VIDEO CODER AND CORRESPONDING METHOD

(71) Applicant: HUAWEI TECHNOLOGIES CO., LTD., Shenzhen (CN)

(72) Inventors: Haitao Yang, Shenzhen (CN); Yin Zhao, Hangzhou (CN); Riyang Zhao, Shenzhen (CN); Zhongliang Li, Beijing (CN); Jing Xiao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/345,286

(22) Filed: Jun. 11, 2021

(65) Prior Publication Data
US 2021/0306630 A1 Sep. 30, 2021

Related U.S. Application Data

(63) Continuation of application No. PCT/CN2019/125740, filed on Dec. 16, 2019.

(30) Foreign Application Priority Data

Dec. 16, 2018 (CN) .......................... 201811546224.7
May 6, 2019 (CN) .......................... 201910372891.6

(51) Int. Cl.
*H04N 19/119* (2014.01)
*H04N 19/167* (2014.01)
(Continued)

(52) U.S. Cl.
CPC ......... *H04N 19/119* (2014.11); *H04N 19/167* (2014.11); *H04N 19/176* (2014.11); *H04N 19/96* (2014.11)

(58) Field of Classification Search
None
See application file for complete search history.

(56) References Cited

U.S. PATENT DOCUMENTS

2011/0038414 A1 2/2011 Song et al.
2019/0174128 A1* 6/2019 Jang ..................... H04N 19/132
(Continued)

FOREIGN PATENT DOCUMENTS

CN 101938657 A 1/2011
CN 102761742 A 10/2012
(Continued)

OTHER PUBLICATIONS

Ma et al., "Summary report for CE1: partitioning", 11. JVET Meeting;(The Joint Video Exploration Team of ISO/IEC JTC1/SC29/WG11 and ITU-T SG.16 ), Jul. 10, 2018-Jul. 18, 2018, JVET-K0021-v4, , 36 pages.
ITU-T Telecommunication Standardization Sector of ITU. "Line Transmission of Non-Telephone Signals, Video Codec for Audiovisual Services at p×64 kbits." International Telecommunication Union. H.261 (Mar. 1993). 29 pages.
(Continued)

*Primary Examiner* — Kaitlin A Retallick
(74) *Attorney, Agent, or Firm* — Maier & Maier, PLLC

(57) ABSTRACT

This application relates to the field of video coding technologies, and discloses a video coder and a corresponding method, to help improve video coding performance. In this application, encoding and decoding are collectively referred to as coding. A video coding method includes: determining a block split policy of a current picture block based on a size relationship between the width and the height of the current picture block; applying the block split policy to the current picture block to obtain a coding block; and reconstructing the obtained coding block to reconstruct the current picture block.

14 Claims, 24 Drawing Sheets

(51) Int. Cl.
  *H04N 19/176* (2014.01)
  *H04N 19/96* (2014.01)

(56) References Cited

U.S. PATENT DOCUMENTS

| | | | | |
|---|---|---|---|---|
| 2020/0029077 A1* | 1/2020 | Lee | ......................... | H04N 19/11 |
| 2021/0227221 A1* | 7/2021 | Lim | ..................... | H04N 19/124 |

FOREIGN PATENT DOCUMENTS

| | | |
|---|---|---|
| CN | 102957907 A | 3/2013 |
| CN | 102970526 A | 3/2013 |
| CN | 104284188 A | 1/2015 |
| CN | 107566848 A | 1/2018 |
| CN | 108713320 A | 10/2018 |
| CN | 108781286 A | 11/2018 |
| CN | 108965894 A | 12/2018 |
| KR | 1020180051424 A | 5/2018 |
| KR | 20180107762 A | 10/2018 |
| WO | 2018030599 A1 | 2/2018 |
| WO | 2018130473 A1 | 7/2018 |

OTHER PUBLICATIONS

ITU-T Telecommunication Standardization Sector of ITU. "Series H: Audiovisual and Multimedia Systems, Infrastructure of audiovisual services—Coding of moving video, Video coding for low bit rate communication." International Telecommunication Union. H.263 (Jan. 2005). 226 pages.

ITU-T Telecommunication Standardization Sector of ITU. "Series H: Audiovisual and Multimedia Systems, Infrastructure of audiovisual services—Coding of moving video, Advanced video coding for generic audiovisual services." International Telecommunication Union. H.264 (Apr. 2017). 812 pages.

ITU-T Telecommunication Standardization Sector of ITU. "Series H: Audiovisual and Multimedia Systems Infrastructure of audiovisual services—Coding of moving video, High efficiency video coding." International Telecommunication Union. H.265 (Feb. 2018). 692 pages.

Zhao et al., "CE1: On configuration of the MTT (Test 3.0.8 and Test 3.0.9)", Joint Video Experts Team (JVET) of ITU-T SG 16 WP 3 and ISO/IEC JTC 1/SC 29/WG 11, 11th Meeting: Ljubljana, SI, Jul. 10-18, 2018, JVET-K0137-v1, total: 5 pages.

\* cited by examiner

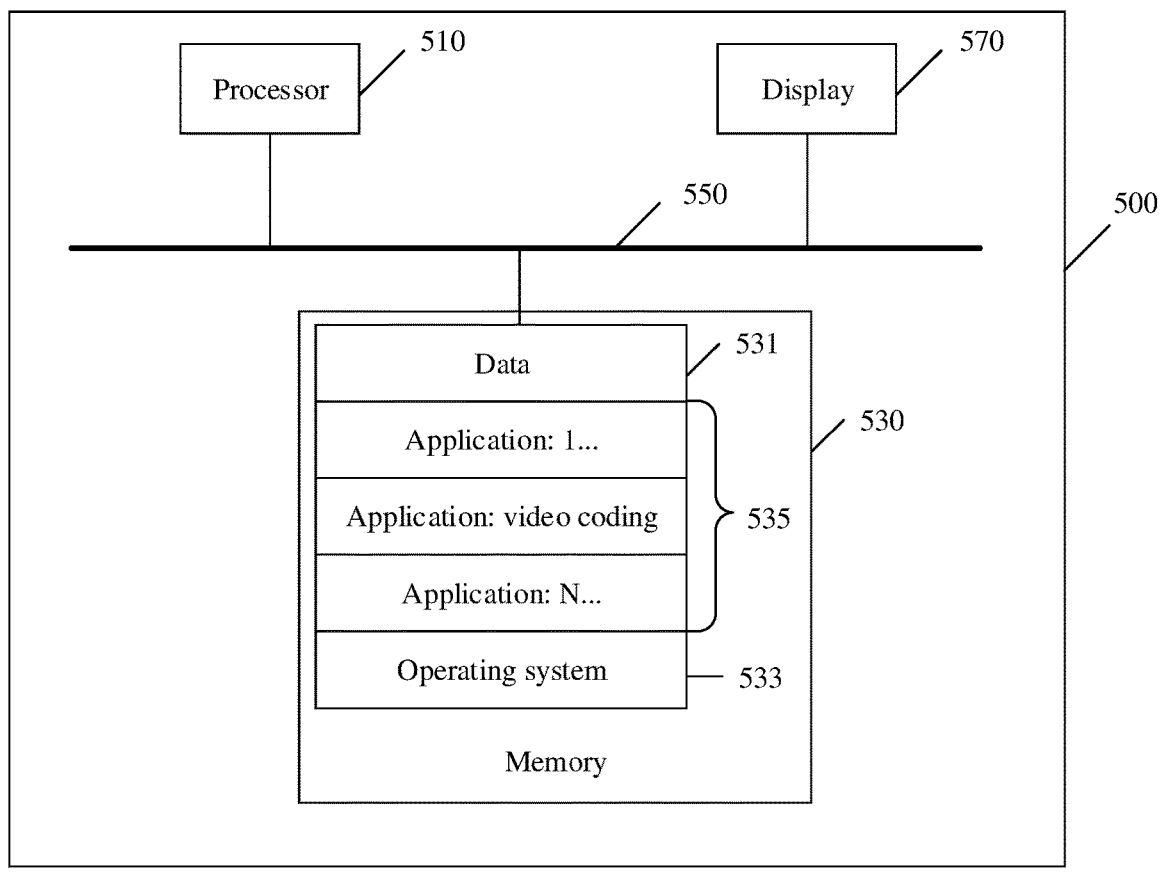
FIG. 5
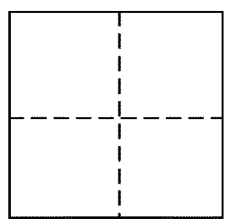 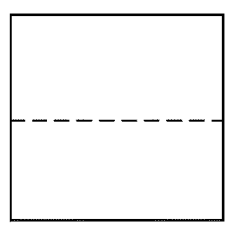 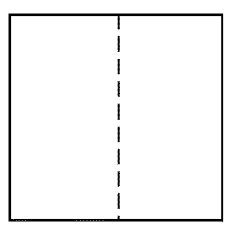 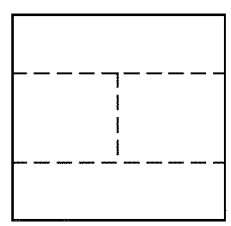 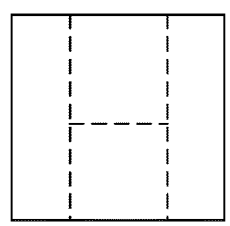
FIG. 6(c)　　FIG. 6(a)　　FIG. 6(b)　　FIG. 6(d)　　FIG. 6(e)

VIDEO CODER AND CORRESPONDING METHOD

CROSS-REFERENCE TO RELATED APPLICATIONS

This application is a continuation of International Application No. PCT/CN2019/125740, filed on Dec. 16, 2019, which claims priority to Chinese Patent Application No. 201811546224.7, filed on Dec. 16, 2018, and claims priority to Chinese Patent Application No. 201910372891.6, filed on May 6, 2019, All of the aforementioned patent applications are hereby incorporated by reference in their entireties.

TECHNICAL FIELD

This embodiments relate to the field of video coding technologies, and in particular, to a video coder and a corresponding method.

BACKGROUND

Digital video capabilities can be incorporated into a wide variety of apparatuses, including digital televisions, digital live broadcast systems, wireless broadcast systems, personal digital assistants (PDA), laptop or desktop computers, tablet computers, e-book readers, digital cameras, digital recording apparatuses, digital media players, video game apparatuses, video game consoles, cellular or satellite radio phones (so-called "smartphones"), video conferencing apparatuses, video streaming apparatuses, and the like. Digital video apparatuses implement video compression technologies, for example, video compression technologies described in standards defined by MPEG-2, MPEG-4, ITU-T H.263, and ITU-T H.264/MPEG-4 Part 10: advanced video coding (AVC), the video coding standard H.265/high efficiency video coding (HEVC) standard, and extensions of such standards. The video apparatuses can transmit, receive, encode, decode, and/or store digital video information more efficiently by implementing such video compression technologies. MPEG is the English abbreviation of moving picture experts group. ITU-T is the English abbreviation of International Telecommunication Union-Telecommunication Standardization Sector.

In block-based video coding, a video slice (that is, a video frame or a part of a video frame) may be split into several picture blocks, and the picture block may also be referred to as a tree block, a coding unit (CU), and/or a coding node. How to split a video frame or a video slice to improve video coding performance becomes an urgent problem to be resolved.

SUMMARY

The embodiments provide a video coder and a corresponding method, to help improve video coding performance. In the embodiments, encoding and decoding are collectively referred to as coding.

According to a first aspect, a video coding method is provided, including: first determining a block split policy of a current picture block based on a size relationship between the width and the height of the current picture block; then applying the block split policy to the current picture block to obtain a coding block; and subsequently reconstructing the obtained coding block to reconstruct the current picture block. In this solution, the block split policy of the current picture block is conditionally determined, to obtain the coding block. This helps reduce split complexity, so that video coding performance is improved.

The coding block may also be referred to as a CU. In an example, the solution may be applied to a second-level coding tree in an extended quadtree (EQT) solution. In other words, the current picture block may be any picture block in the second-level coding tree. The coding block may be a leaf node in a coding tree such as the second-level coding tree.

In a possible design, the determining a block split policy of a current picture block based on a size relationship between the width and the height of the current picture block may include: determining whether the current picture block satisfies a first condition, where the first condition may include: the width of the current picture block is less than a product of a first threshold and the height of the current picture block; and then, when the current picture block does not satisfy the first condition, determining that the block split policy is a split whose split direction is a vertical direction, where the vertical direction is perpendicular to a direction of a side on which the width of the current picture block is located. In this way, when the width of the current picture block is greater than or equal to the product of the first threshold and the height, information indicating a split direction for splitting the current picture block does not need to be encoded into a bitstream. Therefore, transmission bit overheads can be reduced. In addition, this solution helps limit a ratio of the width to the height that are of a leaf node in a coding tree to a specific range, thereby facilitating coding.

In a possible design, the determining a block split policy of a current picture block based on a size relationship between the width and the height of the current picture block may include: determining whether the current picture block satisfies a second condition, where the second condition may include: the height of the current picture block is less than a product of a first threshold and the width of the current picture block; and then, when the current picture block does not satisfy the second condition, determining that the block split policy is a split whose split direction is a horizontal direction, where the horizontal direction is perpendicular to a direction of a side on which the height of the current picture block is located. In this way, when the height of the current picture block is greater than or equal to the product of the first threshold and the width, information indicating a split direction for splitting the current picture block does not need to be encoded into a bitstream. Therefore, transmission bit overheads can be reduced. In addition, this solution helps limit a ratio of the height to the width of a leaf node in a coding tree to a specific range, thereby facilitating coding.

In a possible design, the determining a block split policy of a current picture block based on a size relationship between the width and the height of the current picture block may include: determining whether the current picture block satisfies a first condition, where the first condition may include: the width of the current picture block is less than a product of a first threshold and the height of the current picture block; and then, when the current picture block does not satisfy the first condition, determining that the block split policy of the current picture block does not include a split whose split direction is a horizontal direction, where the horizontal direction is perpendicular to a direction of a side on which the height of the current picture block is located. Based on this, the current picture block may or may not be split subsequently. For example, whether to split the current picture block may be determined according to the block split policy of the current picture block and with reference to other information, such as a minimum CU size principle and a minimum rate-distortion optimization (RDO) principle. If it is determined to split the current picture block, information indicating a split direction for splitting the current picture block does not need to be encoded into a bitstream. Therefore, this solution helps reduce transmission bit overheads. In addition, this solution helps limit a ratio of the width to the height of a leaf node in a coding tree to a specific range, thereby facilitating coding.

In a possible design, the determining a block split policy of a current picture block based on a size relationship between the width and the height of the current picture block may include: determining whether the current picture block satisfies a second condition, where the second condition may include: the height of the current picture block is less than a product of a first threshold and the width of the current picture block; and then, when the current picture block does not satisfy the second condition, determining that the block split policy of the current picture block does not include a split whose split direction is a vertical direction, where the vertical direction is perpendicular to a direction of a side on which the width of the current picture block is located. Based on this, the current picture block may or may not be split subsequently. If it is determined to split the current picture block, information indicating a split direction for splitting the current picture block does not need to be encoded into a bitstream. Therefore, this solution helps reduce transmission bit overheads. In addition, this solution helps limit a ratio of the height to the width of a leaf node in a coding tree to a specific range, thereby facilitating coding.

In a possible design, the first threshold is an allowed maximum value of a ratio of a long-side length to a short-side length of a node in a coding tree (such as the second-level coding tree in the EQT solution).

In a possible design, the first threshold is a value greater than 1. Optionally, the first threshold may be an integer power of 2.

In a possible design, the method may further include: parsing a bitstream to obtain identifier information, where the identifier information is used to indicate a split mode for splitting the current picture block. Correspondingly, the applying the block split policy to the current picture block to obtain a coding block may include: performing, on the current picture block according to the block split policy (which is a block split policy determined when the first condition is not satisfied) by using the split mode indicated by the identifier information, split whose split direction is the vertical direction, to obtain the coding block. In this possible design, the video coding method is a video decoding method.

In a possible design, the method may further include: parsing a bitstream to obtain identifier information, where the identifier information is used to indicate a split mode for splitting the current picture block. Correspondingly, the applying the block split policy to the current picture block to obtain a coding block may include: performing, on the current picture block according to the block split policy (which is a block split policy determined when the second condition is not satisfied) by using the split mode indicated by the identifier information, split whose split direction is the horizontal direction. In this possible design, the video coding method is a video decoding method.

In a possible design, the determining a block split policy of a current picture block based on a size relationship between the width and the height of the current picture block may include: determining whether the current picture block satisfies a third condition, where the third condition may include: the width of the current picture block is less than a product of a second threshold and the height of the current picture block; and then, when the current picture block does not satisfy the third condition, determining that the block split policy is an EQT split whose split direction is a vertical direction, where the vertical direction is perpendicular to a direction of a side on which the width of the current picture block is located. In this way, when the width of the current picture block is greater than or equal to the product of the second threshold and the height, and EQT split is performed on the current picture block, information indicating a split direction for splitting the current picture block does not need to be encoded into a bitstream. Therefore, transmission bit overheads can be reduced. In addition, this solution helps limit a ratio of the width to the height of a leaf node in a coding tree to a specific range, thereby facilitating coding.

In a possible design, the determining a block split policy of a current picture block based on a size relationship between the width and the height of the current picture block may include: determining whether the current picture block satisfies a fourth condition, where the fourth condition may include: the height of the current picture block is less than a product of a second threshold and the width of the current picture block; and then, when the current picture block does not satisfy the fourth condition, determining that the block split policy is an EQT split whose split direction is a horizontal direction, where the horizontal direction is perpendicular to a direction of a side on which the height of the current picture block is located. In this way, when the height of the current picture block is greater than or equal to the product of the second threshold and the width, and EQT split is performed on the current picture block, information indicating a split direction for splitting the current picture block does not need to be encoded into a bitstream. Therefore, transmission bit overheads can be reduced. In addition, this solution helps limit a ratio of the height to the width of a leaf node in a coding tree to a specific range, thereby facilitating coding.

In a possible design, the determining a block split policy of a current picture block based on a size relationship between the width and the height of the current picture block may include: determining whether the current picture block satisfies a third condition, where the third condition may include: the width of the current picture block is less than a product of a second threshold and the height of the current picture block; and then, when the current picture block does not satisfy the third condition, determining that the block split policy of the current picture block does not include an EQT split whose split direction is a horizontal direction, where the horizontal direction is perpendicular to a direction of a side on which the height of the current picture block is located. Based on this, the current picture block may or may not be split subsequently.

In a possible design, the determining a block split policy of a current picture block based on a size relationship between the width and the height of the current picture block may include: determining whether the current picture block satisfies a fourth condition, where the fourth condition may include: the height of the current picture block is less than a product of a second threshold and the width of the current picture block; and then, when the current picture block does not satisfy the fourth condition, determining that the block split policy of the current picture block does not include an EQT split whose split direction is a vertical direction, where the vertical direction is perpendicular to a direction of a side on which the width of the current picture block is located. Based on this, the current picture block may or may not be split subsequently.

In a possible design, the second threshold is one half of an allowed maximum value of a ratio of a long-side length to a short-side length that are of a node in a coding tree (such as the second-level coding tree in the EQT solution).

In a possible design, the second threshold is a value greater than 1. Optionally, the second threshold may be an integer power of 2.

In a possible design, the method may further include: parsing a bitstream to obtain identifier information, where the identifier information is used to indicate a split mode for splitting the current picture block. Correspondingly, the applying the block split policy to the current picture block to obtain a coding block includes: when the identifier information indicates that EQT split is to be performed on the current picture block, performing, on the current picture block according to the block split policy (which is a block split policy determined when the third condition is not satisfied), EQT split whose split direction is the vertical direction. In this possible design, the video coding method is a video decoding method.

In a possible design, the method may further include: parsing a bitstream to obtain identifier information, where the identifier information is used to indicate a split mode for splitting the current picture block. Correspondingly, the applying the block split policy to the current picture block to obtain a coding block includes: when the identifier information indicates that EQT split is to be performed on the current picture block, performing, on the current picture block according to the block split policy (which is a block split policy determined when the fourth condition is not satisfied), EQT split whose split direction is the horizontal direction. In this possible design, the video coding method is a video decoding method.

According to a second aspect, a video coding method is provided, including: if a long-side length of a to-be-split picture block in a to-be-coded picture is twice a short-side length of the to-be-split picture block, performing, on the to-be-split picture block, binary tree split whose split direction is perpendicular to a long side of the to-be-split picture block, to obtain a split picture block. For example, if the width of the to-be-split picture block in the to-be-coded picture is twice the height, vertical binary tree split is performed on the to-be-split picture block to obtain the split picture block. For another example, if the height of the to-be-split picture block in the to-be-coded picture is twice the width, horizontal binary tree split is performed on the to-be-split picture block to obtain the split picture block. Then, the to-be-coded picture is reconstructed based on the split picture block. In this way, the to-be-split picture block is conditionally split. This helps reduce split complexity, so that video coding performance is improved. In addition, if the long-side length of the to-be-split picture block is twice the short-side length of the to-be-split picture block, information indicating a split manner (including a split mode and a split direction) for splitting the current picture block does not need to be encoded into a bitstream. Therefore, transmission bit overheads can be reduced. In addition, the current picture block can be split into two square picture blocks by performing, on the current picture block, binary tree split whose split direction is perpendicular to the long side of the current picture block. Compared with a non-square rectangular picture block, the square picture block has a higher probability of being subsequently split. Therefore, this solution helps improve coding accuracy of a video picture.

In a possible design, the long-side length of the to-be-split picture block is a length of 128 pixels, and the short-side length of the to-be-split picture block is a length of 64 pixels. For example, when a size of the to-be-split picture block is 128×64 (the width is a length of 128 pixels and the height is a length of 64 pixels), vertical binary tree split is performed on the to-be-split picture block. For another example, when a size of the to-be-split picture block is 64×128 (the width is a length of 64 pixels and the height is a length of 128 pixels), horizontal binary tree split is performed on the to-be-split picture block.

In a possible design, the short-side length of the to-be-split picture block is equal to a side size of a maximum transform unit (TU), or the short-side length of the to-be-split picture block is equal to a side size of a virtual pipeline data unit (VPDU).

In a possible design, the to-be-split picture block is a boundary picture block. If one or more pixels in a current node are outside a current picture boundary, it means that the current node is outside the picture boundary. In this case, the current node is a boundary picture block.

According to a third aspect, a video coding method is provided, which may include: if the width of a to-be-split picture block in a to-be-coded picture is greater than the height, performing vertical binary tree split on the to-be-split picture block to obtain a split picture block; and/or if the height of a to-be-split picture block in a to-be-coded picture is greater than the width, performing horizontal binary tree split on the to-be-split picture block to obtain a split picture block. Then, the to-be-coded picture is reconstructed based on the split picture block. In this way, the to-be-split picture block is conditionally split. This helps reduce split complexity, so that video coding performance is improved. In addition, in this solution, information indicating a split manner (including a split mode and a split direction) for splitting the current picture block does not need to be encoded into a bitstream. Therefore, transmission bit overheads can be reduced. In addition, in this solution, the current picture block is split into two square picture blocks. Compared with a non-square rectangular picture block, the square picture block has a higher probability of being subsequently split. Therefore, this solution helps improve coding accuracy of a video picture.

In a possible design, when a size of the to-be-split picture block is 128×64 (the width is a length of 128 pixels and the height is a length of 64 pixels), vertical binary tree split is performed on the to-be-split picture block.

In a possible design, when a size of the to-be-split picture block is 64×128 (the width is a length of 64 pixels and the height is a length of 128 pixels), horizontal binary tree split is performed on the to-be-split picture block.

In a possible design, the to-be-split picture block is a boundary picture block.

According to a fourth aspect, a video coding method is provided, which may include: determining, based on whether a current picture block satisfies a first condition, whether a binary tree split in a horizontal direction is allowed to be performed on the current picture block, where the horizontal direction is perpendicular to a direction of a side on which the height of the current picture block is located, the first condition may include: the width of the current picture block is less than a product of a first threshold and the height of the current picture block, and when the current picture block satisfies the first condition, it is determined that the binary tree split in the horizontal direction is allowed to be performed on the current picture block; obtaining a coding block of the current picture block when determining that the binary tree split in the horizontal direction is allowed to be performed on the current picture block; and reconstructing the obtained coding block to reconstruct the current picture block. In this way, the current picture block is conditionally split, to obtain the coding block. This helps reduce split complexity, so that video coding performance is improved.

According to a fifth aspect, a video coding method is provided, which may include: determining, based on whether a current picture block satisfies a second condition, whether a binary tree split in a vertical direction is allowed to be performed on the current picture block, where the vertical direction is perpendicular to a direction of a side on which the width of the current picture block is located, the second condition may include: the height of the current picture block is less than a product of a first threshold and the width of the current picture block, and when the current picture block satisfies the second condition, it is determined that the binary tree split in the vertical direction is allowed to be performed on the current picture block; obtaining a coding block of the current picture block when determining that the binary tree split in the vertical direction is allowed to be performed on the current picture block; and reconstructing the obtained coding block to reconstruct the current picture block. In this way, the current picture block is conditionally split, to obtain the coding block. This helps reduce split complexity, so that video coding performance is improved.

According to a sixth aspect, a video coding method is provided, which may include: determining, based on whether a current picture block satisfies a first condition, whether a split in a horizontal direction is allowed to be performed on the current picture block, where the horizontal direction is perpendicular to a direction of a side on which the height of the current picture block is located, the first condition may include: the width of the current picture block is less than a product of a first threshold and the height of the current picture block, and when the current picture block does not satisfy the first condition, it is determined that the split in the horizontal direction is not allowed to be performed on the current picture block; obtaining a coding block of the current picture block when determining that the split in the horizontal direction is not allowed to be performed on the current picture block; and reconstructing the obtained coding block to reconstruct the current picture block. In this way, the current picture block is conditionally split, to obtain the coding block. This helps reduce split complexity, so that video coding performance is improved.

According to a seventh aspect, a video coding method is provided, which may include: determining, based on whether a current picture block satisfies a second condition, whether a split in a vertical direction is allowed to be performed on the current picture block, where the vertical direction is perpendicular to a direction of a side on which the width of the current picture block is located, the second condition may include: the height of the current picture block is less than a product of a first threshold and the width of the current picture block, and when the current picture block does not satisfy the second condition, it is determined that the split in the vertical direction is not allowed to be performed on the current picture block; obtaining a coding block of the current picture block when determining that the split in the vertical direction is not allowed to be performed on the current picture block; and reconstructing the obtained coding block to reconstruct the current picture block. In this way, the current picture block is conditionally split, to obtain the coding block. This helps reduce split complexity, so that video coding performance is improved.

According to an eighth aspect, a video coding apparatus is provided. The apparatus may include modules (or units) configured to perform the method in any one of the first aspect, the second aspect, or the third aspect, or the possible designs of the first aspect, the second aspect, or the third aspect.

According to a ninth aspect, a video coder is provided. The video coder may include a nonvolatile memory and a processor that are coupled to each other. The processor invokes program code stored in the memory to perform some or all steps of the method in any one of the first aspect to the seventh aspect, or any one of the possible designs of the first aspect to the seventh aspect.

According to a tenth aspect, a computer-readable storage medium is provided. The computer-readable storage medium may store program code, and the program code may include instructions used to perform some or all steps of the method in any one of the first aspect to the seventh aspect, or any one of the implementations of the first aspect to the seventh aspect.

According to an eleventh aspect, a computer program product is provided. When the computer program product runs on a computer, the computer may be enabled to perform instructions of some or all steps of the method in any one of the first aspect to the seventh aspect, or any one of the implementations of the first aspect to the seventh aspect.

It may be understood that for beneficial effects of any video coding apparatus, video coder, computer-readable storage medium, and computer program product provided above, refer to the beneficial effects of the method embodiments provided in the foregoing corresponding aspects. Details are not described herein.

BRIEF DESCRIPTION OF DRAWINGS

FIG. 5 is a schematic block diagram of an implementation of a coding device according to an embodiment;

FIG. 6(*a*) is a schematic diagram of a split manner applicable to an embodiment;

FIG. 6(*b*) is another schematic diagram of a split manner applicable to an embodiment;

FIG. 6(*c*) is another schematic diagram of a split manner applicable to an embodiment;

FIG. 6(*d*) is another schematic diagram of a split manner applicable to an embodiment;

FIG. 6(*e*) is another schematic diagram of a split manner applicable to an embodiment;

DETAILED DESCRIPTION OF THE EMBODIMENTS

Figure 1A:
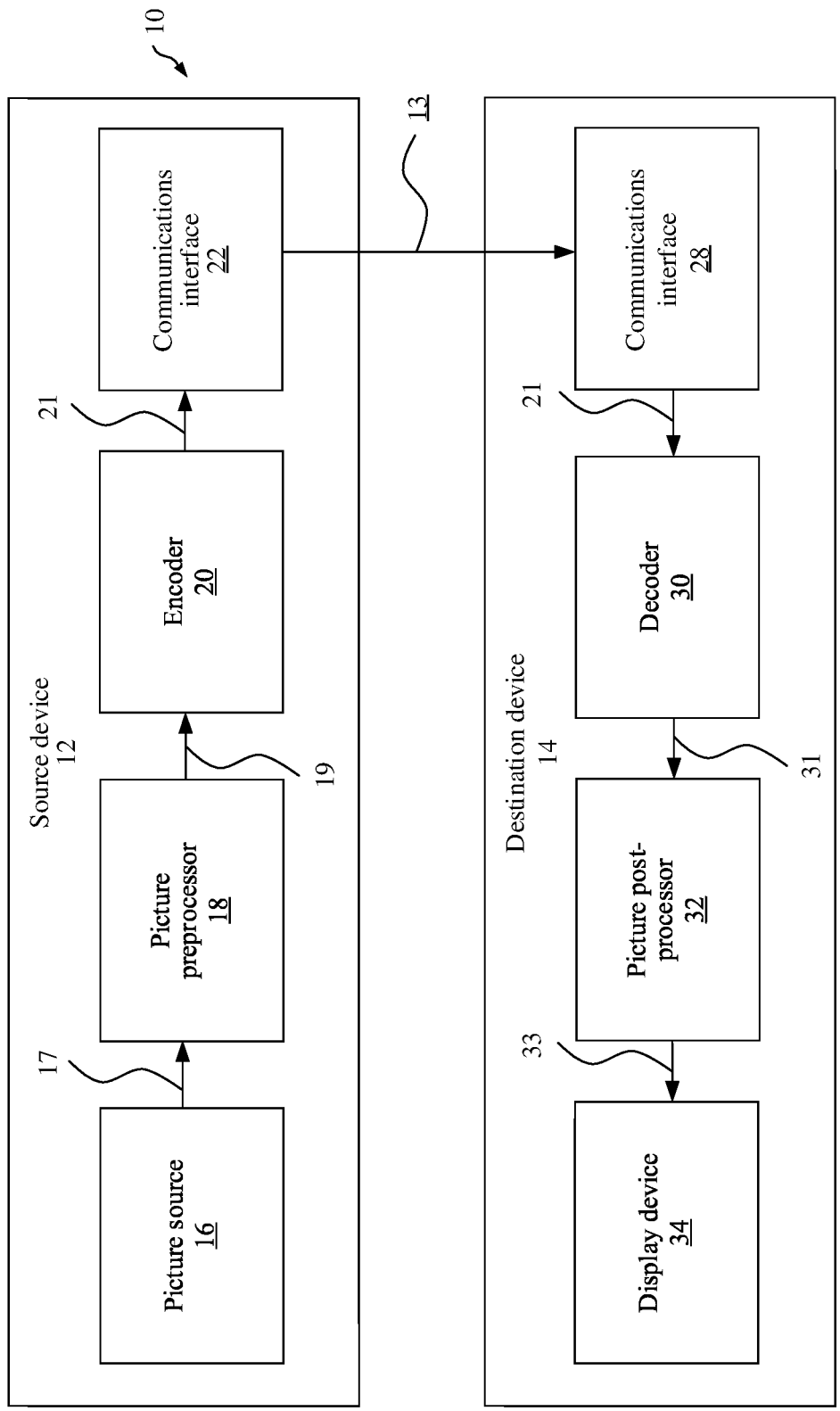
FIG. 1A is a schematic block diagram of a video encoding and decoding system according to an embodiment.

The following describes the embodiments with reference to the accompanying drawings. In the following description, reference is made to the accompanying drawings and show, by way of illustration, aspects of the embodiments or aspects in which the embodiments may be used. It may be understood that the embodiments may be used in other aspects, and may include structural or logical changes not depicted in the accompanying drawings. Therefore, the following detailed description are non-limiting. It may be understood that disclosed content in combination with a described method may also hold true for a corresponding device or system configured to perform the method and vice versa. For example, if one or more method steps are described, a corresponding device may include one or more units such as functional units to perform the described one or more method steps (for example, one unit performing the one or more steps, or a plurality of units each performing one or more of the plurality of steps), even if such one or more units are not explicitly described or illustrated in the accompanying drawings. In addition, if an apparatus is described based on one or more units such as functional units, a corresponding method may include a step used to perform functionality of the one or more units (for example, one step used to perform the functionality of the one or more units, or a plurality of steps each used to perform functionality of one or more of a plurality of units), even if such one or more or more steps are not explicitly described or illustrated in the accompanying drawings. Further, it may be understood that features of various example embodiments and/or aspects described may be combined with each other, unless otherwise specified.

Video coding typically refers to processing of a sequence of pictures, where the sequence of pictures forms a video or a video sequence. In the video coding field, the terms "picture", "frame", and "image" may be used as synonyms. Video coding may refers to video encoding or video decoding. Video encoding is performed on a source side, and usually includes processing (for example, through compression) an original video picture to reduce an amount of data for representing the video picture, for more efficient storage and/or transmission. Video decoding is performed on a destination side, and usually includes inverse processing relative to an encoder to reconstruct the video picture. "Coding" of a video picture in the embodiments may be understood as "encoding" or "decoding" of a video sequence. A combination of an encoding part and a decoding part may also be referred to as coding (encoding and decoding).

A video sequence includes a series of pictures, a picture is further partitioned into slices, and a slice is further partitioned into blocks. Video coding is performed by block. In some new video coding standards, the concept "block" is further extended. For example, a macroblock may further be partitioned into a plurality of prediction blocks (partition) that can be used for predictive coding. Alternatively, basic concepts such as "coding unit" (namely, CU), "prediction unit" (PU), and "transform unit" (namely, TU) are used. A plurality of types of block units are obtained through function division, and are described by using a new tree-based structure. A PU and a TU also have similar tree structures. The PU may correspond to a prediction block, and is a basic unit for predictive coding. The CU is further partitioned into a plurality of PUs in a partitioning mode. The TU may correspond to a transform block, and is a basic unit for transforming a prediction residual. However, in essence, all of the CU, the PU, and the TU are conceptually blocks (or referred to as picture blocks).

A coding tree unit (in a coding tree (CTU)) is partitioned into a plurality of CUs by using a quadtree structure represented as a coding tree. A decision on whether to encode a picture region through inter (temporal) or intra (spatial) prediction is made at a CU level. Each CU may further be partitioned into one, two, or four PUs based on a PU partitioning pattern. In one PU, a same prediction process is applied, and related information is transmitted to a decoder on a PU basis. After a residual block is obtained by applying the prediction process based on the PU partitioning pattern, the CU may be partitioned into TUs based on another quadtree structure similar to the coding tree used for the CU. In the recent development of video compression technologies, a quadtree plus binary tree (QTBT) partition frame is used to partition a coding block. In a QTBT block structure, the CU may be square or rectangular.

For ease of description and understanding, a to-be-encoded picture block in a current coded picture may be referred to as a current block (or current picture block). For example, in encoding, the current block is a block that is being encoded, and in decoding, the current block is a block that is being decoded. A decoded picture block, in a reference picture, used to predict the current block is referred to as a reference block. The reference block is a block that provides a reference signal for the current block, and the reference signal represents a pixel value in the picture block. A block that is in the reference picture and that provides a prediction signal for the current block may be referred to as a prediction block. The prediction signal represents a pixel value, a sampling value, or a sampling signal in the prediction block. For example, after a plurality of reference blocks are traversed, an optimal reference block is found. The optimal reference block provides prediction for the current block, and this block is referred to as a prediction block.

In a case of lossless video coding, an original video picture may be reconstructed. A reconstructed video picture has same quality as the original video picture (assuming that no transmission loss or other data loss occurs during storage or transmission). In a case of lossy video coding, further compression is performed through, for example, quantization, to reduce an amount of data for representing a video picture, but the video picture cannot be completely reconstructed on a decoder side. Therefore, quality of a reconstructed video picture is lower or poorer than that of the original video picture.

Several H.261 video coding standards are for "lossy hybrid video coding" (meaning spatial and temporal prediction in a sample domain is combined with 2D transform coding for applying quantization in a transform domain). Each picture of a video sequence is usually partitioned into a set of non-overlapping blocks, and coding is usually performed at a block level. On an encoder side, a video is usually processed, that is, encoded, at a block (video block) level. For example, a prediction block is generated through spatial (intra) prediction and temporal (inter) prediction, the prediction block is subtracted from a current block (a block being processed or to be processed) to obtain a residual block, and the residual block is transformed in the transform domain and quantized to reduce an amount of data that is to be transmitted (compressed). On a decoder side, an inverse processing part relative to an encoder is applied to an encoded block or a compressed block to reconstruct the current block for representation. Furthermore, the encoder duplicates a processing loop of a decoder, so that the encoder and the decoder generate same prediction (for example, intra prediction and inter prediction) and/or reconstruction, to process, that is, to code, subsequent blocks.

The following describes a system architecture to which the embodiments are applied. FIG. 1A is a schematic block diagram of an example of a video encoding and decoding system 10 to which the embodiments are applied. As shown in FIG. 1A, the video encoding and decoding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. In various implementation solutions, the source device 12, the destination device 14, or both the source device 12 and the destination device 14 may include one or more processors and a memory coupled to the one or more processors. The memory may include but is not limited to a random access memory (RAM), a read only memory (ROM), an electrically erasable programmable ROM (EEPROM), a flash memory, or any other medium that can be used to store desired program code in a form of an instruction or a data structure accessible to a computer.

A communication connection between the source device 12 and the destination device 14 may be implemented through a link 13, and the destination device 14 may receive the encoded video data from the source device 12 through the link 13. The link 13 may include one or more media or apparatuses capable of moving the encoded video data from the source device 12 to the destination device 14. In an example, the link 13 may include one or more communications media that enable the source device 12 to directly transmit the encoded video data to the destination device 14 in real time. In this example, the source device 12 may modulate the encoded video data according to a communications standard (for example, a wireless communications protocol), and may transmit modulated video data to the destination device 14. The one or more communications media may include a wireless communications medium and/or a wired communications medium, for example, a radio frequency (RF) spectrum or one or more physical transmission cables. The one or more communications media may be a part of a packet-based network, and the packet-based network is, for example, a local area network, a wide area network, or a global network (for example, the internet). The one or more communications media may include a router, a switch, a base station, or another device that facilitates communication from the source device 12 to the destination device 14.

The source device 12 may include an encoder 20. The source device 12 may further include a picture source 16, a picture preprocessor 18, and a communications interface 22. In an implementation form, the encoder 20, the picture source 16, the picture preprocessor 18, and the communications interface 22 may be hardware components in the source device 12, or may be software programs in the source device 12. Descriptions are separately provided as follows:

The picture source 16 may include or be any type of picture capturing device configured to, for example, capture a real-world picture; and/or any type of device for generating a picture or comment (for screen content encoding, some text on a screen is also considered as a part of a to-be-encoded picture or image), for example, a computer graphics processor configured to generate a computer animation picture; or any type of device configured to obtain and/or provide a real-world picture or a computer animation picture (for example, screen content or a virtual reality (VR) picture), and/or any combination thereof (for example, an augmented reality (AR) picture). The picture source 16 may be a camera configured to capture a picture or a memory configured to store a picture. The picture source 16 may further include any type of (internal or external) interface through which a previously captured or generated picture is stored and/or or a picture is obtained or received. When the picture source 16 is a camera, the picture source 16 may be, for example, a local camera or an integrated camera integrated into the source device. When the picture source 16 is a memory, the picture source 16 may be a local memory or, for example, an integrated memory integrated into the source device. When the picture source 16 includes an interface, the interface may be, for example, an external interface for receiving a picture from an external video source. The external video source is, for example, an external picture capturing device such as a camera, an external memory, or an external picture generation device. The external picture generation device is, for example, an external computer graphics processor, a computer, or a server. The interface may be any type of interface, for example, a wired or wireless interface or an optical interface, according to any proprietary or standardized interface protocol.

A picture may be considered as a two-dimensional array or matrix of picture elements (picture element). The picture element in the array may also be referred to as a sample. Quantities of samples in horizontal and vertical directions (or axes) of the array or the picture define a size and/or resolution of the picture. For color representation, three color components are usually used. The picture may be represented as or include three sample arrays. For example, in an RBG format or color space, the picture includes corresponding red, green, and blue sample arrays. However, in video coding, each pixel is usually represented in a luma/chroma format or color space. For example, a picture in a YUV format includes a luma component indicated by Y (sometimes indicated by L alternatively) and two chroma components indicated by U and V. The luminance (luma) component Y represents brightness or gray level intensity (for example, both are the same in a gray-scale picture), and the two chrominance (chroma) components U and V represent chrominance or color information components. Correspondingly, the picture in the YUV format includes a luma sample array of luma sample values (Y) and two chroma sample arrays of chroma values (U and V). A picture in an RGB format may be transformed or converted into a YUV format and vice versa. This process is also referred to as color conversion or transformation. If a picture is monochrome, the picture may include only a luma sample array. In an embodiment, a picture transmitted by the picture source 16 to the picture processor may also be referred to as raw picture data 17.

The picture preprocessor 18 is configured to receive the raw picture data 17 and perform preprocessing on the raw picture data 17 to obtain a preprocessed picture 19 or preprocessed picture data 19. For example, the preprocessing performed by the picture preprocessor 18 may include trimming, color format conversion (for example, from an RGB format to a YUV format), color correction, or de-noising.

The encoder 20 (or referred to as a video encoder 20) is configured to receive the preprocessed picture data 19, and process the preprocessed picture data 19 in a related prediction mode (such as a prediction mode in the embodiments), to provide encoded picture data 21 (structural details of the encoder 20 are further described below based on FIG. 2, FIG. 4, or FIG. 5). In some embodiments, the encoder 20 may be configured to perform various embodiments described below, to implement encoder-side application of a split method described.

The communications interface 22 may be configured to receive the encoded picture data 21, and transmit the encoded picture data 21 to the destination device 14 or any other device (for example, a memory) through the link 13 for storage or direct reconstruction. The other device may be any device used for decoding or storage. The communications interface 22 may be, for example, configured to encapsulate the encoded picture data 21 into an appropriate format, for example, a data packet, for transmission over the link 13.

The destination device 14 includes a decoder 30. Optionally, the destination device 14 may further include a communications interface 28, a picture post-processor 32, and a display device 34. Descriptions are separately provided as follows:

The communications interface 28 may be configured to receive the encoded picture data 21 from the source device 12 or any other source. The any other source is, for example, a storage device. The storage device is, for example, an encoded picture data storage device. The communications interface 28 may be configured to transmit or receive the encoded picture data 21 through the link 13 between the source device 12 and the destination device 14 or through any type of network. The link 13 is, for example, a direct wired or wireless connection. The any type of network is, for example, a wired or wireless network or any combination thereof, or any type of private or public network or any combination thereof. The communications interface 28 may be, for example, configured to decapsulate the data packet transmitted through the communications interface 22, to obtain the encoded picture data 21.

Both the communications interface 28 and the communications interface 22 may be configured as unidirectional communications interfaces or bidirectional communications interfaces, and may be configured to, for example, send and receive messages to establish a connection, and acknowledge and exchange any other information related to a communication link and/or data transmission such as encoded picture data transmission.

The decoder 30 is configured to receive the encoded picture data 21 and provide decoded picture data 31 or a decoded picture 31 (structural details of the decoder 30 are further described below based on FIG. 3, FIG. 4, or FIG. 5). In some embodiments, the decoder 30 may be configured to perform various embodiments described below, to implement decoder-side application of a split method described.

The picture post-processor 32 is configured to post-process the decoded picture data 31 (also referred to as reconstructed picture data) to obtain post-processed picture data 33. The post-processing performed by the picture post-processor 32 may include color format conversion (for example, from a YUV format to an RGB format), color correction, trimming, re-sampling, or any other processing. The picture post-processor 32 may be further configured to transmit the post-processed picture data 33 to the display device 34.

The display device 34 is configured to receive the post-processed picture data 33 to display a picture to, for example, a user or a viewer. The display device 34 may be or may include any type of display for presenting a reconstructed picture, for example, an integrated or external display or monitor. For example, the display may include a liquid crystal display (LCD), an organic light-emitting diode (OLED) display, a plasma display, a projector, a micro LED display, a liquid crystal on silicon (LCoS), a digital light processor (DLP), or any type of other display.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

Based on the descriptions, a person of ordinary skill in the art may understand that existence and (exact) division of functionalities of different units or functionalities of the source device 12 and/or the destination device 14 shown in FIG. 1A may vary depending on the actual device and application. The source device 12 and the destination device 14 may include any of a wide range of devices, including any type of handheld or stationary device, for example, a notebook or laptop computer, a mobile phone, a smartphone, a tablet or tablet computer, a video camera, a desktop computer, a set-top box, a television, a camera, a vehicle-mounted device, a display device, a digital media player, a video game console, a video streaming device (such as a content service server or a content delivery server), a broadcast receiver device, or a broadcast transmitter device, and may use or not use any type of operating system.

The encoder 20 and the decoder 30 each may be implemented as any of various suitable circuits, for example, one or more microprocessors, digital signal processors (DSP), application-specific integrated circuits (ASIC), field-programmable gate arrays (FPGA), discrete logic, hardware, or any combination thereof. If the technologies are implemented partially by using software, a device may store a software instruction in a suitable non-transitory computer-readable storage medium and may execute the instruction by using hardware such as one or more processors, to perform the technologies of the embodiments. Any of the foregoing content (including hardware, software, a combination of hardware and software, and the like) may be considered as one or more processors.

In some cases, the video encoding and decoding system 10 shown in FIG. 1A is merely an example and the techniques may be applied to video coding settings (for example, video encoding or video decoding) that do not necessarily include any data communication between an encoding device and a decoding device. In another example, data may be retrieved from a local memory, streamed over a network, or the like. A video encoding device may encode the data and store the data into a memory, and/or a video decoding device may retrieve the data from the memory and decode the data. In some examples, devices that only encode data and store the data in the memory and/or retrieve the data from the memory and decode the data and that do not communicate with each other perform encoding and decoding.

Figure 1B:
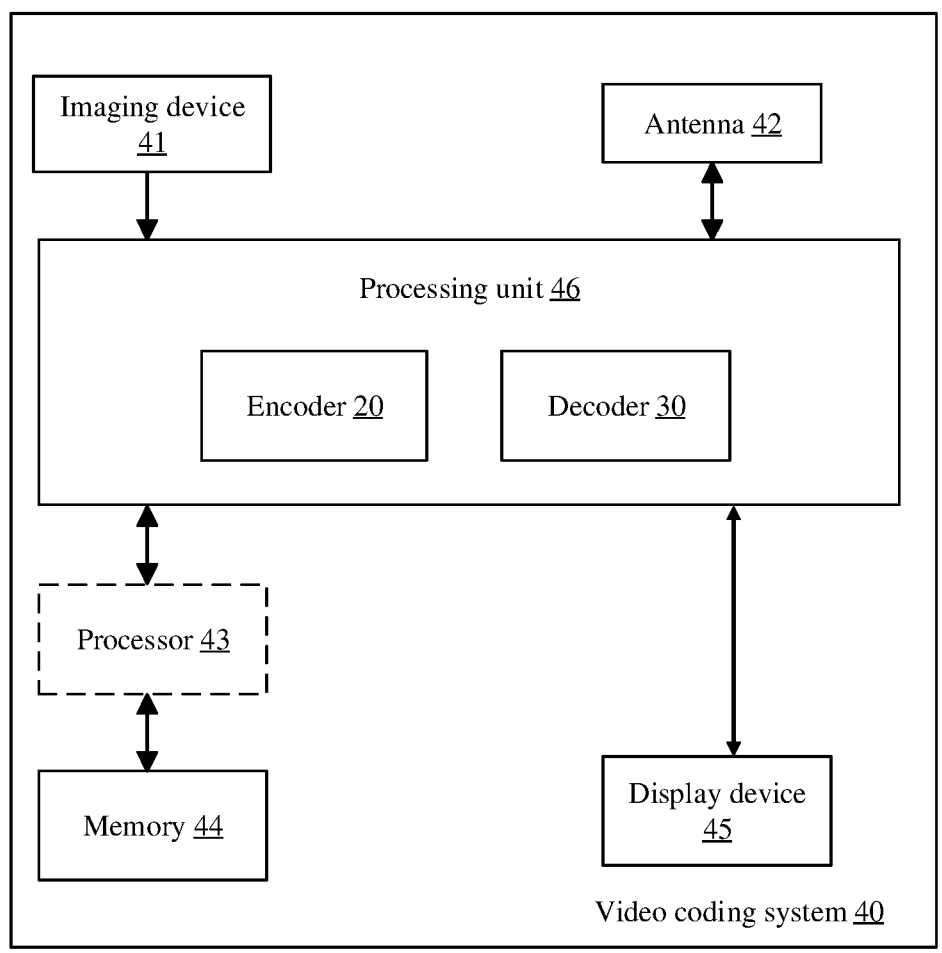
FIG. 1B is a schematic block diagram of another video encoding and decoding system according to an embodiment.
Figure 2:
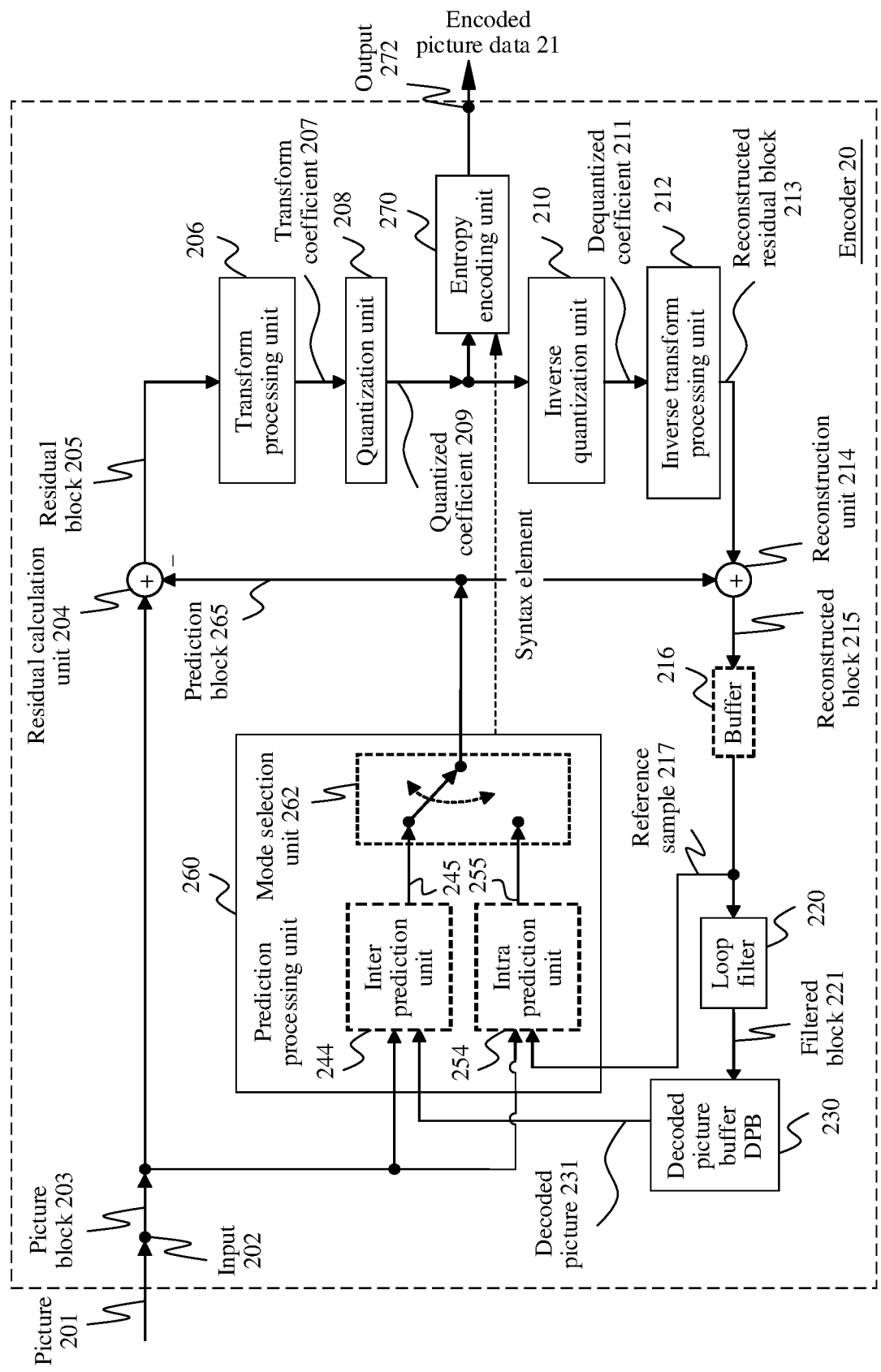
FIG. 2 is a schematic/conceptual block diagram of an example of an encoder according to an embodiment.
Figure 3:
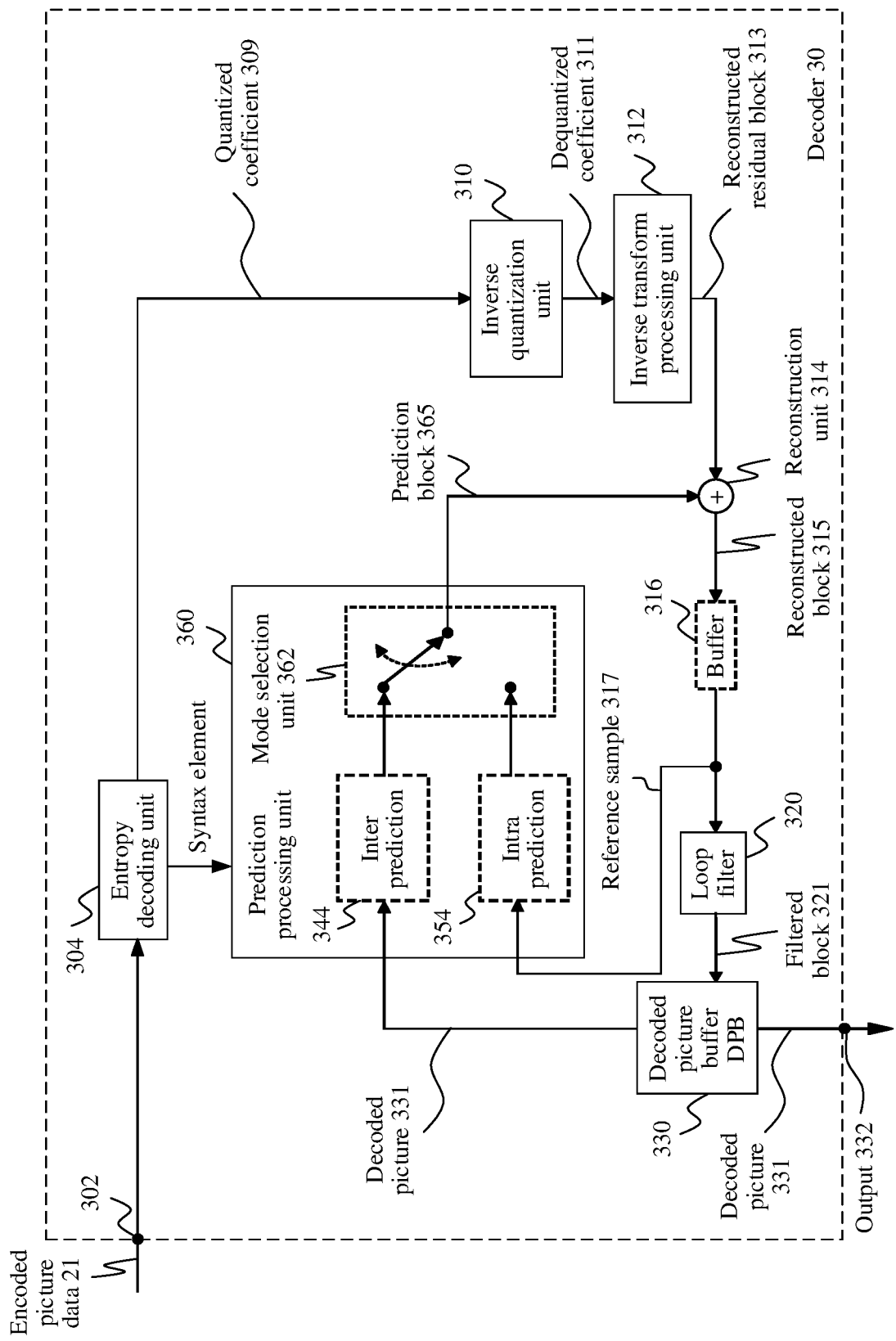
FIG. 3 is a schematic/conceptual block diagram of an example of a decoder according to an embodiment.

FIG. 1B is an illustrative diagram of an example of a video coding system 40 including an encoder 20 in FIG. 2 and/or a decoder 30 in FIG. 3 according to an example embodiment. The video coding system 40 can implement a combination of various technologies in the embodiments. In the illustrated implementation, the video coding system 40 may include an imaging device 41, the encoder 20, the decoder 30 (and/or a video encoder/decoder implemented by a logic circuit of a processing unit 46), an antenna 42, one or more processors 43, one or more memories 44, and/or a display device 45.

As shown in FIG. 1B, the imaging device 41, the antenna 42, the processing unit 46, the encoder 20, the decoder 30, the processor 43, the memory 44, and/or the display device 45 can communicate with each other. As described, although the video coding system 40 is illustrated with the encoder 20 and the decoder 30, the video coding system 40 may include only the encoder 20 or only the decoder 30 in different examples.

In some examples, the antenna 42 may be configured to transmit or receive an encoded bitstream of video data. In addition, in some examples, the display device 45 may be configured to present the video data. In some examples, the logic circuit may be implemented by the processing unit 46. The processing unit 46 may include ASIC logic, a graphics processor, a general-purpose processor, or the like. The video coding system 40 may also include the optional processor 43. The optional processor 43 may similarly include ASIC logic, a graphics processor, a general-purpose processor, or the like. In some examples, the logic circuit may be implemented by hardware, for example, video coding dedicated hardware, and the processor 43 may be implemented by general-purpose software, an operating system, or the like. In addition, the memory 44 may be any type of memory, for example, a volatile memory (for example, a static random access memory (SRAM) or a dynamic random access memory (DRAM)), or a nonvolatile memory (for example, a flash memory). In a non-restrictive example, the memory 44 may be implemented by cache memory. In some examples, the logic circuit may access the memory 44 (for example, for implementing a picture buffer). In other examples, the logic circuit and/or the processing unit 46 may include a memory (for example, a cache) for implementing a picture buffer.

In some examples, the encoder 20 implemented by using the logic circuit may include a picture buffer (which is implemented by, for example, the processing unit 46 or the memory 44) and a graphics processing unit (which is implemented by, for example, the processing unit 46). The graphics processing unit may be communicatively coupled to the picture buffer. The graphics processing unit may include the encoder 20 implemented by using the logic circuit, to implement various modules that are described with reference to FIG. 2 and/or any other encoder system or subsystem. The logic circuit may be configured to perform various operations.

In some examples, the decoder 30 may be implemented by the logic circuit in a similar manner, to implement various modules that are described with reference to the decoder 30 in FIG. 3 and/or any other decoder system or subsystem. In some examples, the decoder 30 implemented by using the logic circuit may include a picture buffer (which is implemented by the processing unit or the memory 44) and a graphics processing unit (which is implemented by, for example, the processing unit 46). The graphics processing unit may be communicatively coupled to the picture buffer. The graphics processing unit may include the decoder 30 implemented by using the logic circuit, to implement various modules that are described with reference to FIG. 3 and/or any other decoder system or subsystem.

In some examples, the antenna 42 may be configured to receive an encoded bitstream of video data. As described, the encoded bitstream may include data, an indicator, an index, mode selection data, or the like that is related to video frame encoding and that is described, for example, data related to coding partitioning (for example, a transform coefficient or a quantized transform coefficient, an optional indicator (as described), and/or data defining the coding partitioning). The video coding system 40 may further include the decoder 30 that is coupled to the antenna 42 and that is configured to decode the encoded bitstream. The display device 45 is configured to present a video frame.

It may be understood that, in an embodiment, for the example described with reference to the encoder 20, the decoder 30 may be configured to perform an inverse process. With regard to signaling a syntax element, the decoder 30 may be configured to receive and parse such a syntax element and correspondingly decode related video data. In some examples, the encoder 20 may entropy-encode the syntax element into an encoded video bitstream. In such examples, the decoder 30 may parse the syntax element and correspondingly decode the related video data.

It may be noted that a decoding method described in the embodiments is mainly used in a decoding process, and this process exists on both the encoder 20 and the decoder 30.

FIG. 2 is a schematic/conceptual block diagram of an example of an encoder 20 according to an embodiment. In the example in FIG. 2, the encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown in the figure). The encoder 20 shown in FIG. 2 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the DPB 230, and the prediction processing unit 260 form a backward signal path of the encoder. The backward signal path of the encoder corresponds to a signal path of a decoder (refer to a decoder 30 in FIG. 3).

The encoder 20 may receive, for example, via an input 202, a picture 201 or a picture block 203 of the picture 201, for example, a picture in a sequence of pictures forming a video or a video sequence. The picture block 203 may also be referred to as a current picture block or a to-be-encoded picture block, and the picture 201 may be referred to as a current picture or a to-be-encoded picture (particularly in video coding, for distinguishing the current picture from other pictures, for example, previously encoded and/or decoded pictures in a same video sequence, namely, the video sequence that also includes the current picture).

An embodiment of the encoder 20 may include a partitioning unit (not depicted in FIG. 2), configured to partition the picture 201 into a plurality of blocks such as the picture block 203. The picture 201 is usually partitioned into a plurality of non-overlapping blocks. The partitioning unit may be configured to use a same block size for all pictures in the video sequence and a corresponding grid defining the block size, or change a block size between pictures or subsets or groups of pictures, and partition each picture into corresponding blocks.

In an example, the prediction processing unit 260 of the encoder 20 may be configured to perform any combination of the partitioning technologies described above.

Like the picture 201, the picture block 203 is also or may be considered as a two-dimensional array or matrix of samples with sample values, although a size of the picture block 203 is smaller than a size of the picture 201. The picture block 203 may include, for example, one sample array (for example, a luma array in a case of a monochrome picture 201), three sample arrays (for example, one luma array and two chroma arrays in a case of a color picture), or any other quantity and/or type of arrays depending on an applied color format. Quantities of samples in horizontal and vertical directions (or axes) of the picture block 203 define a size of the picture block 203.

The encoder 20 shown in FIG. 2 is configured to encode the picture 201 block by block, for example, perform encoding and prediction on each picture block 203.

The residual calculation unit 204 is configured to calculate a residual block 205 based on the picture block 203 and a prediction block 265 (further details about the prediction block 265 are provided below), for example, by subtracting sample values of the prediction block 265 from sample values of the picture block 203 sample by sample (pixel by pixel), to obtain the residual block 205 in a sample domain.

The transform processing unit 206 is configured to apply a transform, for example, a discrete cosine transform (DCT) or a discrete sine transform (DST), to sample values of the residual block 205 to obtain transform coefficients 207 in a transform domain. The transform coefficient 207 may also be referred to as a transform residual coefficient and represents the residual block 205 in the transform domain.

The transform processing unit 206 may be configured to apply integer approximations of DCT/DST, such as transforms specified in AVS, AVS2, or AVS3. Compared with an orthogonal DCT transform, such integer approximations are usually scaled based on a factor. To preserve a norm of a residual block which is processed by using forward and inverse transforms, an additional scale factor is applied as a part of the transform process. The scale factor may be selected based on some constraints. For example, the scale factor is a power of two for a shift operation, a bit depth of the transform coefficient, and a tradeoff between accuracy and implementation costs. For example, a specific scale factor is specified for the inverse transform by, for example, the inverse transform processing unit 212 on a decoder 30 side (and for a corresponding inverse transform by, for example, the inverse transform processing unit 212 on an encoder 20 side), and correspondingly, a corresponding scale factor may be specified for the forward transform by the transform processing unit 206 on the encoder 20 side.

The quantization unit 208 is configured to quantize the transform coefficients 207 to obtain quantized transform coefficients 209, for example, by applying scalar quantization or vector quantization. The quantized transform coefficient 209 may also be referred to as a quantized residual coefficient 209. A quantization process may reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter. For example, for scalar quantization, different scales may be applied to achieve finer or coarser quantization. A smaller quantization step size corresponds to finer quantization, and a larger quantization step size corresponds to coarser quantization. An appropriate quantization step size may be indicated by a quantization parameter. For example, the quantization parameter may be an index to a predefined set of appropriate quantization step sizes. For example, a smaller quantization parameter may correspond to finer quantization (a smaller quantization step size) and a larger quantization parameter may correspond to coarser quantization (a larger quantization step size), and vice versa. The quantization may include division by a quantization step size and corresponding quantization or inverse quantization, for example, performed by the inverse quantization unit 210, or may include multiplication by a quantization step size. In embodiments according to some standards such as AVS, AVS2, and AVS3, a quantization parameter may be used to determine the quantization step size. Generally, the quantization step size may be calculated based on a quantization parameter by using a fixed point approximation of an equation including division. Additional scale factors may be introduced for quantization and dequantization to restore a norm of a residual block, where the norm of the residual block may be modified because of a scale used in the fixed point approximation of the equation for the quantization step size and the quantization parameter. In an exemplary implementation, a scale of the inverse transform may be combined with a scale of the dequantization. Alternatively, a customized quantization table may be used and signaled from an encoder to a decoder, for example, in a bitstream. The quantization is a lossy operation, where a larger quantization step size indicates a higher loss.

The inverse quantization unit 210 is configured to apply the inverse quantization of the quantization unit 208 to a quantized coefficient to obtain a dequantized coefficient 211, for example, apply, based on or by using a same quantization step size as the quantization unit 208, the inverse of a quantization scheme applied by the quantization unit 208. The dequantized coefficient 211 may also be referred to as a dequantized residual coefficient 211, and correspond to the transform coefficient 207, although the dequantized coefficient 211 is usually different from the transform coefficient due to a loss caused by quantization.

The inverse transform processing unit 212 is configured to apply an inverse transform of the transform applied by the transform processing unit 206, for example, an inverse DCT or an inverse DST, to obtain an inverse transform block 213 in the sample domain. The inverse transform block 213 may also be referred to as an inverse transform dequantized block 213 or an inverse transform residual block 213.

The reconstruction unit 214 (for example, a summator 214) may be configured to add the inverse transform block 213 (that is, a reconstructed residual block 213) to the prediction block 265, for example, by adding sample values of the reconstructed residual block 213 and the sample values of the prediction block 265, to obtain a reconstructed block 215 in the sample domain.

A buffer unit 216 (or briefly referred to as a "buffer" 216), for example, a line buffer 216, may be configured to buffer or store the reconstructed block 215 and a corresponding sample value, for example, for intra prediction. In other embodiments, the encoder may be configured to use unfiltered reconstructed blocks and/or corresponding sample values stored in the buffer unit 216 for any type of estimation and/or prediction, for example, intra prediction.

For example, in an embodiment, the encoder 20 may be configured so that the buffer unit 216 is configured to store not only the reconstructed block 215 used for the intra prediction unit 254 but also a reconstructed block (not shown in FIG. 2) used for the loop filter unit 220 and/or so that, for example, the buffer unit 216 and the decoded picture buffer 230 form one buffer. In another embodiment, a filtered block 221 and/or a block or sample (not shown in FIG. 2) from the decoded picture buffer 230 may be used as an input or a basis for the intra prediction unit 254.

The loop filter unit 220 (or briefly referred to as a "loop filter" 220) is configured to filter the reconstructed block 215 to obtain the filtered block 221, to smooth pixel transition or improve video quality. The loop filter unit 220 is intended to represent one or more loop filters such as a deblocking filter, a sample-adaptive offset (SAO) filter, or another filter, for example, a bilateral filter, an adaptive loop filter (ALF), a sharpening or smoothing filter, or a collaborative filter. Although the loop filter unit 220 is shown as an in-loop filter in FIG. 2, in another configuration, the loop filter unit 220 may be implemented as a post filter. The filtered block 221 may also be referred to as a filtered reconstructed block 221. The decoded picture buffer 230 may store a reconstructed encoded block after the loop filter unit 220 performs a filtering operation on the reconstructed encoded block.

In an embodiment, the encoder 20 (correspondingly, the loop filter unit 220) may be configured to output a loop filter parameter (for example, SAO information), for example, directly or after entropy encoding performed by the entropy encoding unit 270 or any other entropy encoding unit, so that the decoder 30 can receive and apply the same loop filter parameter for decoding.

The DPB 230 may be a reference picture memory that stores reference picture data for use in video data encoding by the encoder 20. The DPB 230 may include any one of a variety of memory devices such as a DRAM (including a synchronous DRAM (SDRAM), a magnetoresistive RAM (MRAM), or a resistive RAM (RRAM)), or other types of memory devices. The DPB 230 and the buffer 216 may be provided by a same memory device or separate memory devices. In an exemplary embodiment, the DPB 230 is configured to store the filtered block 221. The decoded picture buffer 230 may further be configured to store other previously filtered blocks, for example, previously reconstructed and filtered blocks 221, of the same current picture or of different pictures, for example, previously reconstructed pictures, and may provide complete previously reconstructed, that is, decoded, pictures (and corresponding reference blocks and samples) and/or a partially reconstructed current picture (and corresponding reference blocks and samples), for example, for inter prediction. If the reconstructed block 215 is reconstructed without in-loop filtering, the decoded picture buffer (decoded picture buffer, DPB) 230 may be configured to store the reconstructed block 215.

The prediction processing unit 260, also referred to as a block prediction processing unit 260, is configured to receive or obtain the picture block 203 (a current picture block 203 of the current picture 201) and reconstructed picture data, for example, reference samples of the same (current) picture from the buffer 216 and/or reference picture data 231 of one or more previously decoded pictures from the decoded picture buffer 230, and to process such data for prediction, that is, to provide the prediction block 265 that may be an inter prediction block 245 or an intra prediction block 255.

The mode selection unit 262 may be configured to select a prediction mode (for example, an intra or inter prediction mode) and/or a corresponding prediction block 245 or 255 to be used as the prediction block 265, for calculation of the residual block 205 and for reconstruction of the reconstructed block 215.

In an embodiment, the mode selection unit 262 may be configured to select the prediction mode (for example, from prediction modes supported by the prediction processing unit 260), where the prediction mode provides a best match or a minimum residual (the minimum residual means better compression for transmission or storage), or provides minimum signaling overheads (the minimum signaling overheads mean better compression for transmission or storage), or considers or balances both. The mode selection unit 262 may be configured to determine the prediction mode based on rate-distortion optimization (RDO), select a prediction mode that provides minimum rate-distortion optimization or select a prediction mode for which related rate distortion at least satisfies a prediction mode selection criterion.

The following describes in detail prediction processing (for example, performed by the prediction processing unit 260) and mode selection (for example, performed by the mode selection unit 262) performed by an example of the encoder 20.

As described above, the encoder 20 is configured to determine or select an optimal or optimum prediction mode from a set of (predetermined) prediction modes. The set of prediction modes may include, for example, an intra prediction mode and/or an inter prediction mode.

A set of intra prediction modes may include 35 different intra prediction modes, for example, non-directional modes such as a DC (or average) mode and a planar mode, or directional modes such as those defined in H.265, or may include 67 different intra prediction modes, for example, non-directional modes such as a DC (or average) mode and a planar mode, or directional modes such as those defined in H.266 under development.

In a possible implementation, a set of inter prediction modes may depend on available reference pictures (that is, for example, at least some decoded pictures stored in the DBP 230, as described above) and other inter prediction parameters, may depend on whether the entire reference picture or only a part of the reference picture, for example, a search window region around a region of the current block, is used for searching for an optimal matching reference block, and/or for example, may depend on whether pixel interpolation such as half-pixel and/or quarter-pixel interpolation is applied. The set of inter prediction modes may include, for example, an advanced motion vector prediction (AMVP) mode and a merge mode. In an exemplary implementation, the set of inter prediction modes may include an improved control point-based AMVP mode and an improved control point-based merge mode. In an example, the intra prediction unit 254 may be configured to perform any combination of inter prediction technologies described below.

In addition to the foregoing prediction modes, a skip mode and/or a direct mode may also be applied in the embodiments.

The prediction processing unit 260 may be further configured to split the picture block 203 into smaller block partitions or subblocks, for example, by iteratively using quadtree split, binary tree plit, ternary tree or EQT split, or any combination thereof, and perform, for example, prediction on each of the block partitions or subblocks. Mode selection includes selection of a tree structure of the split picture block 203 and selection of a prediction mode used for each of the block partitions or subblocks.

The inter prediction unit 244 may include a motion estimation unit (not shown in FIG. 2) and a motion compensation unit (not shown in FIG. 2). The motion estimation unit is configured to receive or obtain the picture block 203 (the current picture block 203 of the current picture 201) and a decoded picture 231, or at least one or more previously reconstructed blocks, for example, one or more reconstructed blocks of other/different previously decoded pictures 231, for motion estimation. For example, a video sequence may include the current picture and the previously decoded pictures 31, or in other words, the current picture and the previously decoded pictures 31 may be a part of or form a sequence of pictures forming the video sequence.

For example, the encoder 20 may be configured to select a reference block from a plurality of reference blocks of a same picture or different pictures in a plurality of other pictures and provide, for the motion estimation unit (not shown in FIG. 2), a reference picture and/or provide an offset (a spatial offset) between a position (coordinates X and Y) of the reference block and a position of the current block as an inter prediction parameter. The offset is also referred to as a motion vector.

The motion compensation unit is configured to obtain the inter prediction parameter, and perform inter prediction based on or by using the inter prediction parameter, to obtain the inter prediction block 245. Motion compensation performed by the motion compensation unit (not shown in FIG. 2) may include fetching or generating the prediction block based on a motion/block vector determined through motion estimation (possibly performing interpolation in sub-pixel precision). Interpolation filtering may generate an additional pixel sample from a known pixel sample, thereby potentially increasing a quantity of candidate prediction blocks that may be used to encode a picture block. Upon receiving a motion vector for a PU of the current picture block, a motion compensation unit 246 may locate a prediction block to which the motion vector points in a reference picture list. The motion compensation unit 246 may further generate syntax elements associated with a block and a video slice, for decoding a picture block of the video slice by the decoder 30.

The inter prediction unit 244 may transmit the syntax elements to the entropy encoding unit 270, and the syntax elements include the inter prediction parameter (such as indication information of selection of an inter prediction mode used for prediction of the current block after traversal of a plurality of inter prediction modes). In a possible application scenario, if there is only one inter prediction mode, the inter prediction parameter may alternatively not be carried in the syntax element. In this case, the decoder 30 may directly perform decoding in a default prediction mode. It may be understood that the inter prediction unit 244 may be configured to perform any combination of inter prediction technologies.

The intra prediction unit 254 is configured to obtain, for example, receive, the picture block 203 (the current picture block) and one or more previously reconstructed blocks, for example, reconstructed neighboring blocks, of a same picture for intra estimation. For example, the encoder 20 may be configured to select an intra prediction mode from a plurality of (predetermined) intra prediction modes.

In an embodiment, the encoder 20 may be configured to select the intra prediction mode according to an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on, for example, an intra prediction parameter in the selected intra prediction mode. In any case, after selecting an intra prediction mode for a block, the intra prediction unit 254 is further configured to provide an intra prediction parameter, that is, information indicating the selected intra prediction mode for the block, for the entropy encoding unit 270. In an example, the intra prediction unit 254 may be configured to perform any combination of intra prediction technologies.

The intra prediction unit 254 may transmit syntax elements to the entropy encoding unit 270, and the syntax elements include the intra prediction parameter (such as indication information of selection of an intra prediction mode used for prediction of the current block after traversal of a plurality of intra prediction modes). In a possible application scenario, if there is only one intra prediction mode, the intra prediction parameter may alternatively not be carried in the syntax element. In this case, the decoder 30 may directly perform decoding in a default prediction mode.

The entropy encoding unit 270 is configured to apply (or not apply) an entropy encoding algorithm or scheme (for example, a variable-length coding (VLC) scheme, a context adaptive VLC (CAVLC) scheme, an arithmetic coding scheme, context adaptive binary arithmetic coding (CABAC), syntax-based context-adaptive binary arithmetic coding (SBAC), probability interval partitioning entropy (PIPE) coding, or another entropy encoding methodology or technology) to one or all of the quantized residual coefficient 209, the inter prediction parameter, the intra prediction parameter, and/or the loop filter parameter, to obtain encoded picture data 21 that may be output via an output 272, for example, in a form of an encoded bitstream 21. The encoded bitstream may be transmitted to the video decoder 30, or archived for later transmission or retrieval by the video decoder 30. The entropy encoding unit 270 may further be configured to entropy-encode another syntax element for a current video slice being encoded.

Another structural variant of the video encoder 20 can be used to encode a video stream. For example, a non-transform based encoder 20 may directly quantize a residual signal without the transform processing unit 206 for some blocks or frames. In another implementation, the encoder 20 may have the quantization unit 208 and the inverse quantization unit 210 combined into a single unit.

In the embodiments, the encoder 20 may be configured to implement an encoding method described in the following embodiments.

It may be understood that another structural variant of the video encoder 20 can be used to encode a video stream. For example, for some picture blocks or picture frames, the video encoder 20 may directly quantize a residual signal, processing by the transform processing unit 206 is not required, and correspondingly, processing by the inverse transform processing unit 212 is not required either. Alternatively, for some picture blocks or picture frames, the video encoder 20 does not generate residual data, and correspondingly, processing by the transform processing unit 206, the quantization unit 208, the inverse quantization unit 210, and the inverse transform processing unit 212 is not required. Alternatively, the video encoder 20 may directly store a reconstructed picture block as a reference block, and processing by the filter 220 is not required. Alternatively, the quantization unit 208 and the inverse quantization unit 210 in the video encoder 20 may be combined. The loop filter 220 is optional. In addition, in a case of lossless compression encoding, the transform processing unit 206, the quantization unit 208, the inverse quantization unit 210, and the inverse transform processing unit 212 are optional. It may be understood that in different application scenarios, the inter prediction unit 244 and intra prediction unit 254 may be used selectively.

FIG. 3 is a schematic/conceptual block diagram of an example of a decoder 30 configured to implement an embodiment. The video decoder 30 is configured to receive encoded picture data (for example, an encoded bitstream) 21 encoded by, for example, the encoder 20, to obtain a decoded picture 231. In a decoding process, the video decoder 30 receives video data from the video encoder 20, for example, an encoded video bitstream that represents a picture block of an encoded video slice and an associated syntax element.

In the example in FIG. 3, the decoder 30 includes an entropy decoding unit 304, an inverse quantization unit 310, an inverse transform processing unit 312, a reconstruction unit 314 (for example, a summator 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some examples, the video decoder 30 may perform a decoding process that is roughly inverse to the encoding process described with respect to the video encoder 20 in FIG. 2.

The entropy decoding unit 304 is configured to perform entropy decoding on the encoded picture data 21 to obtain, for example, a quantized coefficient 309 and/or a decoded encoding parameter (not shown in FIG. 3), for example, any one or all of an inter prediction parameter, an intra prediction parameter, a loop filter parameter, and/or another syntax element (that are decoded). The entropy decoding unit 304 is further configured to forward the inter prediction parameter, the intra prediction parameter, and/or the another syntax element to the prediction processing unit 360. The video decoder 30 may receive syntax elements at a video slice level and/or a video block level.

The inverse quantization unit 310 may have a same function as the inverse quantization unit 110. The inverse transform processing unit 312 may have a same function as the inverse transform processing unit 212. The reconstruction unit 314 may have a same function as the reconstruction unit 214. The buffer 316 may have a same function as the buffer 216. The loop filter 320 may have a same function as the loop filter 220. The decoded picture buffer 330 may have a same function as the decoded picture buffer 230.

The prediction processing unit 360 may include the inter prediction unit 344 and the intra prediction unit 354. The inter prediction unit 344 may resemble the inter prediction unit 244 in function, and the intra prediction unit 354 may resemble the intra prediction unit 254 in function. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When the video slice is encoded into an intra-encoded (I) slice, the intra prediction unit 354 of the prediction processing unit 360 is configured to generate the prediction block 365 for a picture block of the current video slice based on a signaled intra prediction mode and data of a previously decoded block of a current frame or picture. When the video frame is encoded into an inter-encoded (namely, B or P) slice, the inter prediction unit 344 (for example, a motion compensation unit) of the prediction processing unit 360 is configured to generate the prediction block 365 for a video block of the current video slice based on a motion vector and the another syntax element that is received from the entropy decoding unit 304. For inter prediction, the prediction block may be generated from one of reference pictures in one reference picture list. The video decoder 30 may construct reference frame lists: a list 0 and a list 1, by using a default construction technology based on reference pictures stored in the DPB 330.

The prediction processing unit 360 is configured to determine prediction information for the video block of the current video slice by parsing the motion vector and the another syntax element, and use the prediction information to generate the prediction block for the current video block being decoded. In an example, the prediction processing unit 360 may determine, by using some received syntax elements, a prediction mode (for example, intra or inter prediction) for encoding the video block in the video slice, an inter prediction slice type (for example, a B slice, a P slice, or a GPB slice), construction information of one or more of the reference picture lists for the slice, a motion vector of each inter encoded video block for the slice, an inter prediction status of each inter encoded video block in the slice, and other information, to decode the video block in the current video slice. In another example, the syntax elements received by the video decoder 30 from a bitstream may include syntax elements in one or more of an adaptive parameter set (APS), a sequence parameter set (SPS), a picture parameter set (PPS), or a slice header.

The inverse quantization unit 310 may be configured to perform inverse quantization (namely, dequantization) on a quantized transform coefficient provided in the bitstream and decoded by the entropy decoding unit 304. An inverse quantization process may include: using a quantization parameter calculated by the video encoder 20 for each video block in the video slice to determine a quantization degree that may be applied and an inverse quantization degree that may be applied.

The inverse transform processing unit 312 is configured to apply an inverse transform (for example, an inverse DCT, an inverse integer transform, or a conceptually similar inverse transform process) to a transform coefficient, to generate a residual block in a pixel domain.

The reconstruction unit 314 (for example, the summator 314) is configured to add an inverse transform block 313 (namely, a reconstructed residual block 313) to the prediction block 365, for example, by adding sample values of the reconstructed residual block 313 and sample values of the prediction block 365, to obtain a reconstructed block 315 in a sample domain.

The loop filter unit 320 (in a coding loop or after a coding loop) may be configured to filter the reconstructed block 315 to obtain a filtered block 321, to smooth pixel transition or improve video quality. In an example, the loop filter unit 320 may be configured to perform any combination of filtering technologies described below. The loop filter unit 320 is intended to represent one or more loop filters such as a deblocking filter, an SAO filter, or another filter, for example, a bilateral filter, an ALF, a sharpening or smoothing filter, or a collaborative filter. Although the loop filter unit 320 is shown as an in-loop filter in FIG. 3, in another configuration, the loop filter unit 320 may be implemented as a post filter.

Then, a decoded video block 321 in a given frame or picture is stored in the decoded picture buffer 330 that stores a reference picture used for subsequent motion compensation.

The decoder 30 is configured to, for example, output the decoded picture 31 via an output 332, for presentation or viewing to a user.

Another variant of the video decoder 30 may be used to decode a compressed bitstream. For example, the decoder 30 may generate an output video stream without the loop filter unit 320. For example, a non-transform based decoder 30 can inverse-quantize a residual signal directly without the inverse transform processing unit 312 for some blocks or frames. In another implementation, the video decoder 30 may have the inverse quantization unit 310 and the inverse transform processing unit 312 combined into a single unit.

In the embodiments, the decoder 30 may be configured to implement a decoding method as described.

It may be understood that another structural variant of the video decoder 30 can be used to decode the encoded video bitstream. For example, the video decoder 30 may generate an output video stream without processing by the filter 320. Alternatively, for some picture blocks or picture frames, the entropy decoding unit 304 of the video decoder 30 does not obtain quantized coefficients through decoding, and correspondingly, there is no need for the inverse quantization unit 310 and the inverse transform processing unit 312 to perform processing. The loop filter 320 is optional. In addition, in a case of lossless compression, the inverse quantization unit 310 and the inverse transform processing unit 312 are also optional. It may be understood that in different scenarios, the inter prediction unit and the intra prediction unit may be used selectively.

It may be understood that on the encoder 20 and the decoder 30, a processing result for a procedure may be output to a next procedure after being further processed. For example, after a procedure such as interpolation filtering, motion vector derivation, or loop filtering, an operation such as clip or shift is further performed on a processing result of a corresponding procedure.

Figure 4:
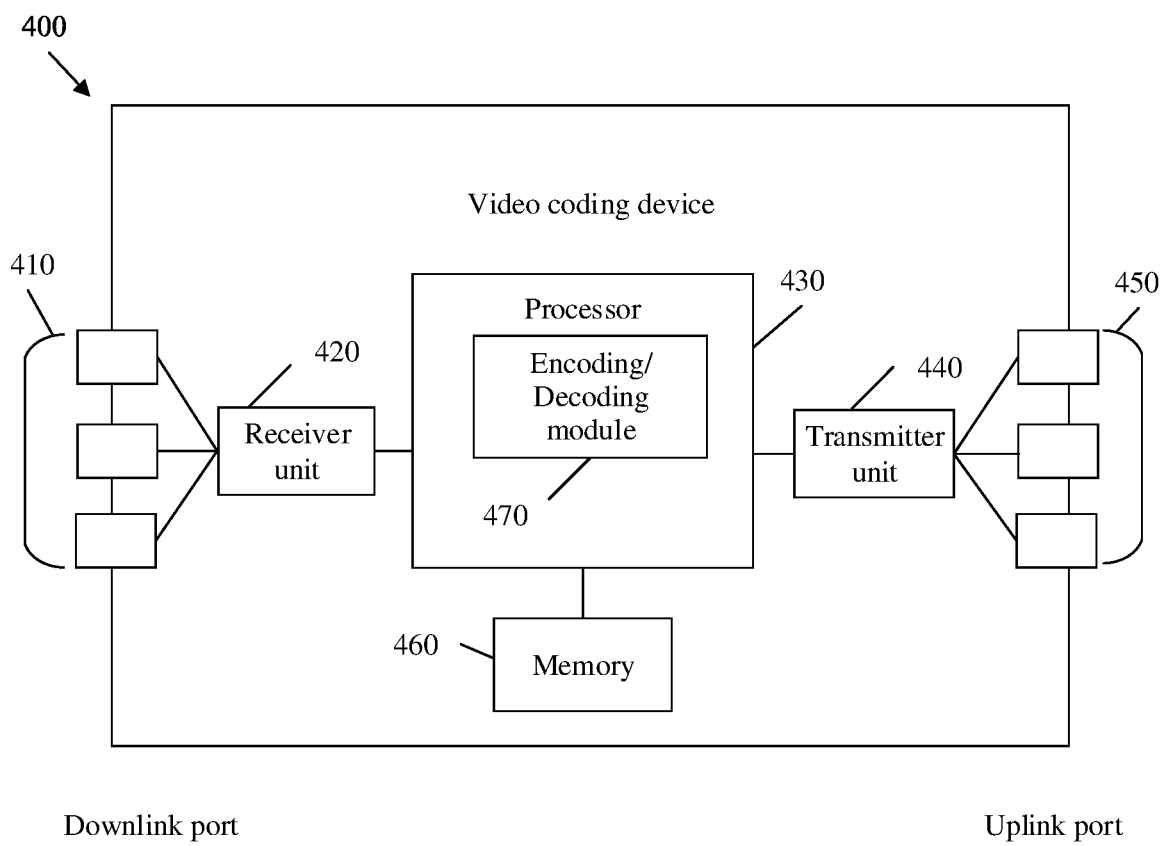
FIG. 4 is a schematic structural diagram of a video coding device according to an embodiment.

FIG. 4 is a schematic structural diagram of a video coding device 400 (for example, a video encoding device 400 or a video decoding device 400) according to an exemplary embodiment. The video coding device 400 is suitable for implementing the embodiments described. In an embodiment, the video coding device 400 may be a video decoder (for example, the decoder 30 in FIG. 1A) or a video encoder (for example, the encoder 20 in FIG. 1A). In another embodiment, the video coding device 400 may be one or more components of the decoder 30 in FIG. 1A or the encoder 20 in FIG. 1A.

The video coding device 400 includes: an ingress port 410 and a receiver unit (Rx) 420 for receiving data; a processor, a logic unit, or a central processing unit (CPU) 430 for processing data; a transmitter unit 440 and an egress port 450 for transmitting data; and a memory 460 for storing data. The video coding device 400 may further include an optical-to-electrical conversion component and an electrical-to-optical (EO) component coupled to the ingress port 410, the receiver unit 420, the transmitter unit 440, and the egress port 450 for egress or ingress of optical or electrical signals.

The processor 430 may be implemented by hardware and software. The processor 430 may be implemented as one or more CPU chips, cores (for example, a multi-core processor), FPGAs, ASICs, and DSPs. The processor 430 communicates with the ingress port 410, the receiver unit 420, the transmitter unit 440, the egress port 450, and the memory 460. The processor 430 includes a coding module 470 (for example, an encoding module 470 or a decoding module 470). The encoding/decoding module 470 may implement the embodiments to implement the split method provided in the embodiments. For example, the encoding/decoding module 470 implements, processes, or provides various coding operations. Therefore, the encoding/decoding module 470 substantially improves functions of the video coding device 400 and affects transform of the video coding device 400 to a different state. Alternatively, the encoding/decoding module 470 is implemented as an instruction stored in the memory 460 and executed by the processor 430.

The memory 460 includes one or more disks, tape drives, and/or solid-state drives, and may be used as an overflow data storage device, to store programs when such programs are selected for execution, and to store instructions and data that are read during program execution. The memory 460 may be volatile and/or nonvolatile, and may be a ROM, a RAM, a ternary content-addressable memory (TCAM), and/or a SRAM.

FIG. 5 is a simplified block diagram of an apparatus 500 that may be used as either or two of the source device 12 and the destination device 14 in FIG. 1A according to an exemplary embodiment. In other words, FIG. 5 may be a schematic block diagram of an implementation of an encoding device or a decoding device (coding device 500 for short) according to an embodiment. The coding device 500 may include a processor 510, a memory 530, and a bus system 550. The processor and the memory are connected through the bus system. The memory is configured to store an instruction. The processor is configured to execute the instruction stored in the memory. The memory of the coding device stores program code. The processor may invoke the program code stored in the memory, to perform various video encoding or decoding methods, particularly various new decoding methods. To avoid repetition, details are not described herein.

In this embodiment, the processor 510 may be a CPU, or the processor 510 may be another general-purpose processor, a DSP, an ASIC, a FPGA or another programmable logic device, a discrete gate or a transistor logic device, a discrete hardware component, or the like. The general-purpose processor may be a microprocessor, any conventional processor, or the like.

The memory 530 may include a ROM device or a RAM device. Any other storage device of an appropriate type may alternatively be used as the memory 530. The memory 530 may include code and data 531 accessed by the processor 510 through the bus 550. The memory 530 may further include an operating system 533 and an application program 535. The application program 535 may include at least one program that allows the processor 510 to perform the video encoding or decoding method. For example, the application program 535 may include applications 1 to N, and further include a video encoding or decoding application (referred to as a video coding application for short) that performs the video encoding or decoding method described in this application.

In addition to a data bus, the bus system 550 may further include a power bus, a control bus, a status signal bus, and the like. However, for clear description, various types of buses in the figure are marked as the bus system 550.

The coding device 500 may further include one or more output devices, for example, a display 570. In an example, the display 570 may be a touch-sensitive display that combines a display and a touch-sensitive unit that is operable to sense a touch input. The display 570 may be connected to the processor 510 through the bus 550.

The following describes key terms and technologies in the, to facilitate understanding of a reader.

CTU: A picture includes a plurality of CTUs. One CTU usually corresponds to one square picture region, and the CTU includes a luma pixel and a chroma pixel in the picture region, or includes only a luma pixel or a chroma pixel in the picture region. A size of the CTU may be set to 64×64, or certainly may be set to another value, for example, 128×128 or 256×256. A 64×64 CTU is a rectangular pixel array that includes 64 columns, where each column includes 64 pixels. An explanation of a CTU with another size is similar, and details are not described herein. The CTU may correspond to some syntax elements, and these syntax elements are used to indicate how to split the CTU into at least one CU, and are used to decode each CU to obtain information about a reconstructed picture, and the like.

CU: The CU may correspond to an A×B rectangular region, and includes A×B luma pixels and chroma pixels corresponding to the luma pixels. Herein, A is the width of the rectangle, B is the height of the rectangle, and A and B may be the same or different. A value of each of A and B is usually an integer power of 2, for example, 128, 64, 32, 16, 8, or 4. Decoding processing may be performed on the CU to obtain a reconstructed picture with an A×B rectangular region. The decoding processing usually includes prediction, dequantization, inverse transform, and the like.

A split manner may be represented by using a split mode and a split direction. The split mode may be a binary tree split mode, an EQT split mode, or the like. The split direction may be a vertical direction or a horizontal direction. The horizontal direction is a direction perpendicular to a side on which the height of a current picture block is located. The vertical direction is a direction perpendicular to a side on which the width of the current picture block is located. Based on this, the split manner may be a horizontal binary tree split manner, a vertical binary tree split manner, a horizontal EQT split manner, or a vertical EQT split manner. Alternatively, a split manner may be represented by using only a split mode. For example, a quadtree split manner has a same meaning as a quadtree split mode.

binary tree: The binary tree is a tree structure, and one node can be split into two child nodes. In a coding method in which the binary tree is used, a node on a binary tree structure may not be split, or may be split into two next-level nodes. Manners for splitting one node into two nodes include a horizontal binary tree split manner and a vertical binary tree split manner. The horizontal binary tree split manner is: splitting a region corresponding to a node into two same-size regions: an upper region and a lower region, where each region corresponds to one node, as shown in FIG. 6(a). The vertical binary tree split manner is: splitting a region corresponding to a node into two same-size regions: a left region and a right region, where each region corresponds to one node, as shown in FIG. 6(b).

QT (quadtree): The QT is a tree structure, and one node can be split into four child nodes. In an AVS video standard, a quadtree-based CTU split manner is used. A CTU is used as a root node, and each node corresponds to a square region. The node may not be split (in this case, a region corresponding to the node is a CU), or may be split into four next-level nodes. The square region is split into four same-size square regions, the height and the width of each square region obtained after the split are half of the height and the width of the region existing before the split, and each region corresponds to one node, as shown in FIG. 6(c).

EQT: The EQT is a tree structure, and one node can be split into four child nodes. In a coding method in which the EQT is used, a node on an EQT structure may not be split, or may be split into four next-level nodes Manners for splitting one node into four nodes include a horizontal EQT split manner and a vertical EQT split manner. The horizontal EQT split manner is: first performing horizontal tri-split, to split a region corresponding to a node into three regions: an upper region, a middle region, and a lower region, where each region corresponds to one node, and the heights of the upper region, the middle region, and the lower region are respectively ¼, ½, and ¼ of the height of the node; and then splitting a node corresponding to the middle region into two same-size regions: a left region and a right region, as shown in FIG. 6(d). The vertical EQT split manner is: first performing vertical tri-split, to split a region corresponding to a node into three regions: a left region, a middle region, and a right region, where each region corresponds to one node, and the widths of the left region, the middle region, and the right region are respectively ¼, ½, and ¼ of the width of the node; and then splitting a node corresponding to the middle region into two same-size regions: an upper region and a lower region, as shown in FIG. 6(e).

Figure 7:
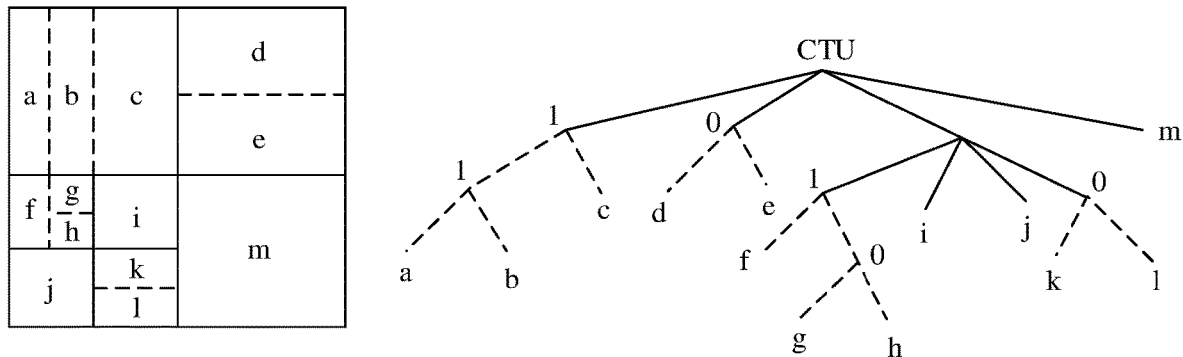
FIG. 7 is a schematic diagram of a coding tree and a split manner corresponding to the coding tree that are applicable to an embodiment.

A QTBT solution is a manner in which a QT split and a binary tree split are cascaded. A CTU is first split based on a QT, and a leaf node of the QT is allowed to continue to be split based on a BT, as shown in FIG. 7. A first-level coding tree is the QT, and a second-level coding tree is the BT. In a right figure in FIG. 7, each endpoint represents one node, extension of four solid lines from one node represents a quadtree split, extension of two dashed lines from one node represents a binary tree split, a to m are 13 leaf nodes, and each leaf node corresponds to one CU. On a binary tree node, "1" represents a vertical split, and "0" represents a horizontal split. If a CTU is split according to the right figure in FIG. 7, 13 CUs, which are a to m, can be obtained, as shown in a left figure in FIG. 7.

An advantage of the QTBT solution is that CU shapes are more diversified, so that content of a partial picture is better adapted. In an AVS2 video coding standard, a QT-based split limits all CUs to only square, that is, the width of a CU is equal to the height of the CU. The width of the CU is a quantity of columns of pixels included in the CU, and the height of the CU is a quantity of rows of the pixels included in the CU. After the binary tree split is introduced, the width and the height of the CU may be different. For example, a ratio of the width to the height may be 2, 4, 8, 16, ½, ¼, ⅛, or ¹⁄₁₆. In QTBT, the widths and the heights of all CUs cannot be less than a side length of a minimum CU, and a size of the minimum CU may be included in an SPS. For example, the minimum CU may be set to 4×4.

Based on the QTBT solution, an AVS3 video coding standard proposes an EQT solution. A first-level coding tree may be split based on a QT, and a second-level coding tree is split based on a binary tree and an EQT. A CTU is used as a root node of the first-level coding tree, and a QT split manner is used for the first-level coding tree, to split the CTU into leaf nodes of the first-level coding tree. Then, the leaf node of the first-level coding tree is used as a root node of the second-level coding tree, and the foregoing horizontal binary tree split manner, vertical binary tree split manner, horizontal EQT split manner, and vertical EQT split manner may be used for the second-level coding tree, to continue to split the leaf node of the first-level coding tree into leaf nodes of the second-level coding tree.

In the second-level coding tree, an encoder usually uses a minimum CU size principle and a minimum RDO principle to determine whether to split a current picture block (that is, a current node), and determine a specific to-be-used split manner if the current picture block is to be split. A possible split manner of the current picture block is first determined according to the minimum CU size principle. A split manner applicable to the current picture block is determined according to a principle that a size of each picture block obtained after a split needs to be greater than or equal to a minimum CU size. If none of all candidate split manners (that is, the horizontal binary tree split manner, the vertical binary tree split manner, the horizontal EQT split manner, and the vertical EQT split manner) is applicable, it is determined that the current picture block cannot be split. Otherwise, RDO obtained when the current picture block is not split and RDO obtained when the current picture block is split in each possible split manner are calculated and compared. If the RDO obtained when the current picture block is not split is minimum, it is determined not to split the current picture block. If RDO obtained when a specific split manner is used is minimum, it is determined that the split manner is subsequently used to split the current picture block. In this method, all possible split manners that are determined according to the minimum CU size principle and that are applicable to the current picture block need to be traversed, to determine the split manner for splitting the current picture block. Therefore, coding complexity is relatively high. In addition, if it is determined to use a specific split manner to split the current picture block, a bitstream carries information about a split mode and a split direction that represent the split manner. Therefore, bitstream transmission overheads are relatively large.

Based on this, the embodiments provide a video encoding method and a corresponding decoding method. The following describes the solutions in the embodiments in detail with reference to the accompanying drawings.

Figure 8:
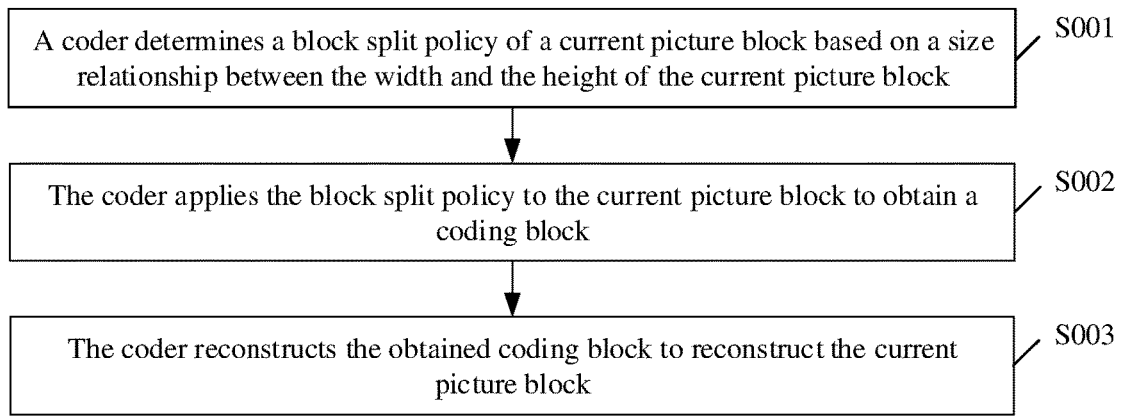
FIG. 8 is a schematic flowchart of a video coding method according to an embodiment.

FIG. 8 is a schematic flowchart of a video coding method according to an embodiment. The method shown in FIG. 8 may include the following steps.

S001: A coder determines a block split policy of a current picture block based on a size relationship between the width and the height of the current picture block.

When the video coding method is a video encoding method, the coder is an encoder. When the video coding method is a video decoding method, the coder is a decoder.

The current picture block may be any picture block in a process of splitting a to-be-coded picture, for example, any picture block in a second-level coding tree.

The block split policy is a policy used to obtain a coding block based on the current picture block. For example, the block split policy of the current picture block may include: which split manners are invalid for the current picture block. For another example, the block split policy of the current picture block may include a target split manner used to split the current picture block and the like.

It may be understood that the coder may determine, according to a minimum CU size principle, a split manner applicable to the current picture block. Therefore, in a possible implementation, the "minimum CU size principle" may be used as a part of the block split policy. In another possible implementation, it may be considered that the "minimum CU size principle" and the block split policy are two independent policies. For ease of description, the following uses the latter case as an example for description.

S002: The coder applies the block split policy to the current picture block to obtain the coding block.

The coding block may be considered as a leaf node in a coding tree (such as a second-level coding tree in an EQT solution). For a related explanation of the coding block, refer to the foregoing description, or refer to the conventional technology.

If the coder determines, according to the block split policy (optionally, other policies such as the minimum CU size principle and a minimum RDO principle may be further used), not to split the current picture block, the current picture block may be used as a leaf node in a coding tree. In this case, the current picture block may be used as a coding block.

If the coder determines, according to the block split policy (optionally, other policies such as the minimum CU size principle and a minimum RDO principle may be further used), that the current picture block needs to be split, picture blocks obtained after the split each may be used as a current picture block, and then S001 and S002 are performed. The foregoing process is continued by analogy, until a current picture block is no longer split, and the current picture block is used as a leaf node in a coding tree. In this case, the current picture block may be used as a coding block.

S003: The coder reconstructs the obtained coding block to reconstruct the current picture block. For an exemplary implementation of this step, refer to the foregoing description, or refer to the conventional technology.

In this solution, the block split policy of the current picture block is conditionally determined, to obtain the coding block. This helps reduce split complexity, so that video coding performance is improved.

S001 and S002 may be considered as a picture block split method provided in the embodiments. The following uses FIG. 9A to FIG. 9C to FIG. 12A to FIG. 12C to describe the picture block split method provided in the embodiments.

Figure 9A:
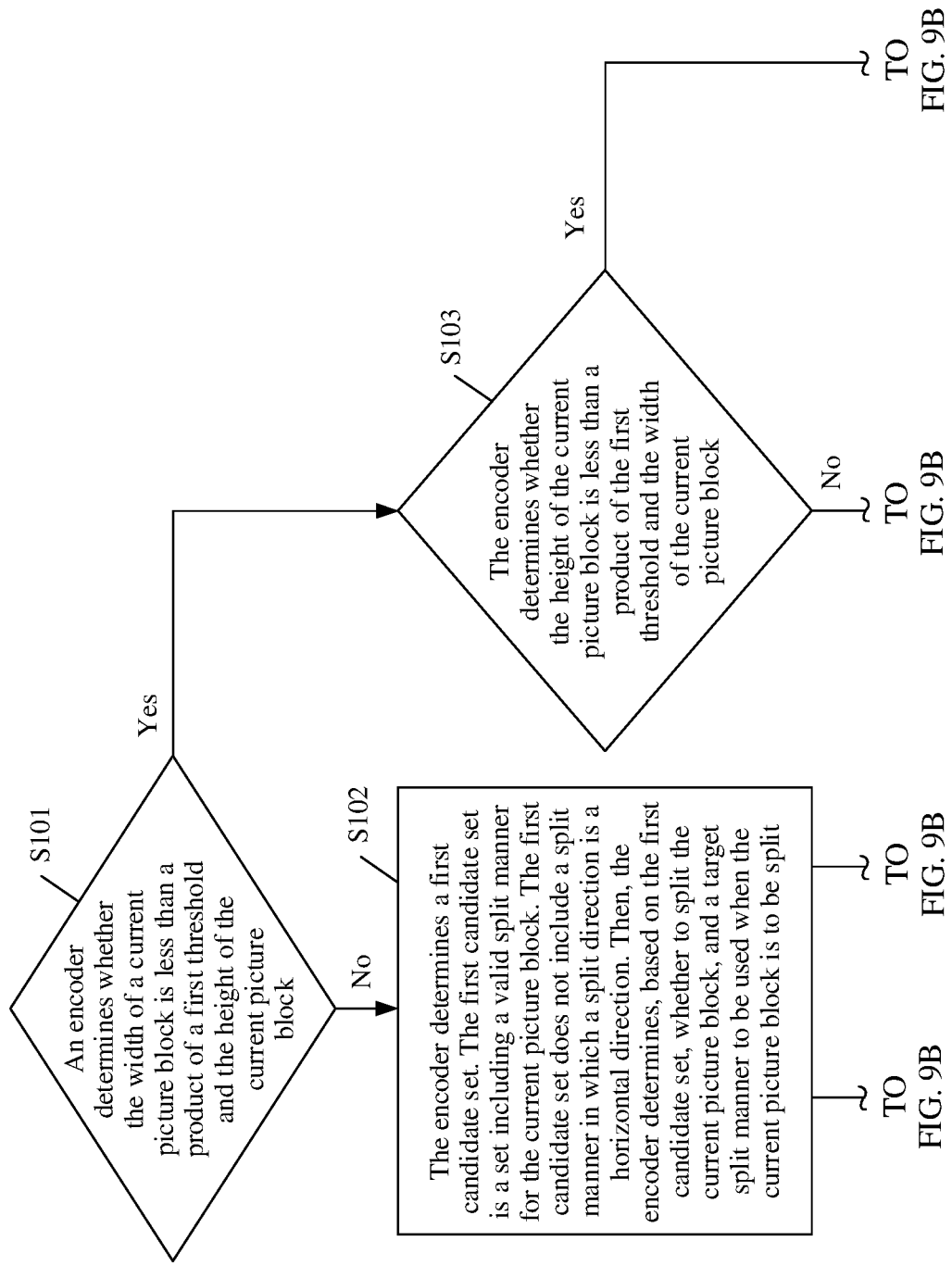
FIG. 9A is a schematic flowchart of a picture block split method according to an embodiment.
Figure 9B:
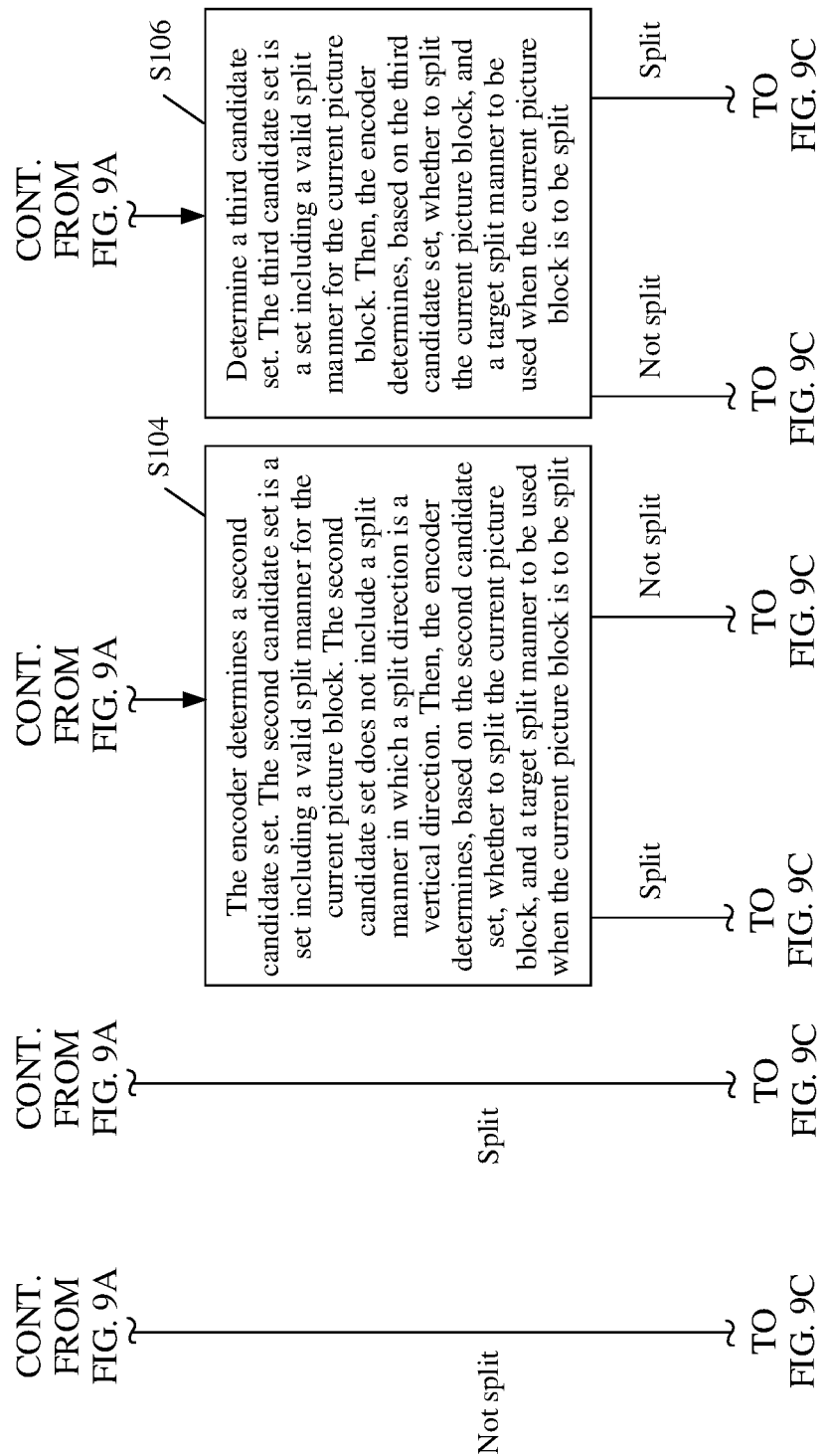
FIG. 9B is another schematic flowchart of a picture block split method according to an embodiment.
Figure 9C:
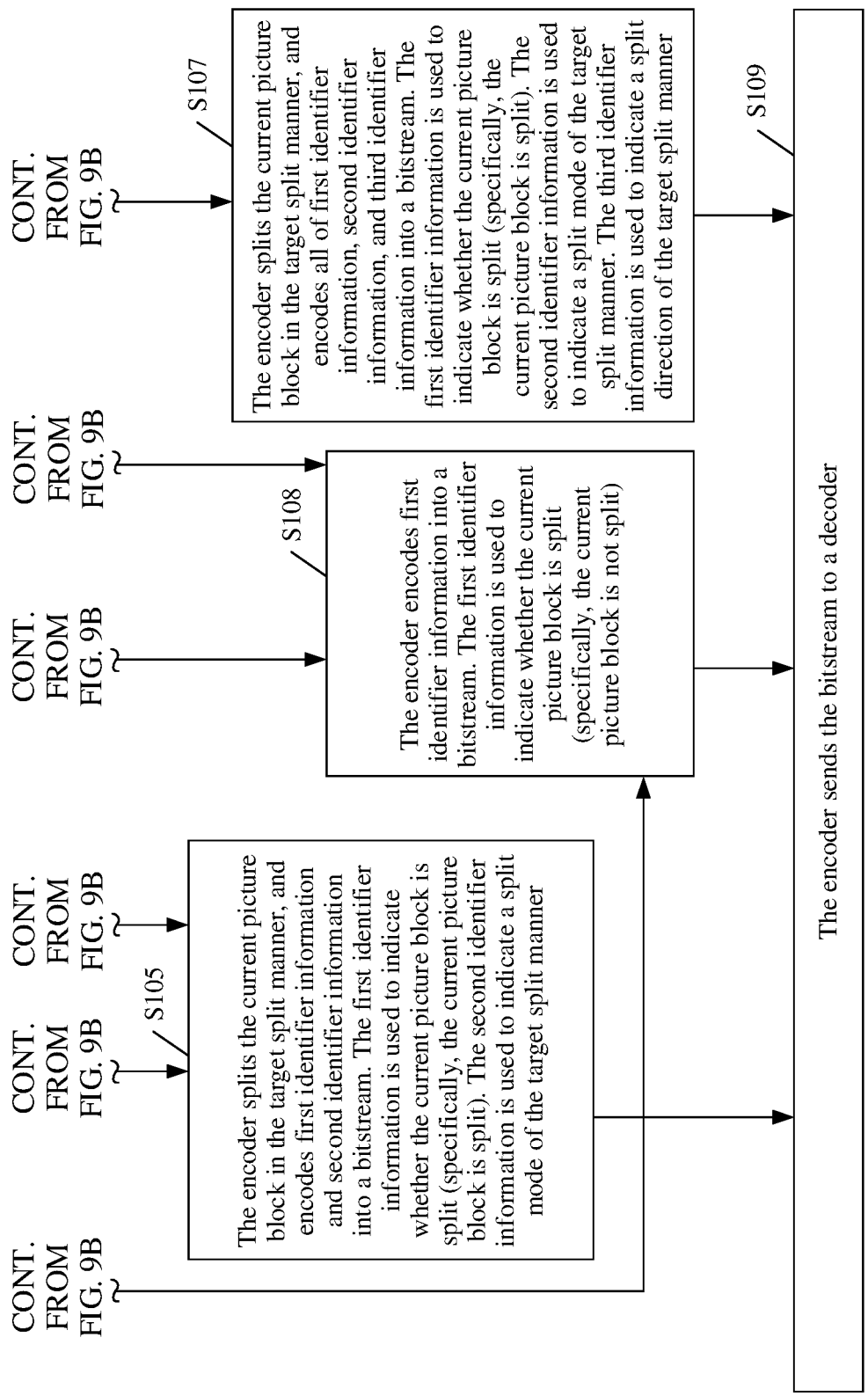
FIG. 9C is another schematic flowchart of a picture block split method according to an embodiment.

FIG. 9A to FIG. 9C are a schematic flowchart of a picture block split method according to an embodiment. The method shown in FIG. 9A to FIG. 9C includes the following steps.

S101: An encoder determines whether the width of a current picture block is less than a product of a first threshold and the height of the current picture block.

If the width of the current picture block is not less than the product of the first threshold and the height of the current picture block, S102 is performed. If the width of the current picture block is less than the product of the first threshold and the height of the current picture block, S103 is performed.

The first threshold may be an allowed maximum value of a ratio of a long-side length to a short-side length that are of a node in a coding tree (such as the second-level coding tree described above). The first threshold may be a value greater than 1, for example, an integer greater than 1. The first threshold may be an integer power of 2. For example, the first threshold is 4, 8, 16, or the like. It may be noted that, unless otherwise specified, all examples in this embodiment are described by using an example in which the first threshold is a value greater than 1.

S102: The encoder determines a first candidate set. The first candidate set is a set including a valid split manner for the current picture block. The first candidate set does not include a split manner in which a split direction is a horizontal direction. In other words, the split manner in the horizontal direction is invalid. Then, the encoder determines, based on the first candidate set, whether to split the current picture block, and a target split manner to be used when the current picture block is to be split.

If the encoder determines to split the current picture block, S105 is performed.

If the encoder determines not to split the current picture block, S108 is performed.

The encoder may first determine a block split policy of the current picture block, where the block split policy does not include a split whose split direction is the horizontal direction. When the current picture block does not satisfy a first condition, the encoder may determine that the block split policy of the current picture block does not include the split whose split direction is the horizontal direction. The first condition may include: the width of the current picture block is less than the product of the first threshold and the height of the current picture block. Then, the encoder determines the first candidate set according to at least the block split policy. For example, the encoder may determine the first candidate set according to a "minimum CU size principle" and the block split policy. If split manners applicable to the current picture block that are determined according to the "minimum CU principle" include a vertical binary tree split manner, a vertical EQT split manner, a horizontal binary tree split manner, and a horizontal EQT split manner, the first candidate set may include the vertical binary tree split manner and the vertical EQT split manner, but not include the horizontal binary tree split manner or the horizontal EQT split manner. In other words, the valid split manner for the current picture block is a split manner in a vertical direction.

In an example, determining, based on a candidate set, whether to split the current picture block, and a target split manner to be used when the current picture block is to be split may include: calculating and comparing RDO obtained when the current picture block is not split and RDO obtained when the current picture block is split in each possible split manner in the candidate set; and if the RDO obtained when the current picture block is not split is minimum, determining not to split the current picture block; or if RDO obtained when a specific split manner in the candidate set is used is minimum, determining the split manner as the target split manner. In another example, if a candidate set is empty, the encoder determines not to split the current picture block. The candidate set in the two examples may be the first candidate set, or may be the following second candidate set or third candidate set.

It may be understood that, when the first threshold is a value greater than 1, if a determining result in S101 is "no", that is, the width of the current picture block is greater than or equal to the product of the first threshold and the height of the current picture block, it indicates that the width of the current picture block is a long side, and the height of the current picture block is a short side. It may be understood from the description of S102 that, the encoder considers by default that a split manner perpendicular to the short side (which is the height) of the current picture block is invalid. During implementation, the encoder and a decoder may predefine that the split manner perpendicular to the short side (which is the height) of the current picture block is invalid when the determining result in S101 is "no".

S103: The encoder determines whether the height of the current picture block in a to-be-encoded picture is less than a product of the first threshold and the width of the current picture block.

If the height of the current picture block is not less than the product of the first threshold and the width of the current picture block, S104 is performed. If the height of the current picture block is less than the product of the first threshold and the width of the current picture block, S106 is performed.

S104: The encoder determines a second candidate set. The second candidate set may be a set including a valid split manner for the current picture block. The second candidate set does not include a split manner in which a split direction is a vertical direction. In other words, the split manner in the vertical direction is invalid. Then, the encoder determines, based on the second candidate set, whether to split the current picture block, and a target split manner to be used when the current picture block is to be split.

If the encoder determines to split the current picture block, S105 is performed.

If the encoder determines not to split the current picture block, S108 is performed.

The encoder first determines a block split policy of the current picture block, where the block split policy does not include a split whose split direction is the vertical direction. When the current picture block does not satisfy a second condition, the encoder determines that the block split policy of the current picture block does not include the split whose split direction is the vertical direction. The second condition may include: the height of the current picture block is less than the product of the first threshold and the width of the current picture block. Then, the encoder determines the second candidate set according to at least the block split policy. For example, the encoder may determine the second candidate set according to a "minimum CU size principle" and the block split policy. If split manners applicable to the current picture block that are determined according to the "minimum CU principle" include a vertical binary tree split manner, a vertical EQT split manner, a horizontal binary tree split manner, and a horizontal EQT split manner, the second candidate set may include the horizontal binary tree split manner and the horizontal EQT split manner, but not include the vertical binary tree split manner or the vertical EQT split manner. In other words, the valid split manner for the current picture block is in a horizontal direction.

It may be understood that, when the first threshold is a value greater than 1, if a determining result in S103 is "no", that is, the height of the current picture block is greater than or equal to the product of the first threshold and the width of the current picture block, it indicates that the height of the current picture block is a long side, and the width of the current picture block is a short side. It may be understood from the description of S104 that, the encoder considers by default that a split manner perpendicular to the short side (which is the width) of the current picture block is invalid. During implementation, the encoder and a decoder may predefine that the split manner perpendicular to the short side (which is the width) of the current picture block is invalid when the determining result in S103 is "no".

S105: The encoder splits the current picture block in the target split manner, and encodes first identifier information and second identifier information into a bitstream. The first identifier information is used to indicate whether the current picture block is split (The current picture block is split). The second identifier information is used to indicate a split mode (such as a binary tree split mode or an EQT split mode) of the target split manner.

After S105 is performed, S109 is performed.

S106: The encoder determines a third candidate set. The third candidate set is a set including a valid split manner for the current picture block. Then, the encoder determines, based on the third candidate set, whether to split the current picture block, and a target split manner to be used when the current picture block is to be split.

If the encoder determines to split the current picture block, S107 is performed.

If the encoder determines not to split the current picture block, S108 is performed.

During implementation, the encoder may determine the third candidate set according to a "minimum CU size principle". For example, the third candidate set may include a horizontal binary tree split manner, a horizontal EQT split manner, a vertical binary tree split manner, and a vertical EQT split manner.

It may be noted that an execution sequence between S101-S102 and S103-S104 may not be limited. For example, the encoder may first perform S103, and perform S101 when a determining result in S103 is "yes", or perform S104 when a determining result in S103 is "no". In addition, the encoder performs S106 when a determining result in S101 is "yes", or performs S102 when a determining result in S101 is "no".

Alternatively, the encoder may not perform S101 or S102, or not perform S103 or S104. For example, when the encoder does not perform S103 or S104, the encoder may directly perform S106 when a determining result in S101 is "yes".

S107: The encoder splits the current picture block in the target split manner, and encodes all of first identifier information, second identifier information, and third identifier information into a bitstream. The first identifier information is used to indicate whether the current picture block is split (The current picture block is split). The second identifier information is used to indicate a split mode (such as a binary tree split mode or an EQT split mode) of the target split manner. The third identifier information is used to indicate a split direction (such as a horizontal direction or a vertical direction) of the target split manner.

After S107 is performed, S109 is performed.

S108: The encoder encodes first identifier information into a bitstream. The first identifier information is used to indicate whether the current picture block is split (The current picture block is not split).

S109: The encoder sends the bitstream to the decoder.

It may be noted that, for a "split picture block" obtained after a split operation is performed, the encoder may use the "split picture block" as a current picture block, and return to perform S101 to S109.

According to a video encoding method provided in an exemplary embodiment, the block split policy of the current picture block may be conditionally determined. Compared with that in a split method for a node in a second-level coding tree in an existing EQT solution, split complexity can be reduced, so that coding efficiency is improved. In addition, when the width of the current picture block is greater than or equal to the product of the first threshold and the height, and/or the height of the current picture block is greater than or equal to the product of the first threshold and the width, it is considered by default that the split manner in which a split direction is perpendicular to the short side of the current picture block is invalid. Therefore, information indicating a split direction for splitting the current picture block does not need to be encoded into the bitstream, so that transmission bit overheads can be reduced. In addition, this solution helps limit a ratio of the width to the height (or a ratio of the height to the width) of a leaf node in a coding tree to a specific range, and helps avoid a "slender" node as much as possible in a coding process, thereby facilitating coding.

Figure 10A:
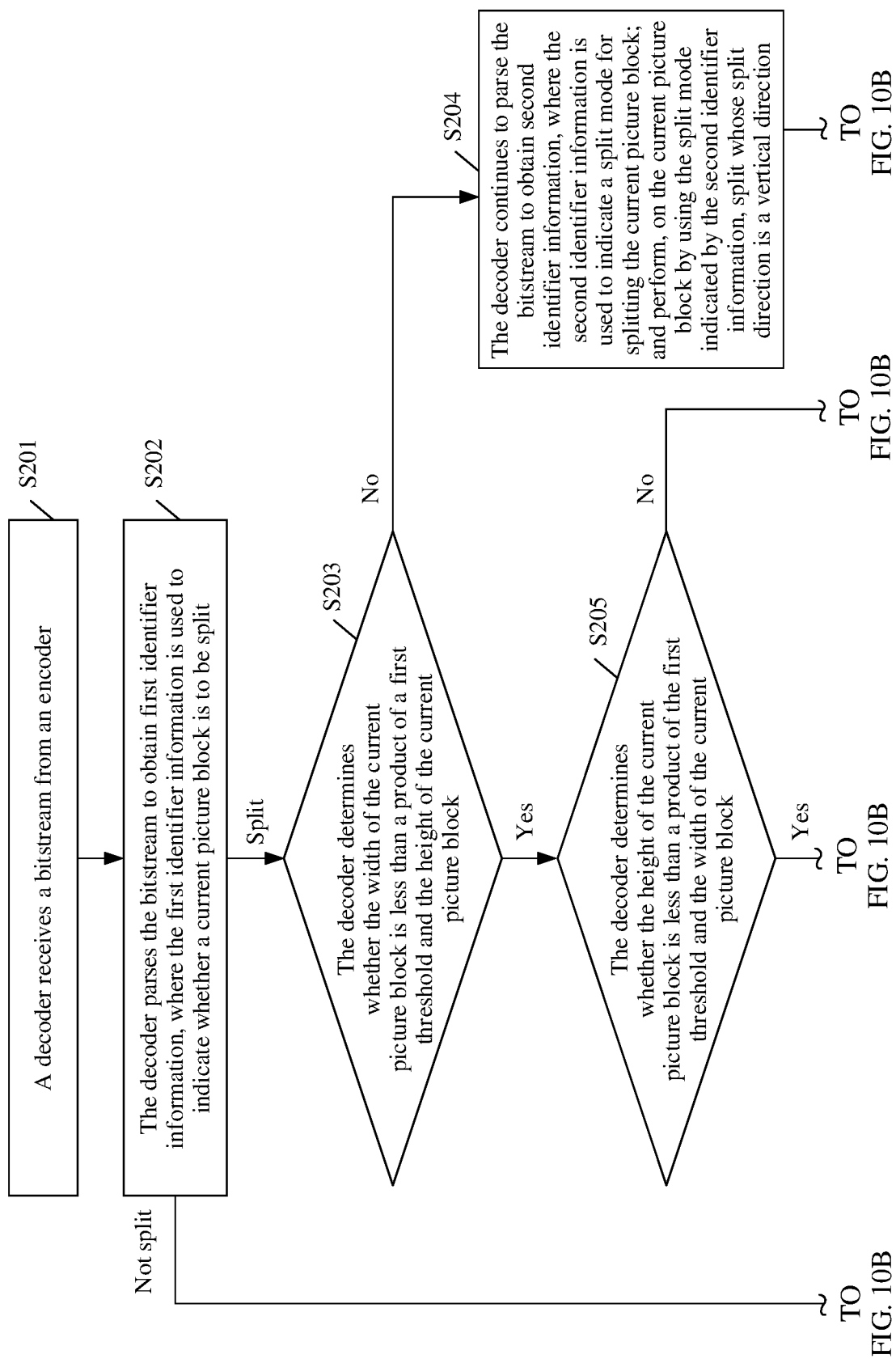
FIG. 10A is a schematic flowchart of another picture block split method according to an embodiment.
Figure 10B:
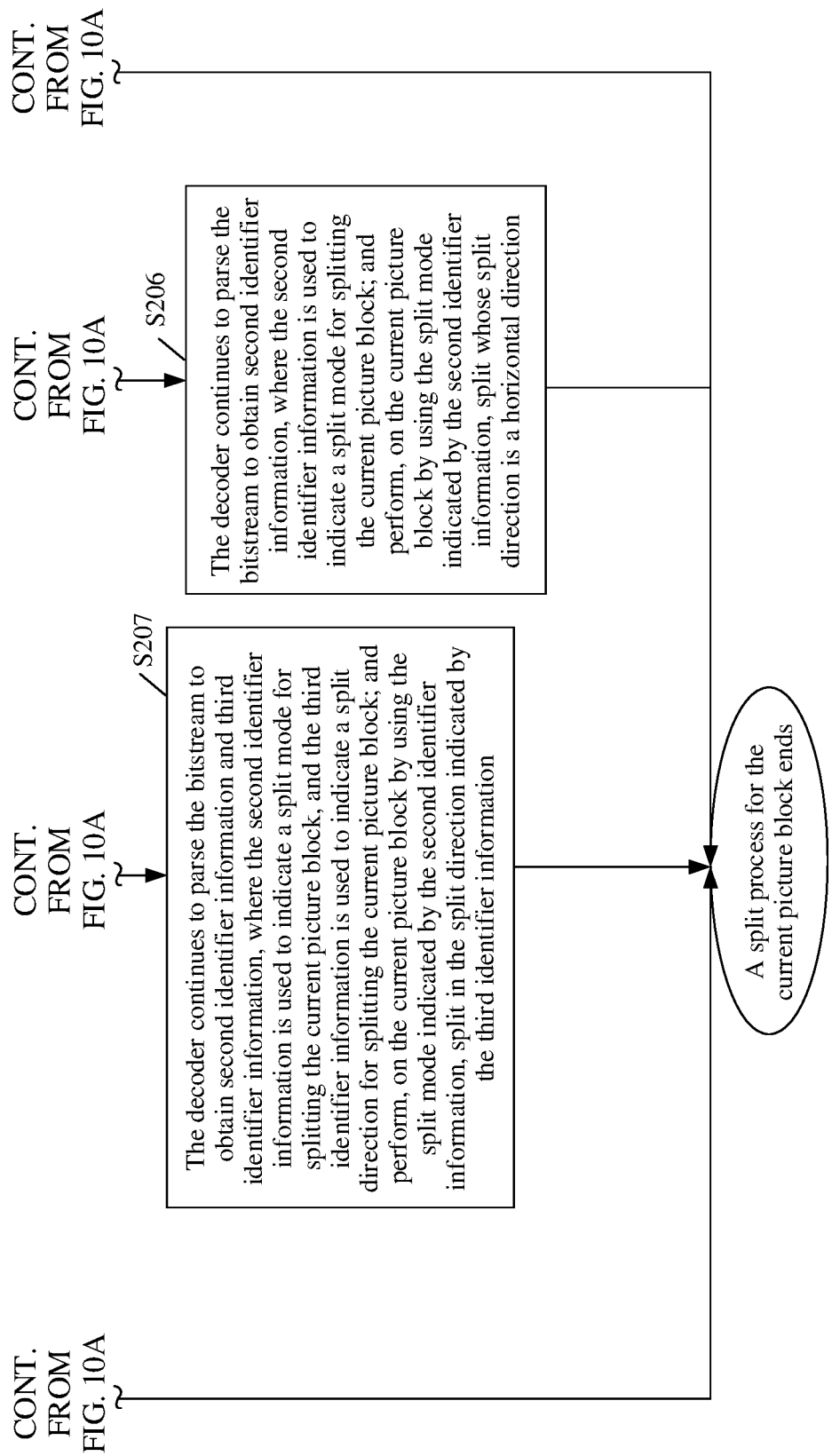
FIG. 10B is a schematic flowchart of another picture block split method according to an embodiment.

FIG. 10A and FIG. 10B are a schematic flowchart of a picture block split method according to an embodiment. A video decoding method shown in FIG. 10A and FIG. 10B corresponds to the video encoding method shown in FIG. 9A to FIG. 9C. Therefore, for explanations of related content in this embodiment, refer to the embodiment shown in FIG. 9A to FIG. 9C. The method shown in FIG. 10A and FIG. 10B includes the following steps.

S201: A decoder receives a bitstream from an encoder.

S202: The decoder parses the bitstream to obtain first identifier information, where the first identifier information is used to indicate whether a current picture block is to be split.

If the first identifier information indicates that the current picture block is not to be split, a split process for the current picture block ends. In this case, the current picture block may be used as a coding block.

If the first identifier information indicates that the current picture block is to be split, the following S203 is performed.

S203: The decoder determines whether the width of the current picture block is less than a product of a first threshold and the height of the current picture block.

If the width of the current picture block is not less than the product of the first threshold and the height of the current picture block, S204 is performed. If the width of the current picture block is less than the product of the first threshold and the height of the current picture block, S205 is performed.

S204: The decoder continues to parse the bitstream to obtain second identifier information, where the second identifier information is used to indicate a split mode for splitting the current picture block; and perform, on the current picture block by using the split mode indicated by the second identifier information, split whose split direction is a vertical direction.

After S204 is performed, a split process for the current picture block ends.

When a determining result in S203 is "no", the decoder may determine, based on the determining result, that a block split policy of the current picture block does not include a split whose split direction is a horizontal direction. Then, the decoder may perform, on the current picture block according to the block split policy by using the split mode indicated by the second identifier information, split whose split direction is the vertical direction.

The split mode indicated by the second identifier information may include a binary tree split mode, an EQT split mode, or the like. If the split mode indicated by the second identifier information is the binary tree split mode, vertical binary tree split is performed on the current picture block; or if the split mode indicated by the second identifier information is the EQT split mode, vertical EQT split is performed on the current picture block.

When the first threshold is a value greater than 1, if the determining result in S203 is "no", that is, the width of the current picture block is greater than or equal to the product of the first threshold and the height of the current picture block, it indicates that the width of the current picture block is a long side, and the height of the current picture block is a short side.

S205: The decoder determines whether the height of the current picture block is less than a product of the first threshold and the width of the current picture block.

If the height of the current picture block is not less than the product of the first threshold and the width of the current picture block, S206 is performed. If the height of the current picture block is less than the product of the first threshold and the width of the current picture block, S207 is performed.

S206: The decoder continues to parse the bitstream to obtain second identifier information, where the second identifier information is used to indicate a split mode for splitting the current picture block; and performs, on the current picture block by using the split mode indicated by the second identifier information, split whose split direction is a horizontal direction.

After S206 is performed, a split process for the current picture block ends.

When a determining result in S205 is "no", the decoder may determine, based on the determining result, that a block split policy of the current picture block does not include a split whose split direction is a vertical direction. Then, the decoder performs, on the current picture block according to the block split policy by using the split mode indicated by the second identifier information, split whose split direction is the horizontal direction.

The split mode indicated by the second identifier information may include a binary tree split mode, an EQT split mode, or the like. If the split mode indicated by the second identifier information is the binary tree split mode, horizontal binary tree split is performed on the current picture block; or if the split mode indicated by the second identifier information is the EQT split mode, horizontal EQT split is performed on the current picture block.

When the first threshold is a value greater than 1, if the determining result in S205 is "no", that is, the height of the current picture block is greater than or equal to the product of the first threshold and the width of the current picture block, it indicates that the height of the current picture block is a long side, and the width of the current picture block is a short side.

S207: The decoder continues to parse the bitstream to obtain second identifier information and third identifier information, where the second identifier information is used to indicate a split mode for splitting the current picture block, and the third identifier information is used to indicate a split direction for splitting the current picture block; and perform, on the current picture block by using the split mode indicated by the second identifier information, split in the split direction indicated by the third identifier information.

After S207 is performed, a split process for the current picture block ends.

For example, when the split mode indicated by the second identifier information is a binary tree split mode, and the split direction indicated by the third identifier information is a horizontal split, horizontal binary tree split is performed on the current picture block. Other examples are not enumerated one by one.

The decoder may perform one bitstream parsing operation to obtain the second identifier information and the third identifier information. Alternatively, the decoder may perform one bitstream parsing operation to obtain the second identifier information, and perform another bitstream parsing operation to obtain the third identifier information, and a sequence of the two parsing steps may not be limited.

It may be noted that an execution sequence between S203-S204 and S205-S206 may not be limited. For example, the decoder may first perform S205, and perform S203 when a determining result in S205 is "yes", or perform S206 when a determining result in S205 is "no". In addition, the decoder performs S207 when a determining result in S203 is "yes", or performs S204 when a determining result in S203 is "no".

Alternatively, the decoder may not perform S203 or S204, or not perform S205 or S206. For example, when the decoder does not perform S205 or S206, the decoder may directly perform S207 when a determining result in S203 is "yes". It may be understood that, during mplementation, if the encoder performs S101 and S102, the decoder performs S203 and S204. If the encoder performs S103 and S104, the decoder performs S205 and S206.

It may be noted that, for a "split picture block" obtained after a split operation is performed, the decoder may use the "split picture block" as a current picture block, and perform S202 to S207.

According to the video decoding method provided in this embodiment, when the width of the current picture block is greater than or equal to the product of the first threshold and the height, and/or the height of the current picture block is greater than or equal to the product of the first threshold and the width, the decoder considers by default that a split manner in which a split direction is perpendicular to the short side of the current picture block is invalid. In this way, the encoder does not need to encode, into the bitstream, information indicating a split direction for splitting the current picture block. Therefore, transmission bit overheads can be reduced. In addition, this solution helps limit a ratio of the width to the height (or a ratio of the height to the width) that are of a leaf node in a coding tree to a specific range, and helps avoid a "slender" node as much as possible in a coding process, thereby facilitating coding.

Figure 11A:
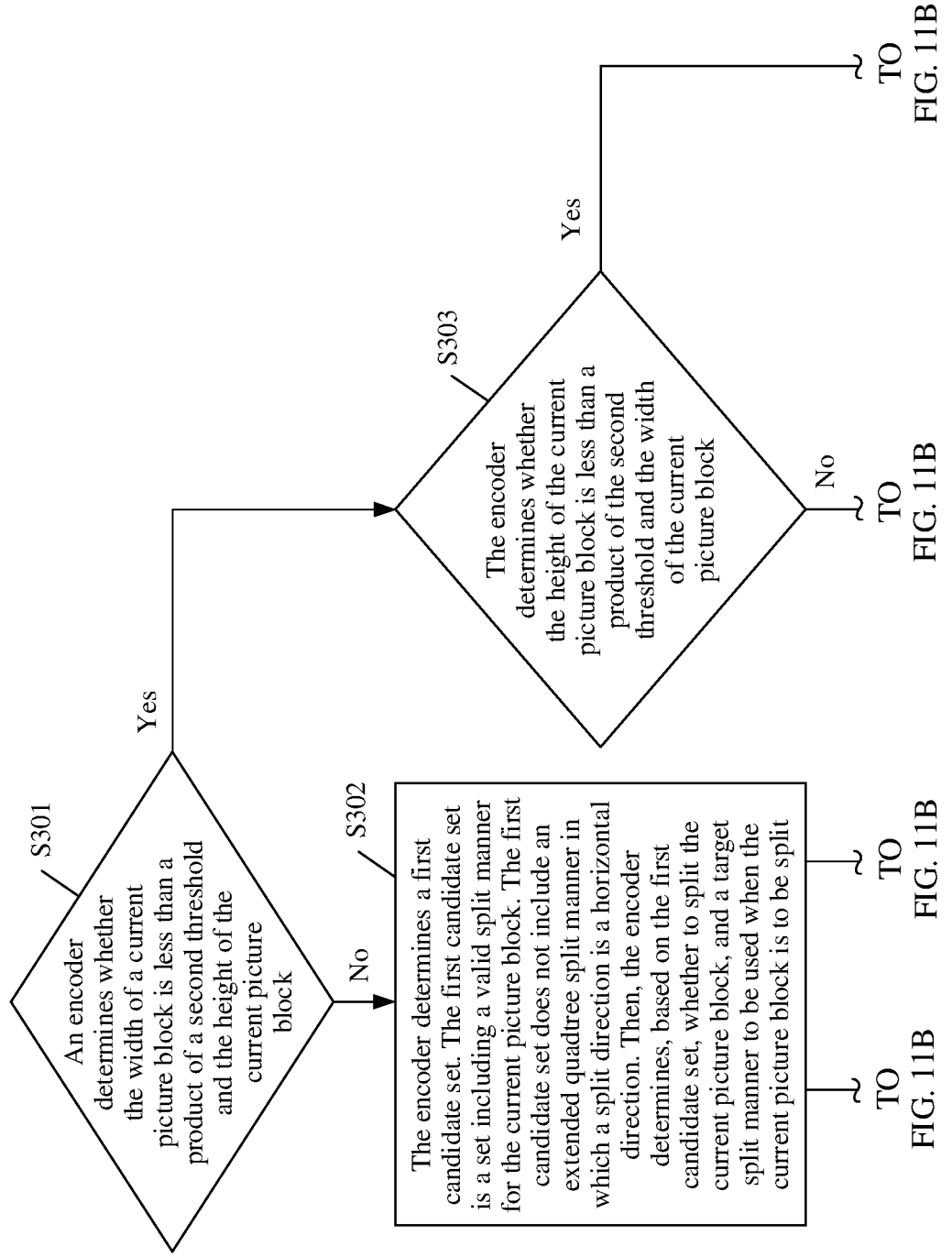
FIG. 11A is a schematic flowchart of another picture block split method according to an embodiment.
Figure 11B:
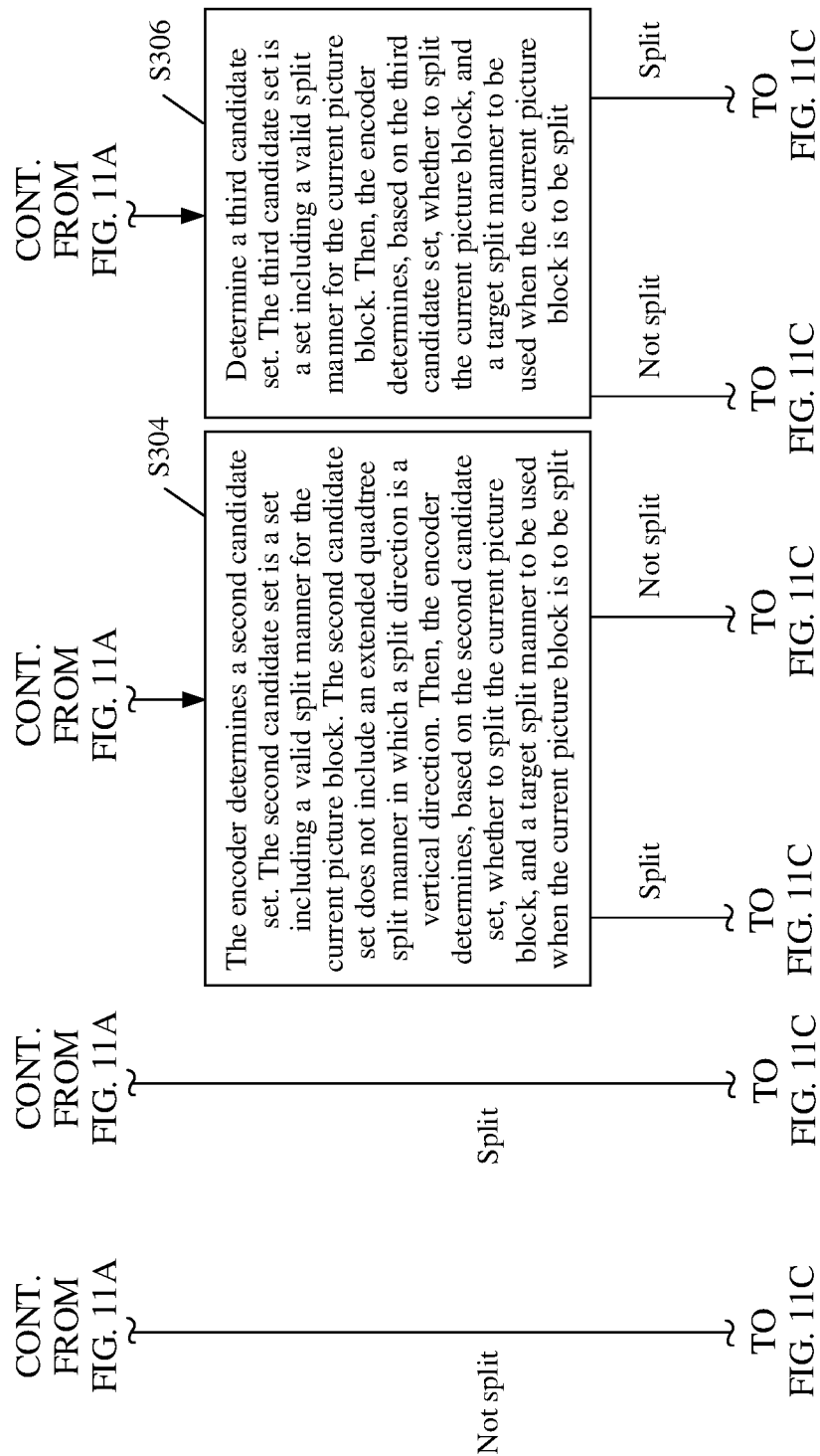
FIG. 11B is a schematic flowchart of another picture block split method according to an embodiment.
Figure 11C:
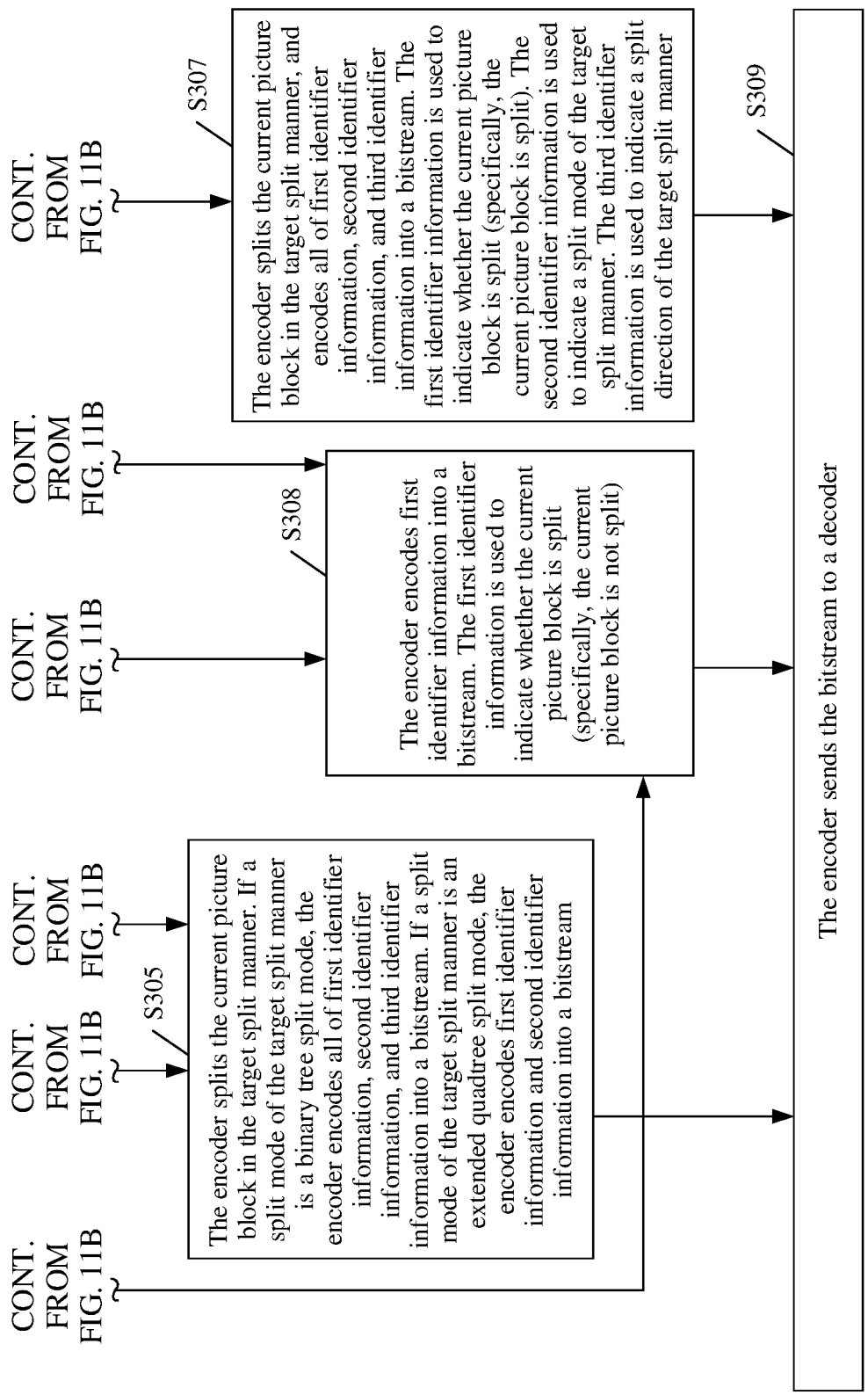
FIG. 11C is a schematic flowchart of another picture block split method according to an embodiment.

FIG. 11A to FIG. 11C are a schematic flowchart of a picture block split method according to an embodiment. For all of related descriptions of a current picture block, first identifier information, second identifier information, and third identifier information in this embodiment, refer to the foregoing descriptions. The method shown in FIG. 11A to FIG. 11C includes the following steps.

S301: An encoder determines whether the width of a current picture block is less than a product of a second threshold and the height of the current picture block.

If the width of the current picture block is not less than the product of the second threshold and the height of the current picture block, S302 is performed. If the width of the current picture block is less than the product of the second threshold and the height of the current picture block, S303 is performed.

The second threshold may be one half of an allowed maximum value of a ratio of a long-side length to a short-side length that are of a node in a coding tree. The second threshold may be a value greater than 1, for example, an integer greater than 1. The second threshold may be an integer power of 2. For example, the second threshold is 2, 4, 8, or the like. It may be noted that, unless otherwise specified, all examples in this embodiment are described by using an example in which the second threshold is a value greater than 1.

S302: The encoder determines a first candidate set. The first candidate set is a set including a valid split manner for the current picture block. The first candidate set does not include an EQT split manner in which a split direction is a horizontal direction. In other words, the EQT split manner in which the split direction is the horizontal direction is invalid. Then, the encoder determines, based on the first candidate set, whether to split the current picture block, and a target split manner to be used when the current picture block is to be split.

If the encoder determines to split the current picture block, S305 is performed.

If the encoder determines not to split the current picture block, S308 is performed.

The encoder may first determine a block split policy of the current picture block, where the block split policy does not include an EQT split whose split direction is the horizontal direction. When the current picture block does not satisfy a third condition, the encoder may determine that the block split policy of the current picture block does not include the EQT split whose split direction is the horizontal direction. The third condition may include: the width of the current picture block is less than the product of the second threshold and the height of the current picture block. Then, the encoder may determine the first candidate set according to at least the block split policy. For example, the encoder may determine the first candidate set according to a "minimum CU size principle" and the block split policy. If split manners applicable to the current picture block that are determined according to the "minimum CU principle" include a vertical binary tree split manner, a vertical EQT split manner, a horizontal binary tree split manner, and a horizontal EQT split manner, the first candidate set may include the horizontal binary tree split manner, the vertical binary tree split manner, and the vertical EQT split manner, but not include the horizontal EQT split manner.

S303: The encoder determines whether the height of the current picture block in a to-be-encoded picture is less than a product of the second threshold and the width of the current picture block.

If the height of the current picture block is not less than the product of the second threshold and the width of the current picture block, S304 is performed. If the height of the current picture block is less than the product of the second threshold and the width of the current picture block, S306 is performed.

S304: The encoder determines a second candidate set. The second candidate set is a set including a valid split manner for the current picture block. The second candidate set does not include an EQT split manner in which a split direction is a vertical direction. In other words, the EQT split manner in which the split direction is the vertical direction is invalid. Then, the encoder determines, based on the second candidate set, whether to split the current picture block, and a target split manner to be used when the current picture block is to be split.

If the encoder determines to split the current picture block, S305 is performed.

If the encoder determines not to split the current picture block, S308 is performed.

The encoder may first determine a block split policy of the current picture block, where the block split policy does not include an EQT split whose split direction is the vertical direction. When the current picture block does not satisfy a fourth condition, the encoder determines that the block split policy of the current picture block does not include the EQT split whose split direction is the vertical direction. The fourth condition includes: the height of the current picture block is less than the product of the second threshold and the width of the current picture block. Then, the encoder determines the second candidate set according to at least the block split policy. For example, the encoder may determine the second candidate set according to a "minimum CU size principle" and the block split policy. If split manners applicable to the current picture block that are determined according to the "minimum CU principle" include a vertical binary tree split manner, a vertical EQT split manner, a horizontal binary tree split manner, and a horizontal EQT split manner, the second candidate set may include the horizontal binary tree split manner, the vertical binary tree split manner, and the horizontal EQT split manner, but not include the vertical EQT split manner.

S305: The encoder splits the current picture block in the target split manner.

If a split mode of the target split manner is a binary tree split mode, the encoder encodes all of first identifier information, second identifier information, and third identifier information into a bitstream, where the first identifier information is used to indicate whether the current picture block is split (The current picture block is split), the second identifier information is used to indicate the split mode (which is the binary tree split mode) of the target split manner, and the third identifier information is used to indicate a split direction (which is the horizontal direction or the vertical direction) of the target split manner.

If a split mode of the target split manner is an EQT split mode, the encoder encodes first identifier information and second identifier information into a bitstream, where the first identifier information is used to indicate whether the current picture block is split (The current picture block is split), and the second identifier information is used to indicate the split mode (which is the EQT split mode) of the target split manner.

After S305 is performed, S309 is performed.

For S306 to S309, refer to S106 to S109.

It may be noted that, for a "split picture block" obtained after a split operation is performed, the encoder may use the "split picture block" as a current picture block, and return to perform S301 to S309.

In this embodiment, for an implementation in which the encoder determines whether to split the current picture block, and the target split manner to be used when the current picture block is to be split, refer to the foregoing description. Details are not described herein again.

It may be noted that an execution sequence between S301-S302 and S303-S304 may not be limited. For example, the encoder may first perform S303, and perform S301 when a determining result in S303 is "yes", or perform S304 when a determining result in S303 is "no". In addition, the encoder performs S306 when a determining result in S301 is "yes", or performs S302 when a determining result in S301 is "no".

Alternatively, the encoder may not perform S301 or S302, or not perform S303 or S304. For example, when the encoder does not perform S303 or S304, the encoder may directly perform S306 when a determining result in S301 is "yes".

According to a video encoding method provided in this embodiment, the block split policy of the current picture block is conditionally determined. Compared with that in a split method for a node in a second-level coding tree in an existing EQT solution, split complexity can be reduced, so that coding efficiency is improved. In addition, when the width of the current picture block is greater than or equal to the product of the second threshold and the height, and/or the height of the current picture block is greater than or equal to the product of the second threshold and the width, it is considered by default that the EQT split manner in which a split direction is perpendicular to the short side of the current picture block is invalid. Therefore, when the split mode is the EQT split, information indicating a split direction for splitting the current picture block does not need to be encoded into the bitstream, so that transmission bit overheads can be reduced. In addition, this solution helps limit a ratio of the width to the height (or a ratio of the height to the width) of a leaf node in a coding tree to a specific range, and helps avoid a "slender" node as much as possible in a coding process, thereby facilitating coding.

Figure 12A:
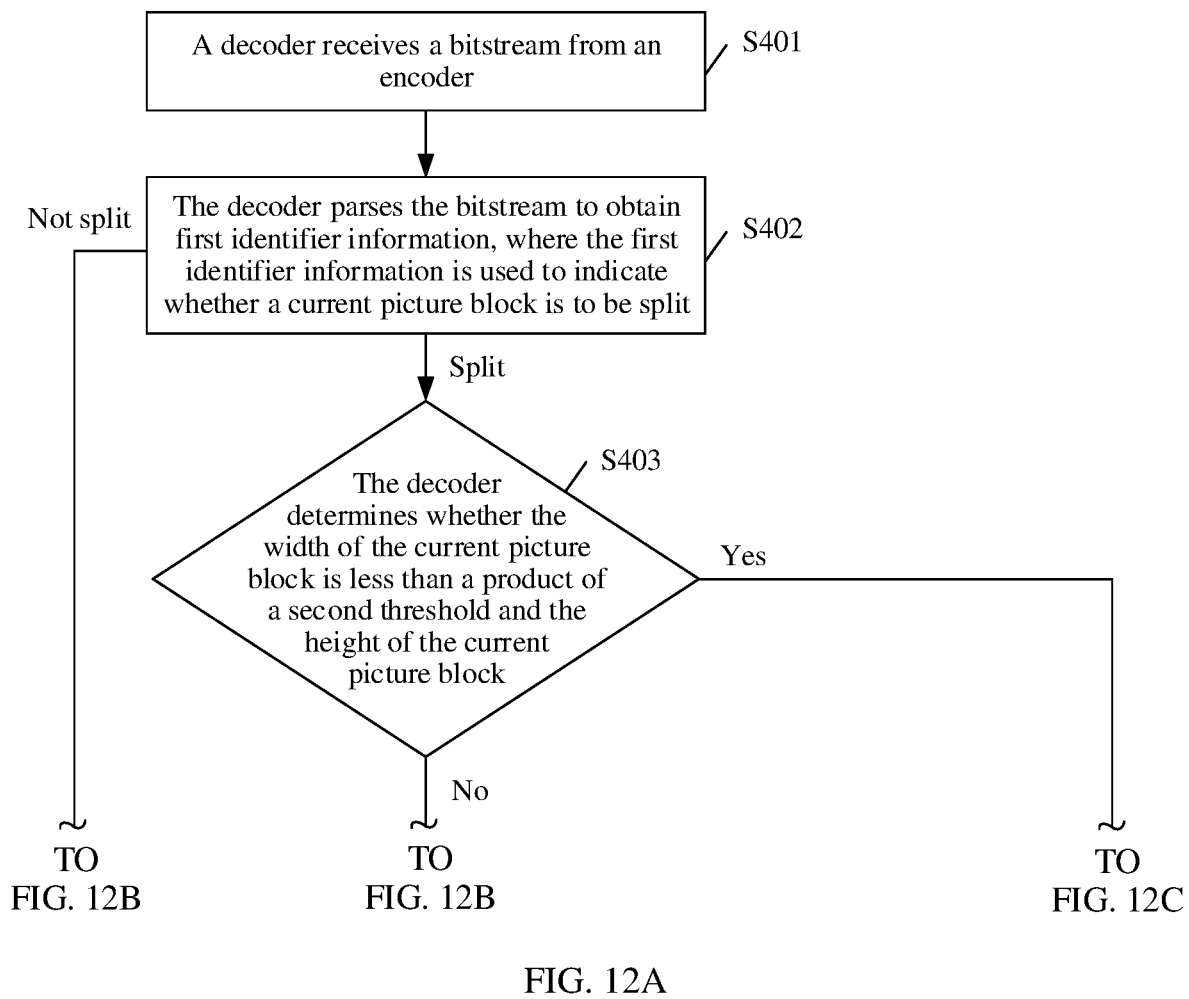
FIG. 12A is a schematic flowchart of another picture block split method according to an embodiment.
Figure 12B:
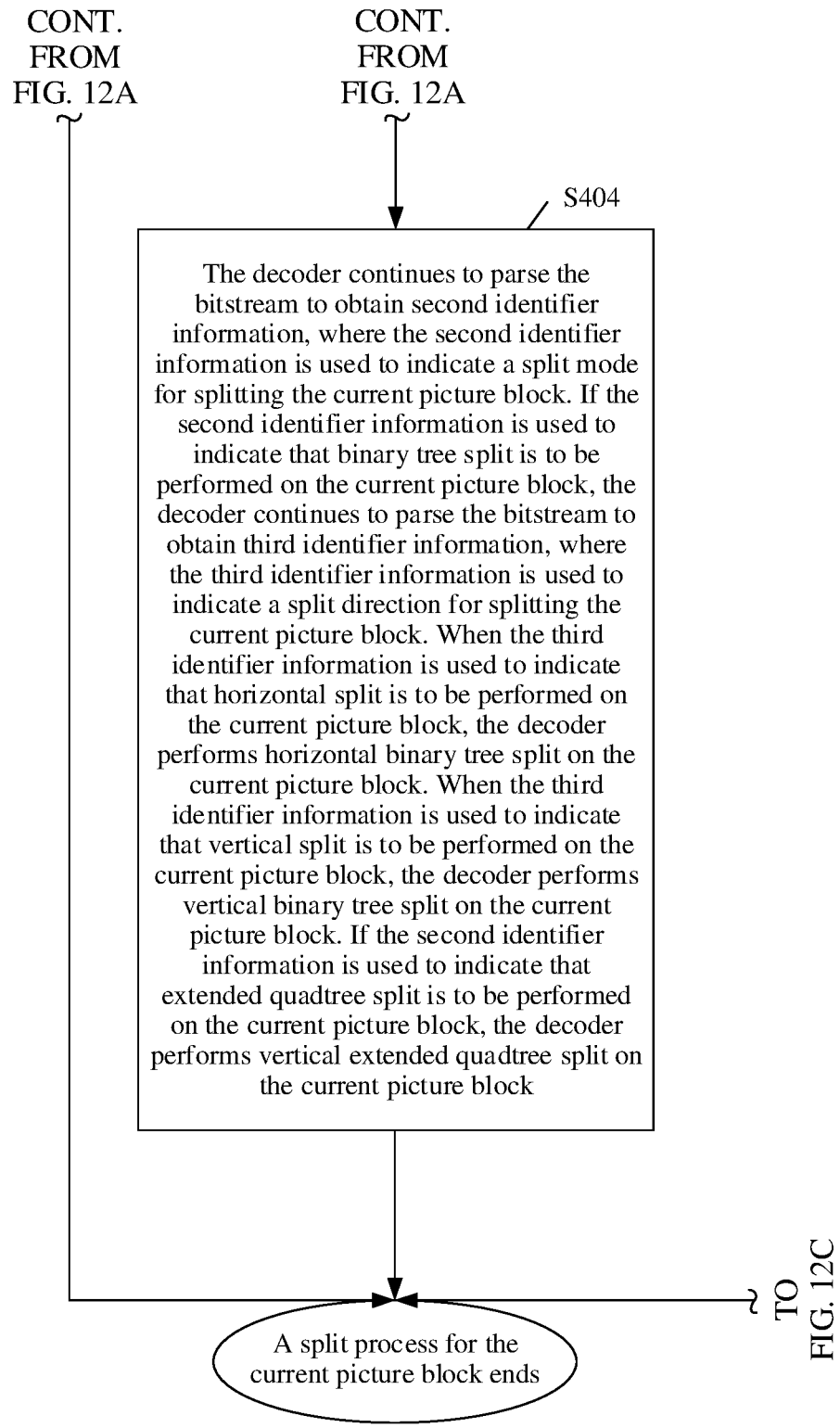
FIG. 12B is a schematic flowchart of another picture block split method according to an embodiment.
Figure 12C:
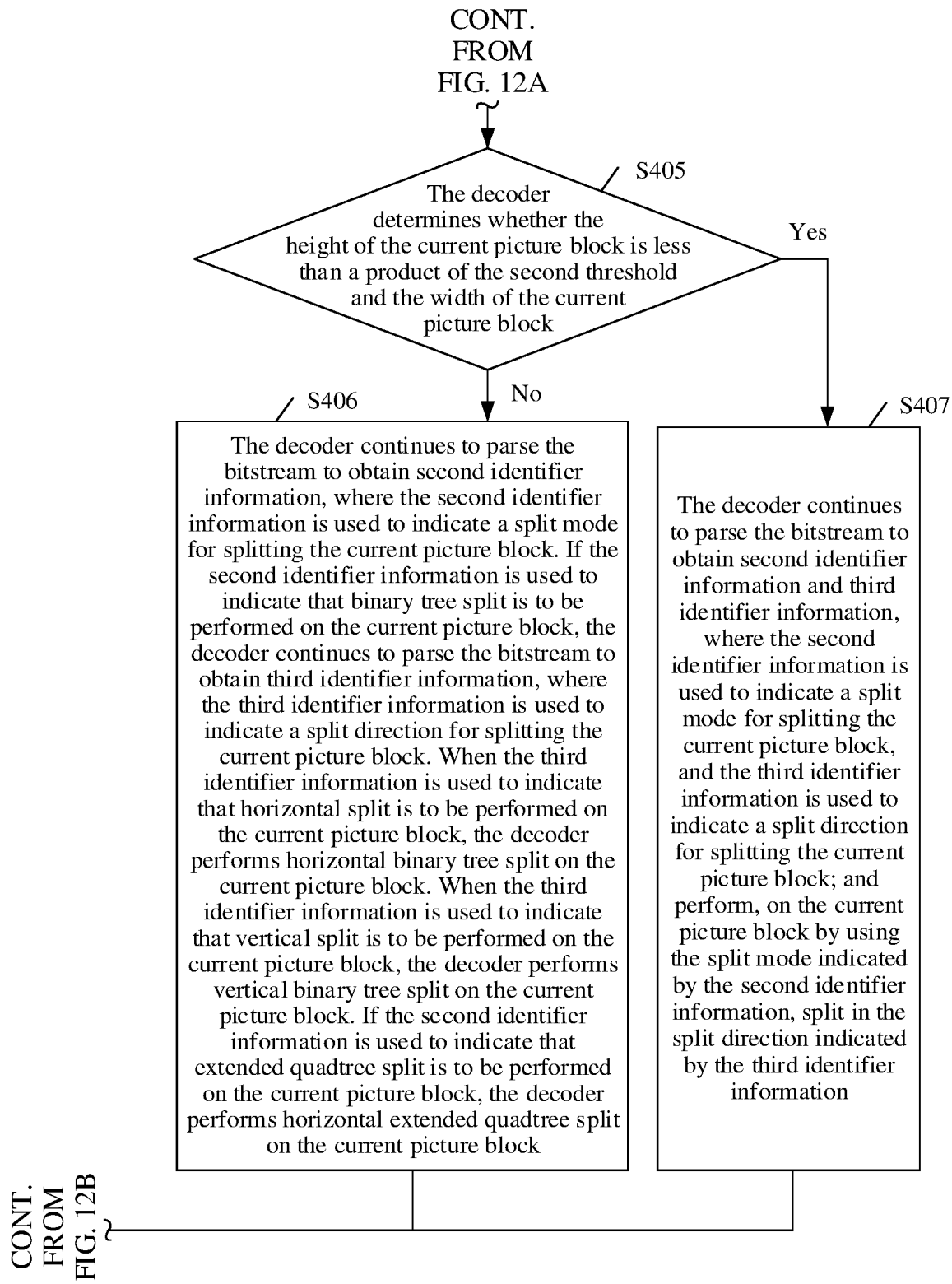
FIG. 12C is a schematic flowchart of another picture block split method according to an embodiment.

FIG. 12A to FIG. 12C are a schematic flowchart of a picture block split method according to an embodiment. A video decoding method shown in FIG. 12A to FIG. 12C corresponds to the video encoding method shown in FIG. 11A to FIG. 11C. The method shown in FIG. 12A to FIG. 12C includes the following steps.

S401: A decoder receives a bitstream from an encoder.

S402: The decoder parses the bitstream to obtain first identifier information, where the first identifier information is used to indicate whether a current picture block is to be split.

If the first identifier information indicates that the current picture block is to be split, S403 is performed.

If the first identifier information indicates that the current picture block is not to be split, a split process for the current picture block ends.

S403: The decoder determines whether the width of the current picture block is less than a product of a second threshold and the height of the current picture block.

If the width of the current picture block is not less than the product of the second threshold and the height of the current picture block, S404 is performed. If the width of the current picture block is less than the product of the second threshold and the height of the current picture block, S405 is performed.

S404: The decoder continues to parse the bitstream to obtain second identifier information, where the second identifier information is used to indicate a split mode for splitting the current picture block.

If the second identifier information is used to indicate that binary tree split is to be performed on the current picture block, the decoder continues to parse the bitstream to obtain third identifier information, where the third identifier information is used to indicate a split direction for splitting the current picture block. When the third identifier information is used to indicate that horizontal split is to be performed on the current picture block, the decoder performs horizontal binary tree split on the current picture block. When the third identifier information is used to indicate that vertical split is to be performed on the current picture block, the decoder performs vertical binary tree split on the current picture block.

If the second identifier information is used to indicate that EQT split is to be performed on the current picture block, the decoder performs vertical EQT split on the current picture block.

After S404 is performed, a split process for the current picture block ends.

S405: The decoder determines whether the height of the current picture block is less than a product of the second threshold and the width of the current picture block.

If the height of the current picture block is not less than the product of the second threshold and the width of the current picture block, S406 is performed. If the height of the current picture block is less than the product of the second threshold and the width of the current picture block, S407 is performed.

S406: The decoder continues to parse the bitstream to obtain second identifier information, where the second identifier information is used to indicate a split mode for splitting the current picture block.

If the second identifier information is used to indicate that binary tree split is to be performed on the current picture block, the decoder continues to parse the bitstream to obtain third identifier information, where the third identifier information is used to indicate a split direction for splitting the current picture block. When the third identifier information is used to indicate that horizontal split is to be performed on the current picture block, the decoder performs horizontal binary tree split on the current picture block. When the third identifier information is used to indicate that vertical split is to be performed on the current picture block, the decoder performs vertical binary tree split on the current picture block.

If the second identifier information is used to indicate that EQT split is to be performed on the current picture block, the decoder performs horizontal EQT split on the current picture block.

After S406 is performed, a split process for the current picture block ends.

For S407, refer to S207.

After S407 is performed, a split process for the current picture block ends.

It may be noted that, for a "split picture block" obtained after a split operation is performed, the decoder may use the "split picture block" as a current picture block, and perform S402 to S407.

It may be noted that an execution sequence between S403-S404 and S405-S406 may not be limited. For example, the decoder may first perform S405, and perform S403 when a determining result in S405 is "yes", or perform S406 when a determining result in S405 is "no". In addition, the decoder performs S407 when a determining result in S403 is "yes", or performs S404 when a determining result in S403 is "no".

Alternatively, the decoder may not perform S403 or S404, or not perform S405 or S406. For example, when the decoder does not perform S405 or S406, the decoder may directly perform S407 when a determining result in S403 is "yes". It may be understood that, during implementation, if the encoder performs S301 and S302, the decoder performs S403 and S404. If the encoder performs S303 and S304, the decoder performs S405 and S406.

According to the video decoding method provided in this embodiment, when the width of the current picture block is greater than or equal to the product of the second threshold and the height, and/or the height of the current picture block is greater than or equal to the product of the second threshold and the width, the decoder considers by default that an EQT split manner in which a split direction is perpendicular to the short side of the current picture block is invalid. In this way, when the split mode is the EQT split, the encoder does not need to encode, into the bitstream, information indicating a split direction for splitting the current picture block. Therefore, transmission bit overheads can be reduced. In addition, this solution helps limit a ratio of the width to the height (or a ratio of the height to the width) that are of a leaf node in a coding tree to a specific range, and helps avoid a "slender" node as much as possible in a coding process, thereby facilitating coding.

Figure 13:
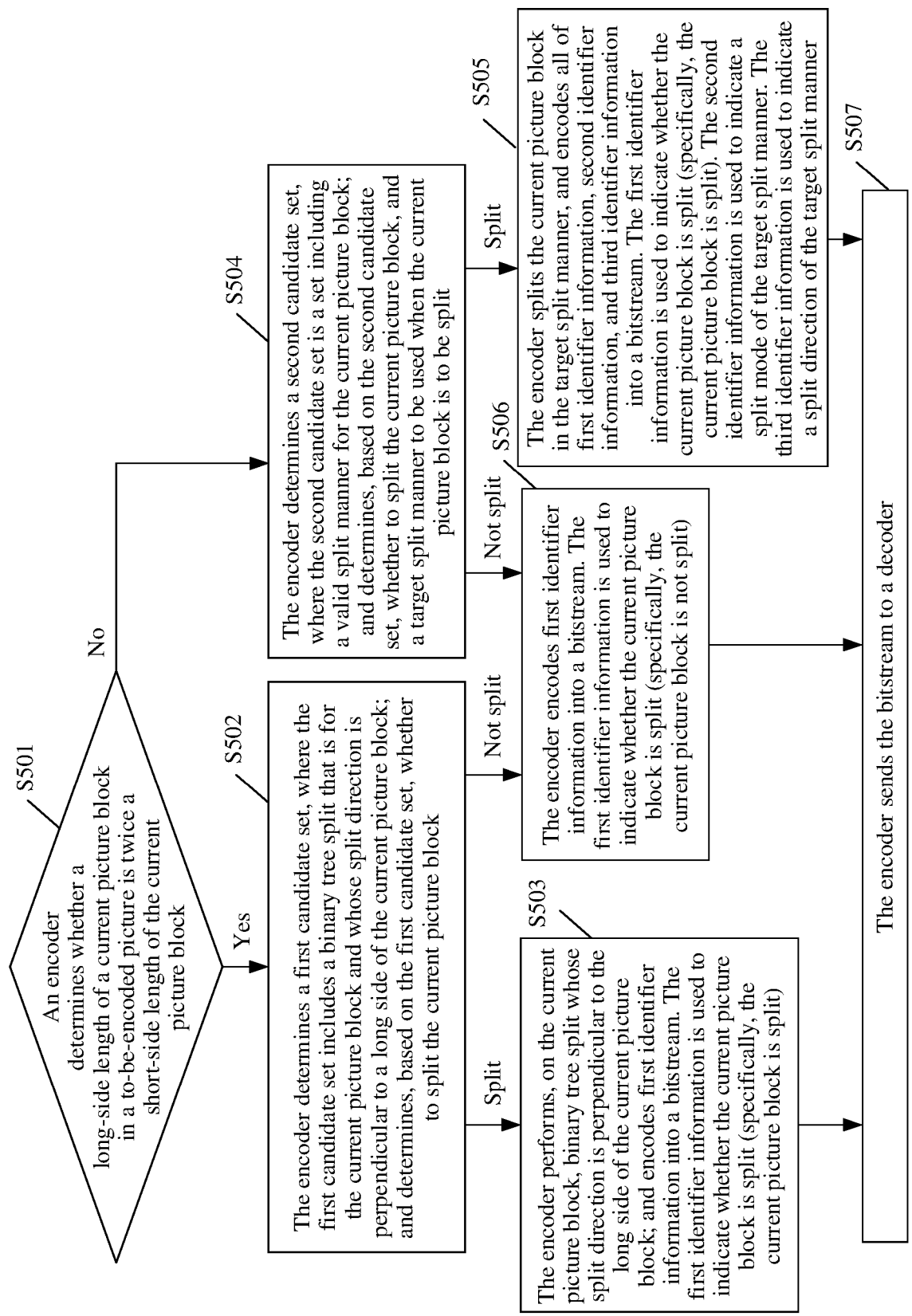
FIG. 13 is a schematic flowchart of a video encoding method according to an embodiment.

FIG. 13 is a schematic flowchart of a video encoding method according to an embodiment. The method shown in FIG. 13 includes the following steps.

S501: An encoder determines whether a long-side length of a current picture block in a to-be-encoded picture is twice a short-side length of the current picture block.

If the long-side length of the current picture block is twice the short-side length of the current picture block, S502 is performed. If the long-side length of the current picture block is not twice the short-side length of the current picture block, S503 is performed.

S502: The encoder determines a first candidate set, where the first candidate set includes a binary tree split that is for the current picture block and whose split direction is perpendicular to a long side of the current picture block; and determines, based on the first candidate set, whether to split the current picture block. If the encoder determines to split the current picture block, the current picture block may be referred to as a to-be-split picture block.

If the encoder determines to split the current picture block, S503 is performed.

If the encoder determines not to split the current picture block, S506 is performed.

When the width of the current picture block is the long side, and the height of the current picture block is a short side, the first candidate set includes a vertical binary tree split manner. When the width of the current picture block is a short side, and the height of the current picture block is the long side, the first candidate set includes a horizontal binary tree split manner.

S503: The encoder performs, on the current picture block, binary tree split whose split direction is perpendicular to the long side of the current picture block; and encodes first identifier information into a bitstream. The first identifier information is used to indicate whether the current picture block is split (The current picture block is split).

After S503 is performed, S507 is performed.

For S504 to S507, refer to S104 to S107.

It may be noted that, for a "split picture block" obtained after a split operation is performed, the encoder may use the "split picture block" as a current picture block, and return to perform S501 to S507.

According to the video encoding method provided in this embodiment, when the long-side length of the current picture block is twice the short-side length of the current picture block, if the current picture block is to be split, the encoder performs, by default, binary tree split whose split direction is perpendicular to the long side of the current picture block. In this way, compared with a split method for a node in a second-level coding tree in an existing EQT solution, the solution provided in this embodiment can reduce split complexity, so that coding efficiency is improved. Further, if the current picture block is split, information indicating a split manner (including a split mode and a split direction) for splitting the current picture block does not need to be encoded into the bitstream. Therefore, transmission bit overheads can be reduced. In addition, the current picture block can be split into two square picture blocks by performing, on the current picture block, binary tree split whose split direction is perpendicular to the long side of the current picture block. Compared with a non-square rectangular picture block, the square picture block has a higher probability of being subsequently split. Therefore, this helps improve coding accuracy of a video picture.

Figure 14:
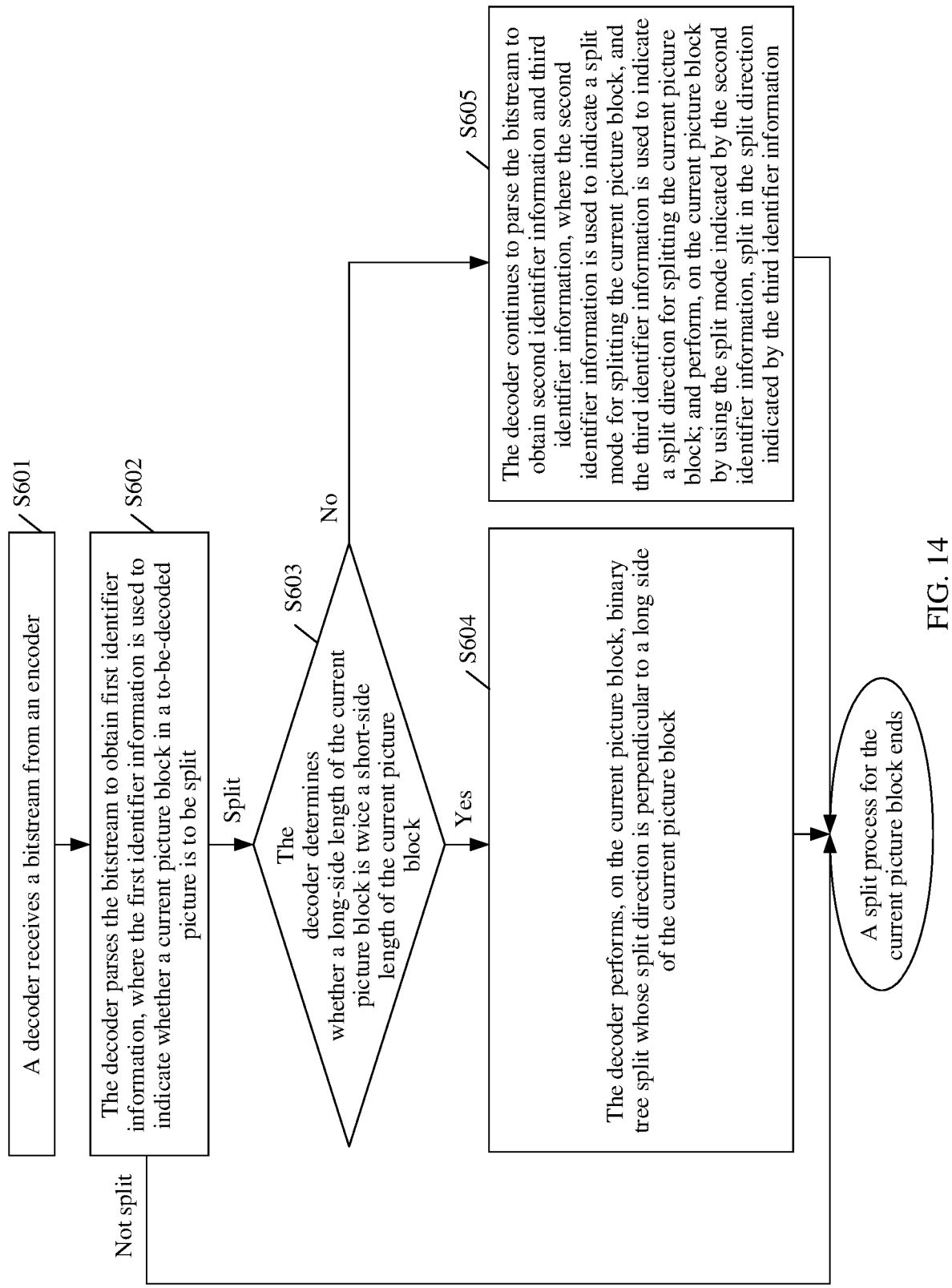
FIG. 14 is a schematic flowchart of a video decoding method according to an embodiment.

FIG. 14 is a schematic flowchart of a video decoding method according to an embodiment. The video decoding method shown in FIG. 14 corresponds to the video encoding method shown in FIG. 13. The method shown in FIG. 14 includes the following steps.

S601: A decoder receives a bitstream from an encoder.

S602: The decoder parses the bitstream to obtain first identifier information, where the first identifier information is used to indicate whether a current picture block in a to-be-decoded picture is to be split.

If the first identifier information indicates that the current picture block is not to be split, a split process for the current picture block ends.

If the first identifier information indicates that the current picture block is to be split, S603 is performed.

S603: The decoder determines whether a long-side length of the current picture block is twice a short-side length of the current picture block.

If the long-side length of the current picture block is twice the short-side length of the current picture block, S604 is performed. If the long-side length of the current picture block is not twice the short-side length of the current picture block, S605 is performed.

S604: The decoder performs, on the current picture block, binary tree split whose split direction is perpendicular to a long side of the current picture block.

After S604 is performed, a split process for the current picture block ends.

For S605, refer to S205.

It may be noted that, for a "split picture block" obtained after a split operation is performed, the decoder may use the "split picture block" as a current picture block, and perform S602 to S605.

According to the video decoding method provided in this embodiment, when the long-side length of the current picture block is twice the short-side length of the current picture block, if the current picture block is to be split, the decoder performs, by default, binary tree split whose split direction is perpendicular to the long side of the current picture block. In this way, the encoder does not need to encode, into the bitstream, information indicating a split manner (including a split mode and a split direction) for splitting the current picture block. Therefore, transmission bit overheads can be reduced.

For the embodiment shown in FIG. 13 or FIG. 14, the following provides several optional implementations.

The long-side length of the current picture block may be a length of 2a pixels, and the short-side length of the current picture block is a length of a pixels. Herein, a is an integer, and a may be an integer power of 2. For example, the long-side length of the current picture block is a length of 128 pixels, and the short-side length of the current picture block is a length of 64 pixels.

Optionally, the short-side length of the current picture block is equal to a side size of a maximum TU, or the short-side length of the current picture block is equal to a side size of a virtual pipeline data unit (VPDU).

The VPDU may also be referred to as a hardware pipeline unit, and is defined as a non-overlapping unit in a picture. A size of the VPDU may be a×a, and the side size is a length of a pixels. In a hardware decoder, consecutive VPDUs are processed by a plurality of pipelines in parallel at the same time. The size of the VPDU is roughly proportional to sizes of buffers at most pipeline stages. Therefore, it is very important to keep a very small VPDU size. In most hardware decoders, the size of the VPDU may be set to a size of the maximum transform unit. However, in an AVS3 video coding standard, EQT and binary tree partitions may result in an increase in the VPDU size. To keep the VPDU size to be an a×a (for example, 64×64) luma sample, a same luma sample cannot cross different VPDUs.

The current picture block may be a boundary picture block. If one or more pixels in a current node are outside a current picture boundary, it means that the current node is outside the picture boundary. In this case, the current node is a boundary picture block.

It may be noted that, for any video coding (including encoding and decoding) method provided above, if a current picture block is split, a coder may reconstruct a to-be-coded picture block based on a split picture block; or if a current picture block is not split, a coder may perform an operation such as reconstruction on a to-be-coded picture block based on the current picture block. For an implementation process, refer to the conventional technology.

It may be noted that, in a case without a conflict, some features in at least two video encoding methods (such as the video encoding method described in FIG. 9A to FIG. 9C, FIG. 11A to FIG. 11C, or FIG. 13) described above may be combined to form a new video encoding method. Corresponding features in video decoding methods corresponding to the at least two video encoding methods may be combined to form a new video decoding method.

When a second threshold is one half of a first threshold, in an example, a video encoding method obtained after FIG. 9A to FIG. 9C and FIG. 11A to FIG. 11C may be combined and may include the following.

If a ratio of a long-side length to a short-side length that are of a current picture block is greater than or equal to the first threshold, a valid split manner for the current picture block does not include a split manner that is for the current picture block and in which a split direction is perpendicular to a short side of the to-be-split picture block.

If a ratio of a long-side length to a short-side length that are of a current picture block is less than the first threshold and greater than or equal to the second threshold, a valid split manner for the current picture block does not include an EQT split manner that is for the current picture block and in which a split direction is perpendicular to a short side of the to-be-split picture block. It may be understood that, because the width and the height of the current picture block are usually integer powers of 2, when both the second threshold and the first threshold are integer powers of 2, "a ratio of a long-side length to a short-side length that are of a current picture block is less than the first threshold and greater than or equal to the second threshold" is equivalent to "a ratio of a long-side length to a short-side length that are of a current picture block is equal to the second threshold". For example, if the first threshold is 8 and the second threshold is 4, there is only one possibility that "the ratio of the long-side length to the short-side length is less than 8 and greater than or equal to 4", that is, the ratio of the long-side length to the short-side length is equal to 4.

If a ratio of a long-side length to a short-side length that are of a current picture block is less than the second threshold, valid split manners for the current picture block may include a horizontal binary tree split manner, a vertical binary tree split manner, a horizontal EQT split manner, and a vertical EQT split manner.

Other examples are not enumerated one by one.

According to any embodiment provided above, the following describes implementations of first identifier information, second identifier information, and third identifier information.

For example, if the current picture block is not split, the first identifier information may be a binary number "0". If the current picture block is split, the first identifier information may be a binary number "1".

For example, if a split mode of a target split manner is a binary tree split mode, the second identifier information may be a binary number "0". If a determined split mode is an EQT split mode, the second identifier information may be a binary number "1".

For example, if a split direction of a target split manner is a horizontal direction, the third identifier information may be a binary number "0". If a determined split direction is a vertical direction, the third identifier information may be a binary number "1".

For example, the first identifier information may be information included in a "split_flag" field in a bitstream.

For example, the second identifier information may be information included in a "SplitMode" field in the bitstream. When SplitMode is 1, it indicates a binary tree split mode. When SplitMode is 0, it indicates an EQT split mode.

For example, the third identifier information may be information included in a "SplitDir" field in the bitstream. When SplitDir is 1, it indicates a vertical split. When SplitDir is 0, it indicates a horizontal split.

The foregoing mainly describes, from a method perspective, the solutions provided in the embodiments. To implement the foregoing functions, corresponding hardware structures and/or software modules for performing the functions are included. A person of ordinary skill in the art may understand that, in combination with the examples of units and algorithm steps described in the embodiments, this application can be implemented by hardware or a combination of hardware and computer software. Whether a function is performed by hardware or hardware driven by computer software depends on particular applications and design constraints of the solutions. A person of ordinary skill in the art may use different methods to implement the described functions for each particular application.

In the embodiments, the encoder/decoder may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It may be noted that, in the embodiments, division into modules is an example, and is merely logical function division. During actual implementation, there may be another division manner.

Figure 15:
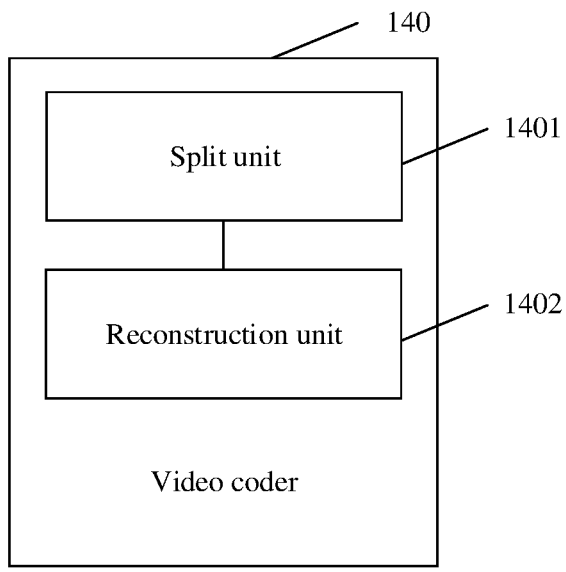
FIG. 15 is a schematic structural diagram of a video coder according to an embodiment.

FIG. 15 is a schematic block diagram of a video coder 140 according to an embodiment. The video coder 140 may be an encoder or a decoder. When the video coder 140 is the encoder, the video coder 140 may be configured to perform any video encoding method provided in the embodiments, for example, the video encoding method shown in FIG. 9A to FIG. 9C, FIG. 11A to FIG. 11C, or FIG. 13. When the video coder 140 is the decoder, the video coder 140 may be configured to perform any video decoding method provided in the embodiments, for example, the video decoding method shown in FIG. 10A and FIG. 10B, FIG. 12A to FIG. 12C, or FIG. 14.

Figure 16:
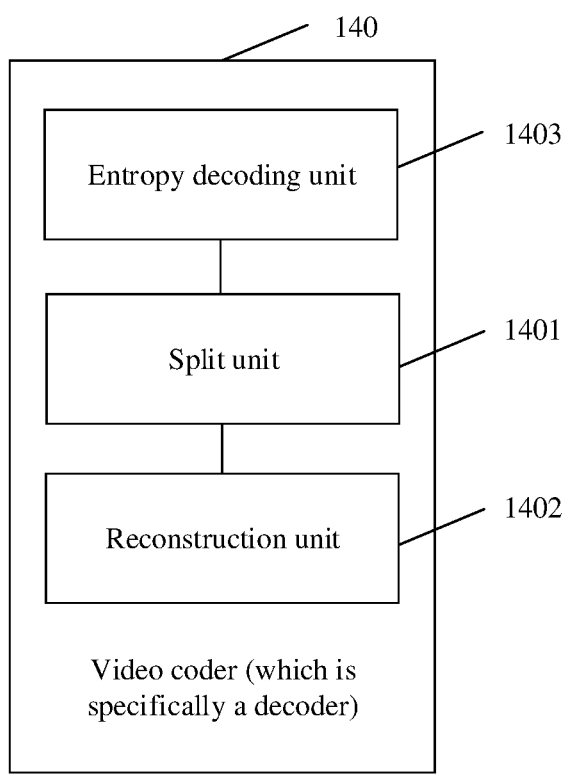
FIG. 16 is a schematic structural diagram of another video coder according to an embodiment.

The video coder 140 may include a split unit 1401 and a reconstruction unit 1402. As shown in FIG. 16, when the video coder 140 is a video decoder, the video decoder may further include an entropy decoding unit 1403.

The video coder 140 may be the encoder 20 in FIG. 2. In this case, the split unit 1401 may be a subunit in the prediction processing unit 260, or may be a unit connected to all of the prediction processing unit 260, the reconstruction unit 214, and the entropy encoding unit 270, and the reconstruction unit 1402 may be the reconstruction unit 214.

The video coder 140 may be the decoder 30 in FIG. 3. In this case, the split unit 1401 may be a subunit in the prediction processing unit 360, or may be a unit connected to all of the prediction processing unit 360, the reconstruction unit 314, and the entropy decoding unit 304, and the reconstruction unit 1402 may be the reconstruction unit 314.

In some embodiments, the split unit 1401 may be configured to: determine a block split policy of a current picture block based on a size relationship between the width and the height of the current picture block, and apply the block split policy to the current picture block to obtain a coding block. The reconstruction unit 1402 may be configured to reconstruct the obtained coding block to reconstruct the current picture block.

The split unit 1401 may be configured to: determine whether the current picture block satisfies a first condition, where the first condition may include: the width of the current picture block is less than a product of a first threshold and the height of the current picture block; and when the current picture block does not satisfy the first condition, determine that the block split policy is a split whose split direction is a vertical direction, where the vertical direction is perpendicular to a direction of a side on which the width of the current picture block is located.

The split unit 1401 may be configured to: determine whether the current picture block satisfies a second condition, where the second condition may include: the height of the current picture block is less than a product of a first threshold and the width of the current picture block; and when the current picture block does not satisfy the second condition, determine that the block split policy is a split whose split direction is a horizontal direction, where the horizontal direction is perpendicular to a direction of a side on which the height of the current picture block is located.

The split unit 1401 may be configured to: determine whether the current picture block satisfies a first condition, where the first condition may include: the width of the current picture block is less than a product of a first threshold and the height of the current picture block; and when the current picture block does not satisfy the first condition, determine that the block split policy of the current picture block does not include a split whose split direction is a horizontal direction, where the horizontal direction is perpendicular to a direction of a side on which the height of the current picture block is located. For example, with reference to FIG. 9A to FIG. 9C, the split unit 1401 may be configured to perform S102 and S105. For another example, with reference to FIG. 10A and FIG. 10B, the split unit 1401 may be configured to perform S203 and S204.

The split unit 1401 may be configured to: determine whether the current picture block satisfies a second condition, where the second condition may include: the height of the current picture block is less than a product of a first threshold and the width of the current picture block; and when the current picture block does not satisfy the second condition, determine that the block split policy of the current picture block does not include a split whose split direction is a vertical direction, where the vertical direction is perpendicular to a direction of a side on which the width of the current picture block is located. For example, with reference to FIG. 9A to FIG. 9C, the split unit 1401 may be configured to perform S103 and S104. For another example, with reference to FIG. 10A and FIG. 10B, the split unit 1401 may be configured to perform S205 and S207.

The entropy decoding unit 1403 may be configured to parse a bitstream to obtain identifier information, where the identifier information is used to indicate a split mode for splitting the current picture block. Correspondingly, the split unit 1401 may be configured to perform, on the current picture block according to the block split policy (which is a block split policy determined when the first condition is not satisfied) by using the split mode indicated by the identifier information, split whose split direction is the vertical direction, to obtain the coding block. For example, with reference to FIG. 10A and FIG. 10B, the entropy decoding unit 1403 may be configured to perform the parsing step in S204. The split unit 1401 may be configured to perform the split step in S204.

The entropy decoding unit 1403 may be configured to parse a bitstream to obtain identifier information, where the identifier information is used to indicate a split mode for splitting the current picture block. Correspondingly, the split unit 1401 may be configured to perform, on the current picture block according to the block split policy (which is a block split policy determined when the second condition is not satisfied) by using the split mode indicated by the identifier information, split whose split direction is the horizontal direction. For example, with reference to FIG. 10A and FIG. 10B, the entropy decoding unit 1403 may be configured to perform the parsing step in S207. The split unit 1401 may be configured to perform the split step in S207.

The first threshold may be an allowed maximum value of a ratio of a long-side length to a short-side length that are of a node in a coding tree.

The first threshold may be a value greater than 1. Optionally, the first threshold is an integer power of 2.

The split unit 1401 may be configured to: determine whether the current picture block satisfies a third condition, where the third condition may include: the width of the current picture block is less than a product of a second threshold and the height of the current picture block; and when the current picture block does not satisfy the third condition, determine that the block split policy is an EQT split whose split direction is a vertical direction, where the vertical direction is perpendicular to a direction of a side on which the width of the current picture block is located.

The split unit 1401 may be configured to: determine whether the current picture block satisfies a fourth condition, where the fourth condition may include: the height of the current picture block is less than a product of a second threshold and the width of the current picture block; and when the current picture block does not satisfy the fourth condition, determine that the block split policy is an EQT split whose split direction is a horizontal direction, where the horizontal direction is perpendicular to a direction of a side on which the height of the current picture block is located.

The split unit 1401 may be configured to: determine whether the current picture block satisfies a third condition, where the third condition may include: the width of the current picture block is less than a product of a second threshold and the height of the current picture block; and when the current picture block does not satisfy the third condition, determine that the block split policy of the current picture block does not include an EQT split whose split direction is a horizontal direction, where the horizontal direction is perpendicular to a direction of a side on which the height of the current picture block is located. For example, with reference to FIG. 11A to FIG. 11C, the split unit 1401 may be configured to perform S301, and the step of determining the first candidate set in S302. For another example, with reference to FIG. 12A to FIG. 12C, the split unit 1401 may be configured to perform the split step in S404 when the second identifier information is used to indicate that EQT split is to be performed on the current picture block.

The split unit 1401 may be configured to: determine whether the current picture block satisfies a fourth condition, where the fourth condition may include: the height of the current picture block is less than a product of a second threshold and the width of the current picture block; and when the current picture block does not satisfy the fourth condition, determine that the block split policy of the current picture block does not include an EQT split whose split direction is a vertical direction, where the vertical direction is perpendicular to a direction of a side on which the width of the current picture block is located. For example, with reference to FIG. 11A to FIG. 11C, the split unit 1401 may be configured to perform S303, and the step of determining the second candidate set in S304. For another example, with reference to FIG. 12A to FIG. 12C, the split unit 1401 may be configured to perform the split step in S406 when the second identifier information is used to indicate that EQT split is to be performed on the current picture block.

The entropy decoding unit 1403 may be configured to parse a bitstream to obtain identifier information, where the identifier information is used to indicate a split mode for splitting the current picture block. Correspondingly, the split unit 1401 may be configured to: when the identifier information indicates that EQT split is to be performed on the current picture block, perform, on the current picture block according to the block split policy (which is a block split policy determined when the third condition is not satisfied), EQT split whose split direction is the vertical direction. For example, with reference to FIG. 12A to FIG. 12C, the entropy decoding unit 1403 may be configured to perform the parsing step in S404 when the second identifier information is used to indicate that EQT split is to be performed on the current picture block, and the split unit 1401 may be configured to perform the split step in S404 when the second identifier information is used to indicate that EQT split is to be performed on the current picture block.

The entropy decoding unit 1403 may be configured to parse a bitstream to obtain identifier information, where the identifier information is used to indicate a split mode for splitting the current picture block. Correspondingly, the split unit 1401 is configured to: when the identifier information indicates that EQT split is to be performed on the current picture block, perform, on the current picture block according to the block split policy (which is a block split policy determined when the fourth condition is not satisfied), EQT split whose split direction is the horizontal direction. For example, with reference to FIG. 12A to FIG. 12C, the entropy decoding unit 1403 may be configured to perform the parsing step in S406 when the second identifier information is used to indicate that EQT split is to be performed on the current picture block. The split unit 1401 may be configured to perform the split step in S406 when the second identifier information is used to indicate that EQT split is to be performed on the current picture block.

The second threshold may be one half of an allowed maximum value of a ratio of a long-side length to a short-side length that are of a node in a coding tree.

The second threshold may be a value greater than 1. Optionally, the second threshold is an integer power of 2.

In some other embodiments, the split unit 1401 may be configured to: if a long-side length of a to-be-split picture block in a to-be-coded picture is twice a short-side length of the to-be-split picture block, perform, on the to-be-split picture block, binary tree split whose split direction is perpendicular to a long side of the to-be-split picture block, to obtain a split picture block. The reconstruction unit 1402 may be configured to reconstruct the to-be-coded picture based on the split picture block. For example, with reference to FIG. 13, the split unit 1401 may be configured to perform the split operation in S503. For another example, with reference to FIG. 14, the split unit 1401 may be configured to perform S604.

The long-side length of the to-be-split picture block may be a length of 128 pixels, and the short-side length of the to-be-split picture block may be a length of 64 pixels.

The short-side length of the to-be-split picture block may be equal to a side size of a maximum transform unit TU, or the short-side length of the to-be-split picture block may be equal to a side size of a virtual pipeline data unit VPDU.

The to-be-split picture block may be a boundary picture block.

In some embodiments, the split unit 1401 may be configured to: determine, based on whether a current picture block satisfies a first condition, whether a binary tree split in a horizontal direction is allowed to be performed on the current picture block, where the horizontal direction is perpendicular to a direction of a side on which the height of the current picture block is located, the first condition includes: the width of the current picture block is less than a product of a first threshold and the height of the current picture block, and when the current picture block satisfies the first condition, it is determined that the binary tree split in the horizontal direction is allowed to be performed on the current picture block; and obtain a coding block of the current picture block when determining that the binary tree split in the horizontal direction is allowed to be performed on the current picture block. The reconstruction unit 1402 may be configured to reconstruct the obtained coding block to reconstruct the current picture block.

In some embodiments, the split unit 1401 may be configured to: determine, based on whether a current picture block satisfies a second condition, whether a binary tree split in a vertical direction is allowed to be performed on the current picture block, where the vertical direction is perpendicular to a direction of a side on which the width of the current picture block is located, the second condition includes: the height of the current picture block is less than a product of a first threshold and the width of the current picture block, and when the current picture block satisfies the second condition, it is determined that the binary tree split in the vertical direction is allowed to be performed on the current picture block; and obtain a coding block of the current picture block when determining that the binary tree split in the vertical direction is allowed to be performed on the current picture block. The reconstruction unit 1402 is configured to reconstruct the obtained coding block to reconstruct the current picture block.

In some embodiments, the split unit 1401 may be configured to: determine, based on whether a current picture block satisfies a first condition, whether a split in a horizontal direction is allowed to be performed on the current picture block, where the horizontal direction is perpendicular to a direction of a side on which the height of the current picture block is located, the first condition includes: the width of the current picture block is less than a product of a first threshold and the height of the current picture block, and when the current picture block does not satisfy the first condition, it is determined that the split in the horizontal direction is not allowed to be performed on the current picture block; and obtain a coding block of the current picture block when determining that the split in the horizontal direction is not allowed to be performed on the current picture block. The reconstruction unit 1402 may be configured to reconstruct the obtained coding block to reconstruct the current picture block.

In some embodiments, the split unit 1401 may be configured to: determine, based on whether a current picture block satisfies a second condition, whether a split in a vertical direction is allowed to be performed on the current picture block, where the vertical direction is perpendicular to a direction of a side on which the width of the current picture block is located, the second condition includes: the height of the current picture block is less than a product of a first threshold and the width of the current picture block, and when the current picture block does not satisfy the second condition, it is determined that the split in the vertical direction is not allowed to be performed on the current picture block; and obtain a coding block of the current picture block when determining that the split in the vertical direction is not allowed to be performed on the current picture block. The reconstruction unit 1402 may be configured to reconstruct the obtained coding block to reconstruct the current picture block.

It may be understood that the modules in the video coder 140 provided in the embodiments are functional bodies for implementing various execution steps included in the corresponding methods provided above, that is, functional bodies that can completely implement steps in the embodiments and extensions and variations of these steps. For details, refer to the descriptions of the foregoing corresponding methods. For brevity, details are not described.

It may be noted that, in an EQT solution, because a binary tree split and an EQT split may be used for a node of a second-level coding tree, a maximum of four types of splits need to be attempted for encoding one node, and a maximum of four types of splits may also be attempted for a child node of the node. This causes relatively high coding complexity. Based on this, the embodiments provide a new CU split method and apparatus, to reduce complexity of splitting a CU in a system.

Figure 17:
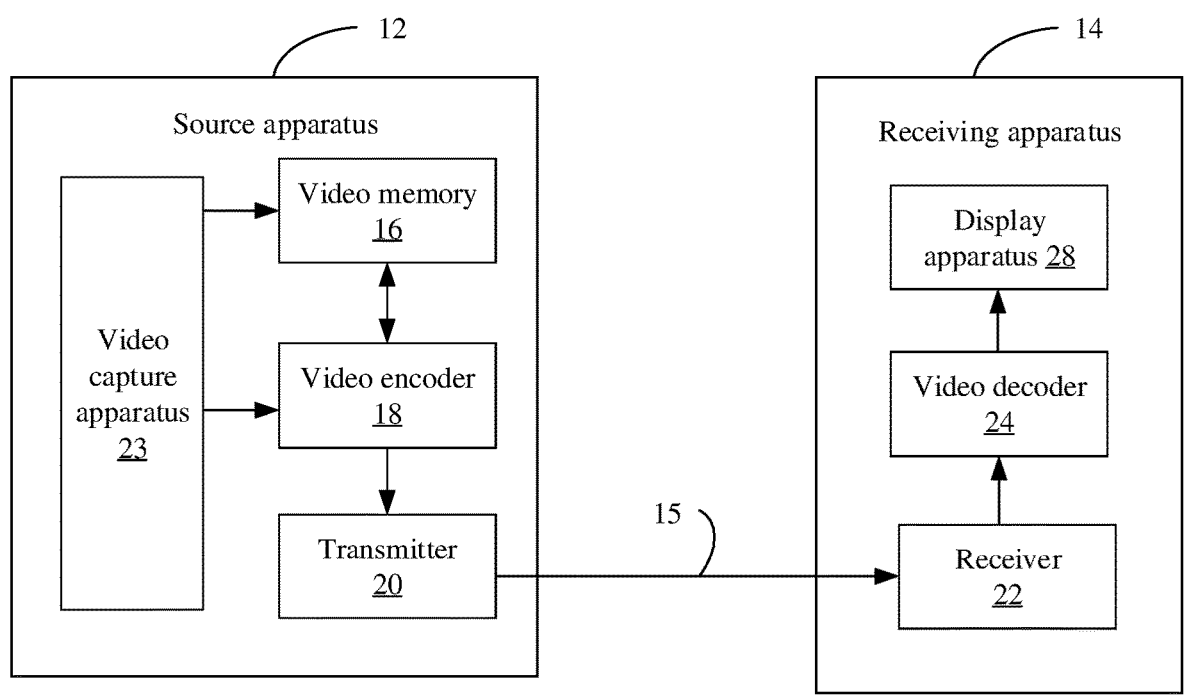
FIG. 17 is a schematic diagram of a video communications system applicable to an embodiment.

The embodiments are applied to a video encoder/decoder. A video communications system is shown in FIG. 17. The communications system includes a source apparatus 12, a receiving apparatus 14, and a connection line 15 between the source apparatus 12 and the receiving apparatus 14. The source apparatus includes a video memory 16, a video encoder 18, a transmitter 20, and a video capture apparatus 23. The receiving apparatus 14 includes a receiver 22, a video decoder 24, and a display apparatus 26. The embodiments are applied to the video encoder 18 and the video decoder 24.

Embodiment 1 relates to a video decoding method.

Figure 18:
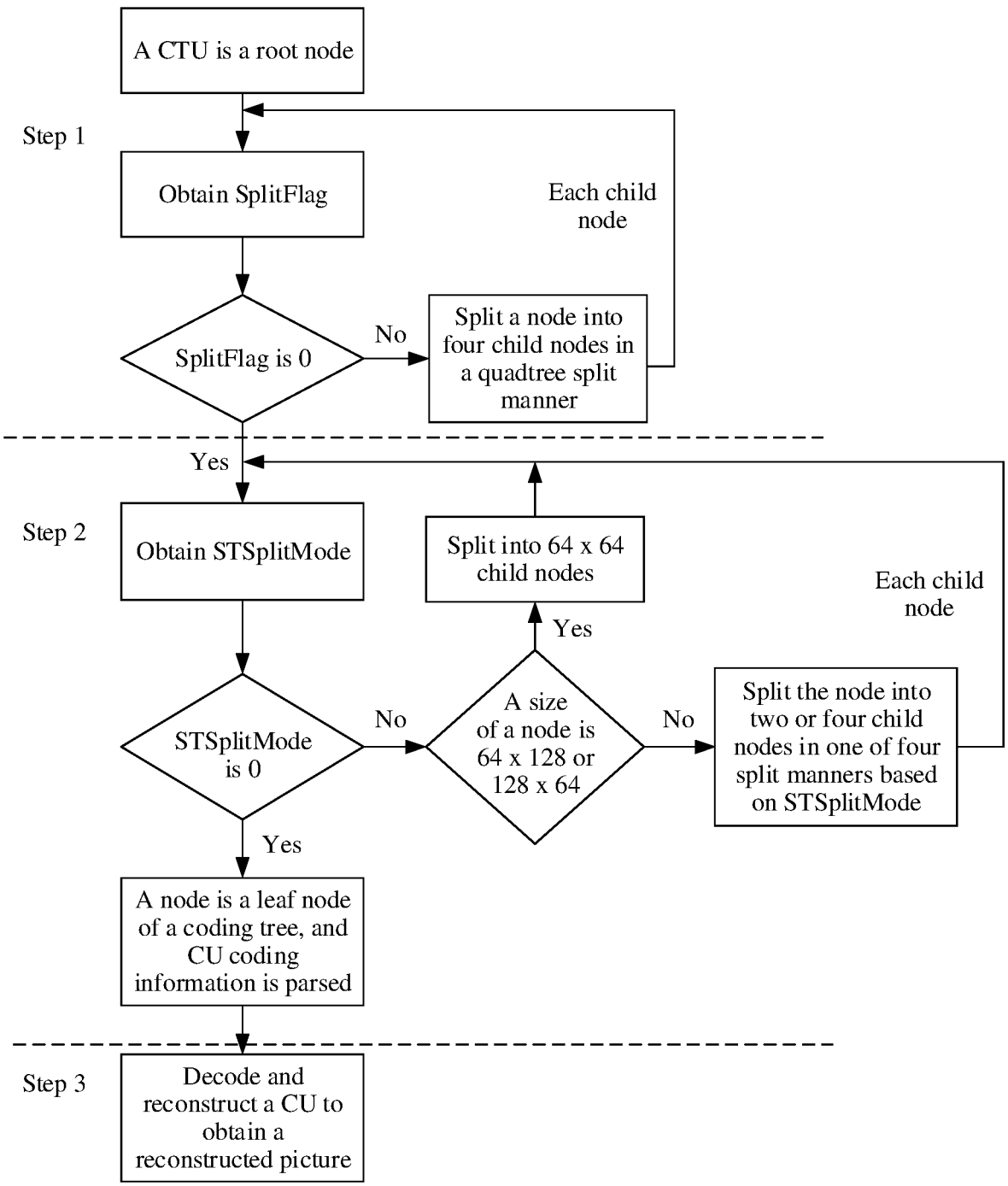
FIG. 18 is a schematic flowchart of another video decoding method according to an embodiment.

At least one CTU in a compressed bitstream is decoded based on encoding information of the CTU, to obtain a reconstructed picture block of the CTU. When a CTU is decoded, CU parsing processing (step 1 and step 2) and CU decoding processing (step 3) are performed on each CU, to finally obtain all reconstructed pixels of the CTU. Step 2 is a novel step, and step 1 and step 3 are the conventional technology. A flowchart is shown in FIG. 18.

A size of the CTU may be 64×64, 128×128, 256×256, or the like. One CTU is split into a group of CUs that do not overlap each other, and the group of CUs covers the entire CTU. One group of CUs includes one or more CUs. One CU includes luma pixels of N rows and M columns, or includes chroma pixels of N rows and M columns, or includes luma pixels of N rows and M columns and chroma pixels of N/2 rows and M/2 columns (for example, in a YUV420 format), or includes luma pixels of N rows and M columns and chroma pixels of N rows and M columns (for example, in a YUV444 format), or includes RGB pixels of N rows and M columns (for example, in an RGB format). N and M are integer powers of 2.

Step 1: Parse split information of a first-level coding tree by using a CTU as a root node of the first-level coding tree, to obtain a leaf node of the first-level coding tree. A split manner for the first-level coding tree is a QT split or no split.

This step is the conventional technology, for example, processing of splitting a CTU into QT leaf nodes in an AVS solution. The method includes: parsing a bitstream by using the CTU as the root node, to obtain a syntax element SplitFlag. If SplitFlag is 0, a node is a leaf node of the first-level coding tree. If SplitFlag is not 0, a node is split into four child nodes of the first-level coding tree in a quadtree split manner. The width and the height of each child node are half of those of the node. The bitstream is parsed for each child node in sequence to obtain a syntax element SplitFlag, and whether the node is a leaf node of the first-level coding tree is determined. If the node is not a leaf node of the first-level coding tree, quadtree split continues to be performed. This process is continued by analogy, until the width of a node is equal to a threshold MinQTSize (for example, 4). In this case, the node is considered as a leaf node of the first-level coding tree by default, and SplitFlag is considered as 0 by default.

Step 2: Parse information about a second-level coding tree by using the leaf node of the first-level coding tree as a root node of the second-level coding tree, to obtain a leaf node of the second-level coding tree, and parse a coding unit CU corresponding to the leaf node of the second-level coding tree. Split manners for the second-level coding tree include two types of binary tree splits (horizontal binary split and vertical binary split) and two types of EQT splits (horizontal and vertical). In a split manner for node parsing, if a size of a node is 64×128 or 128×64, it is considered by default that the node is split into two 64×64 subblocks or is not split.

The split manner for the second-level coding tree is different from the split manner for the first-level coding tree. For example, in this embodiment, there are four types of split manners for the second-level coding tree, and there is one type of split manner for the first-level coding tree.

The "parsing a coding unit CU corresponding to the leaf node of the second-level coding tree" is the conventional technology, and reference may be made to coding unit parsing in an AVS standard.

The "parsing information about a second-level coding tree, to obtain a leaf node of the second-level coding tree" includes:

parsing split information STSplitMode of each node in the second-level coding tree.

If the split information indicates that the node is not split (for example, STSplitMode=0), the node is a leaf node of the second-level coding tree.

If the split information indicates that binary tree split is performed on the node (for example, STSplitMode=1 or 2), a split manner indicated by the split information is selected to split the node into two child nodes, and split information of each child node is parsed in sequence to determine a split manner of the child node. For example, when STSplitMode=1, the split information indicates that horizontal binary tree split is performed on the node, and the node is split into two horizontal child nodes. When STSplitMode=2, the split information indicates that vertical binary tree split is performed on the node, and the node is split into two vertical child nodes.

If the split information indicates that EQT split is performed on the node (for example, STSplitMode=3 or 4), a split manner indicated by the split information is selected to split the node into four child nodes, and split information of each child node is parsed in sequence to determine a split manner of the child node. When STSplitMode=3, the split information indicates that horizontal EQT split is performed on the node. When STSplitMode=4, the split information indicates that vertical EQT split is performed on the node.

It may be understood that STSplitMode and a value thereof are merely used to represent different split modes, and another representation manner that can be used for differentiation (for example, different codewords are used for representation).

In the embodiments, determining a split manner of a node is determining whether the node is not split or continues to be split, and which split manner is used if the node continues to be split.

In the embodiments, a split limitation on an EQT node is added. "If a length of any side of the node is greater than 32, it is considered by default that EQT split is not performed on the node".

The leaf node of the second-level coding tree corresponds to a coding unit CU. A coding unit syntax structure (for example, a coding_unit( ) syntax structure in H.265) in the bitstream is parsed to obtain coding information of the CU, including information such as a prediction mode or a transform coefficient of the CU.

Preferably, in step 2, determining for the leaf node of the second-level coding tree and parsing for the coding unit may be performed alternately. After a leaf node of the second-level coding tree is obtained, information about a coding unit corresponding to the node is parsed. After the information about the coding unit is parsed, a next leaf node of the second-level coding tree continues to be obtained, and information about a coding unit corresponding to the leaf node is parsed. This process is continued by analogy, until a last leaf node of the second-level coding tree is obtained and information about a coding unit corresponding to the leaf node is parsed.

Step 3: Perform decoding and reconstruction on each CU based on the coding information that is of each CU and that is determined in step 2, to obtain a reconstructed pixel of each CU, so as to obtain a reconstructed picture of the CTU.

CU decoding includes processing such as entropy decoding, dequantization, inverse transform, prediction, and loop filtering. A process of the CU decoding mainly includes:

obtaining the coding information such as a prediction mode, a quantization parameter, a transform coefficient, or a transform mode of the CU through entropy decoding;

selecting intra prediction or inter prediction based on the prediction mode, to obtain a prediction pixel of the CU;

if the CU has the transform coefficient, performing dequantization and inverse transform on the transform coefficient based on the quantization parameter and the transform mode, to obtain a reconstruction residual of the CU; or if the CU has no transform coefficient, determining that a reconstruction residual of the CU is 0, that is, a reconstruction residual value of each pixel in the CU is 0; and performing loop filtering after adding the prediction pixel to the reconstruction residual, to obtain the reconstructed pixel of the CU.

A decoding apparatus corresponding to the embodiments may include two modules.

A coding tree node parsing module implements processing in step 1 and step 2, that is, parses a bitstream, determines a split manner of each node in a coding tree, and obtains a manner for splitting a CTU into CUs and coding information of each CU. If a size of a node is 64×32 or 32×64, it is considered by default that the node is split into two 32×32 subblocks or is not split.

A CU decoding module implements processing in step 3, that is, decodes each CU to obtain a reconstructed picture of the CTU.

In Embodiment 1, a block (64×32 or 32×64) uses a specific split manner, so that CTU split can be more detailed, CTU split complexity can be reduced (from a plurality of split manners to one split manner), and a probability of improving processing precision is further increased (there is a higher probability that a 32×32 block can be further split).

Embodiment 2

Embodiment 2 is an extension of Embodiment 1.

In Embodiment 2, when the width, the height, and a ratio of a long side to a short side that are of a node satisfy a specific condition (that is, an invalidity condition), it is considered that a split manner of the node is invalid (in other words, the split manner for splitting the node is actually not allowed to be used).

For example, when at least one of the following invalidity conditions is satisfied, it is considered by default that the node is invalid.

(1) If the ratio of the long side to the short side of the node is greater than a threshold minRatio, it is considered that the node is invalid. Herein, the threshold may be an integer greater than or equal to 1, for example, 4.

(2) If a side length of the node is less than a threshold minCUSize, it is considered that the node is not split. Herein, minCUSize is referred to as a minimum CU side length, and for example, is equal to 4.

All of the thresholds in the foregoing conditions may be specified in higher-layer syntax, or may be preset to default values.

If a child node obtained after a specific split manner is used for a current node satisfies any invalidity condition, the current node cannot be split in such a manner. Therefore, based on a limitation of the invalidity conditions, syntax elements that need to be parsed may be further reduced.

If a ratio of a long side to a short side of a parent node is equal to the threshold minRatio, the patent node cannot continue to be split into child nodes on the short side. In an example, the threshold minRatio may correspond to the foregoing first threshold. For example, if a ratio of the width to the height of the parent node is equal to a threshold 4, horizontal split cannot continue to be performed. A reason is as follows: If horizontal split is performed, in a case of a horizontal binary tree split, a ratio of the width to the height of a child node is equal to 8, and exceeds the threshold 4. This is invalid. In a case of a horizontal EQT split, a ratio of the width to the height of a child node is equal to 16, and exceeds the threshold 4. This is invalid. However, as long as the child node does not satisfy another invalidity condition, vertical split can still be performed. Therefore, in this case, in Embodiment 1, a split case of STSplitMode=1 or STSplitMode=3 does not need to be parsed, and only STSplitMode=2 or STSplitMode=4 is possible. In Embodiment 3, values of BtSplitDir and EqtSplitDir can be deduced provided that a value of BTSplitMode or EQTSplitMode is parsed, and the value of BtSplitDir or EqtSplitDir does not need to be additionally parsed. If BTSplitMode=1 is parsed, BtSplitDir=1 can be deduced. If BTSplitMode=1 is parsed, EqtSplitDir=1 can be deduced.

Similarly, it can be deduced that in a case in which split into child nodes needs to be performed, there are the following cases.

If a short-side length of a parent node is equal to the threshold minCUSize, binary tree split can be performed on the parent node on only a long side. When it is determined that a short-side length of a current node is equal to the threshold minCUSize, as long as a value of BTSplitMode is parsed, a split manner of the current node can be obtained.

If a ratio of a long side to a short side of a parent node is twice the threshold minRatio, EQT split cannot be performed on the parent node on the short side. When it is determined that a ratio of a long side to a short side of a current node is twice the threshold minRatio, as long as it is understood through parsing that a value of EQTSplitMode is 1, it may be understood that a split manner of the current node is EQT along the long side (that is, EqtSplitDir does not need to be parsed).

If a short-side length of a parent node is twice the threshold minCUSize, EQT split cannot be performed on the parent node on a short side. When it is determined that a short-side length of a current node is twice the threshold minCUSize, as long as it is understood through parsing that a value of EQTSplitMode is 1, it may be understood that a split manner of the current node is EQT along a long side (that is, EqtSplitDir does not need to be parsed).

If both the width and the height of a parent node are twice the threshold minCUSize, EQT split cannot be performed on the parent node. To When it is determined that both the width and the height of a current node are twice the threshold minCUSize, only BTSplitMode and BtSpliDir need to be parsed, and EQTSplitMode does not need to be parsed.

In Embodiment 2, a relationship between a size of the current node and the threshold minCUSize and/or the threshold minRatio is determined through comparison, to exclude an impossible split mode of the current node, so that complexity of an entire parsing process is reduced, and system efficiency is improved.

Embodiment 3

Embodiment 3 is an extension of Embodiment 1. In this embodiment, a variation of the following step in step 2 of Embodiment 1 is as follows:

The "parsing information about a second-level coding tree, to obtain a leaf node of the second-level coding tree" in step 2 may alternatively include:

parsing split information BTSplitMode and EQTSplitMode of each node in the second-level coding tree.

If the split information indicates that the node is not split (for example, BTSplitMode=0 and EQTSplitMode=0), the node is a leaf node of the second-level coding tree.

If the split information indicates that binary tree split is performed on the node (for example, BtSplitMode=1), a split manner indicated by the split information is selected to split the node into two child nodes, and split information of each child node is parsed in sequence to determine a split manner of the child node. For example, when BtSplitDir=0, the split information indicates that horizontal binary tree split is performed on the node, and the node is split into two horizontal child nodes. When BtSplitDir=1, the split information indicates that vertical binary tree split is performed on the node, and the node is split into two vertical child nodes.

If the split information indicates that an EQT split is performed on the node (for example, EQTSplitMode=1), a split manner indicated by the split information is selected to split the node into four child nodes, and split information of each child node is parsed in sequence to determine a split manner of the child node. When EqtSplitDir=0, the split information indicates that horizontal EQT split is performed on the node. When EqtSplitDir=1, the split information indicates that vertical quadtree split is performed on the node.

Figure 19:
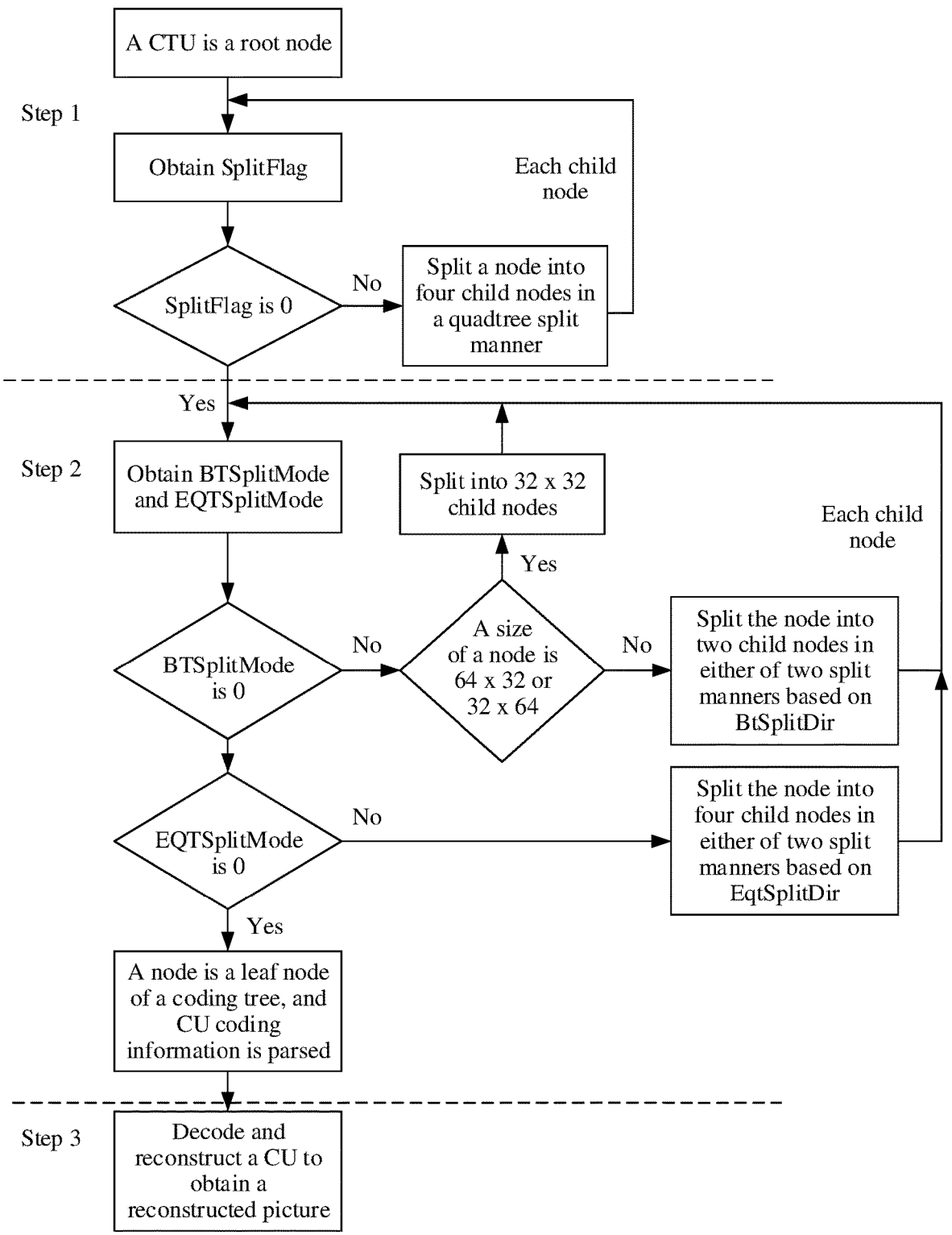
FIG. 19 is a schematic flowchart of another video decoding method according to an embodiment.

An example flowchart is shown in FIG. 19. It may be understood that determining for BTSplitMode and EQTSplitMode in the figure is an example, and may be performed in any sequence or at the same time.

In Embodiment 3, independent parameter determining is introduced to determine a type of binary tree split or EQT split for a node, so that a split method and manner can be determined more quickly. In this way, a parallel processing capability is improved, and system efficiency is improved.

In the embodiments, block (such as a 64×32 or 32×64 block) is limited to a specific split manner (split into 32×32).

In the embodiments, a split limitation on an EQT node is added. "If a length of any side of the node is greater than 32, it is considered by default that EQT split is not performed on the node".

In the embodiments, a relationship between a size of the current node and the threshold minCUSize and/or the threshold minRatio is determined through comparison, to exclude an impossible split mode of the current node (Embodiment 2), so that complexity of an entire parsing process is reduced.

A beneficial effect is that CTU split complexity is reduced (from a plurality of split manners to one split manner or no split), so that efficiency of an entire system is improved.

A person of ordinary skill in the art may understand that the functions described with reference to various illustrative logical blocks, modules, and algorithm steps disclosed and described can be implemented by hardware, software, firmware, or any combination thereof. If implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or may include any communications medium that facilitates transmission of a computer program from one place to another (for example, according to a communications protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described. A computer program product may include a computer-readable medium.

By way of example but not limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it may be understood that the computer-readable storage medium and the data storage medium do not include connections, carriers, signals, or other transitory media, but actually mean non-transitory tangible storage media. Disks and discs used may include a compact disc (CD), a laser disc, an optical disc, a digital versatile disc (DVD), and a Blu-ray disc. The disks usually reproduce data magnetically, whereas the discs reproduce data optically by using lasers. Combinations of the foregoing items may also be included in the scope of the computer-readable media.

An instruction may be executed by one or more processors such as one or more digital signal processors (DSP), general-purpose microprocessors, ASIC, FPGA, or other equivalent integrated or discrete logic circuits. Therefore, the term "processor" may be any of the foregoing structures or any other structure suitable for implementing the technologies described. In addition, in some aspects, the functions described with reference to the illustrative logical blocks, modules, and steps described may be provided within dedicated hardware and/or software modules configured for encoding and decoding, or may be incorporated into a combined codec. In addition, the technologies may all be implemented in one or more circuits or logic elements.

The technologies of the embodiments may be implemented in various apparatuses or devices, including a wireless handset, an integrated circuit (IC), or a set of ICs (for example, a chip set). Various components, modules, or units are described to emphasize function aspects of the apparatuses configured to perform the technologies, but are not necessarily implemented by different hardware units. As described above, various units may be combined into a codec hardware unit in combination with appropriate software and/or firmware, or may be provided by interoperable hardware units (including one or more processors described above).

In the foregoing embodiments, the descriptions in each embodiment have respective focuses. For a part that is not described in detail in an embodiment, refer to related descriptions in other embodiments.

The foregoing descriptions are merely examples of implementations of the embodiments, but are non-limiting. Any variation or replacement readily figured out by a person of ordinary skill in the art is within the scope disclosed.

What is claimed is:

1. A video coding method, comprising:
   determining a block split policy of a current picture block based on a size relationship between a width and a height of the current picture block;
   applying the block split policy to the current picture block to obtain a coding block; and
   reconstructing the obtained coding block to reconstruct the current picture block;
   wherein the determining of a block split policy of a current picture block based on a size relationship between a width and a height of the current picture block comprises:
   determining whether the current picture block satisfies a first condition, wherein the first condition comprises: the width of the current picture block is less than a product of a first threshold and the height of the current picture block; or
   determining whether the current picture block satisfies a second condition, wherein the second condition comprises: the height of the current picture block is less than a product of a first threshold and the width of the current picture block.

2. The method according to claim 1, wherein
   when the current picture block does not satisfy the first condition, determining that the block split policy is a split whose split direction is a vertical direction, wherein the vertical direction is perpendicular to a direction of a side on which the width of the current picture block is located.

3. The method according to claim 1, wherein
   when the current picture block does not satisfy the second condition, determining that the block split policy is a split whose split direction is a horizontal direction, wherein the horizontal direction is perpendicular to a direction of a side on which the height of the current picture block is located.

4. The method according to claim 1, wherein
   when the current picture block does not satisfy the first condition, determining that the block split policy of the current picture block does not comprise a split whose split direction is a horizontal direction, wherein the horizontal direction is perpendicular to a direction of a side on which the height of the current picture block is located.

5. The method according to claim 1, wherein
   when the current picture block does not satisfy the second condition, determining that the block split policy of the current picture block does not comprise a split whose split direction is a vertical direction, wherein the vertical direction is perpendicular to a direction of a side on which the width of the current picture block is located.

6. The method according to claim 2, wherein the first threshold is an allowed maximum value of a ratio of a long-side length to a short-side length that are of a node in a coding tree.

7. The method according to claim 2, further comprising:
   parsing a bitstream to obtain identifier information, wherein the identifier information is used to indicate a split mode for splitting the current picture block; and
   correspondingly, the applying of the block split policy to the current picture block to obtain a coding block comprises:
   performing, on the current picture block according to the block split policy by using the split mode indicated by the identifier information, split whose split direction is the vertical direction, to obtain the coding block.

8. A video coder, comprising:
   a split unit configured to determine a block split policy of a current picture block based on a size relationship between a width and a height of the current picture block, and apply the block split policy to the current picture block to obtain a coding block; and a reconstruction unit configured to reconstruct the obtained coding block to reconstruct the current picture block, wherein the split unit is further configured to:

determine whether the current picture block satisfies a first condition, wherein the first condition comprises: the width of the current picture block is less than a product of a first threshold and the height of the current picture block; or determine whether the current picture block satisfies a second condition, wherein the second condition comprises: the height of the current picture block is less than a product of a first threshold and the width of the current picture block.

9. The video coder according to claim 8, wherein when the current picture block does not satisfy the first condition, the split unit is configured to determine that the block split policy is a split whose split direction is a vertical direction, wherein the vertical direction is perpendicular to a direction of a side on which the width of the current picture block is located.

10. The video coder according to claim 8, wherein when the current picture block does not satisfy the second condition, the split unit is configured to determine that the block split policy is a split whose split direction is a horizontal direction, wherein the horizontal direction is perpendicular to a direction of a side on which the height of the current picture block is located.

11. The video coder according to claim 8, wherein when the current picture block does not satisfy the first condition, the split unit is configured to determine that the block split policy of the current picture block does not comprise a split whose split direction is a horizontal direction, wherein the horizontal direction is perpendicular to a direction of a side on which the height of the current picture block is located.

12. The video coder according to claim 8, wherein when the current picture block does not satisfy the second condition, the split unit is configured to determine that the block split policy of the current picture block does not comprise a split whose split direction is a vertical direction, wherein the vertical direction is perpendicular to a direction of a side on which the width of the current picture block is located.

13. The video coder according to claim 9, wherein the first threshold is an allowed maximum value of a ratio of a long-side length to a short-side length that are of a node in a coding tree.

14. The video coder according to claim 9, further comprising:

an entropy decoding unit, configured to parse a bitstream to obtain identifier information, wherein the identifier information is used to indicate a split mode for splitting the current picture block; and correspondingly, the split unit is configured to perform, on the current picture block according to the block split policy by using the split mode indicated by the identifier information, split whose split direction is the vertical direction, to obtain the coding block.

* * * * *